US012572113B2

(12) United States Patent
Christmas et al.

(10) Patent No.: US 12,572,113 B2
(45) Date of Patent: Mar. 10, 2026

(54) WAVEGUIDE PUPIL EXPANSION

(71) Applicant: Envisics Ltd, Milton Keynes (GB)

(72) Inventors: Jamieson Christmas, Milton Keynes (GB); Timothy Smeeton, Milton Keynes (GB); Ruisheng Lin, Milton Keynes (GB); Celedonia Krawczyk, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 947 days.

(21) Appl. No.: 17/748,584

(22) Filed: May 19, 2022

(65) Prior Publication Data

US 2022/0404770 A1 Dec. 22, 2022

(30) Foreign Application Priority Data

Jun. 14, 2021 (GB) ..................................... 2108456

(51) Int. Cl.
*G03H 1/22* (2006.01)
*G02B 27/01* (2006.01)

(52) U.S. Cl.
CPC ....... *G03H 1/2294* (2013.01); *G02B 27/0103* (2013.01); *G02B 2027/0118* (2013.01); *G02B 2027/0123* (2013.01)

(58) Field of Classification Search
None
See application file for complete search history.

(56) References Cited

U.S. PATENT DOCUMENTS

2010/0302351 A1    12/2010  Yanamoto
2011/0149018 A1*   6/2011   Kroll ........................ G03H 1/02
                                                            445/24
(Continued)

FOREIGN PATENT DOCUMENTS

EP           2784599 A1    10/2014
EP            333617 A1     6/2018
(Continued)

OTHER PUBLICATIONS

Search Report issued in GB2108456.1, mailed Mar. 23, 2022 (4 pages).
(Continued)

*Primary Examiner* — Jyotsna V Dabbi
(74) *Attorney, Agent, or Firm* — Akerman LLP

(57) ABSTRACT

A light engine arranged to form an image visible from a viewing window, the light engine comprising a display device for displaying a hologram of the image and spatially modulating light based on the hologram. The hologram is configured to angularly distribute spatially-modulated light of the image based on position of image content, where angular channels of the spatially-modulated light correspond with respective continuous regions of the image. The light engine further comprises a waveguide pupil expander for receiving the spatially-modulated light and providing a plurality of light propagation paths for the spatially-modu-lated light from the display device to the viewing window, and a control device between the waveguide and the viewing window. The control device comprises an aperture arranged such that a first viewing position receives a first channel of spatially-modulated light and a second viewing position receives a second channel of spatially-modulated light.

20 Claims, 38 Drawing Sheets

(56)          References Cited

U.S. PATENT DOCUMENTS

2016/0231570 A1*   8/2016  Levola ................. G02B 6/0035
2019/0369403 A1*  12/2019  Leister .................... G02B 5/32
2020/0166754 A1*   5/2020  Leister .............. G02B 27/0081
2021/0003843 A1    1/2021  Futterer

FOREIGN PATENT DOCUMENTS

GB          2589575  A      6/2021
JP       2010-276965  A    12/2010
JP       2014-503836  A     2/2014

OTHER PUBLICATIONS

Notice of Reasons for Refusal issued in Japanese Application
2022-078671 mailed on Jul. 27, 2023 (2 pages).
English translation of Notice of Reasons for Refusal issued in
Japanese Application 2022-078671 mailed on Jul. 27, 2023 (2
pages).

* cited by examiner

502'

504'  506'

501'

504'                              506'

902

902

908

905

906

G1

M

G2

Y

Z

904

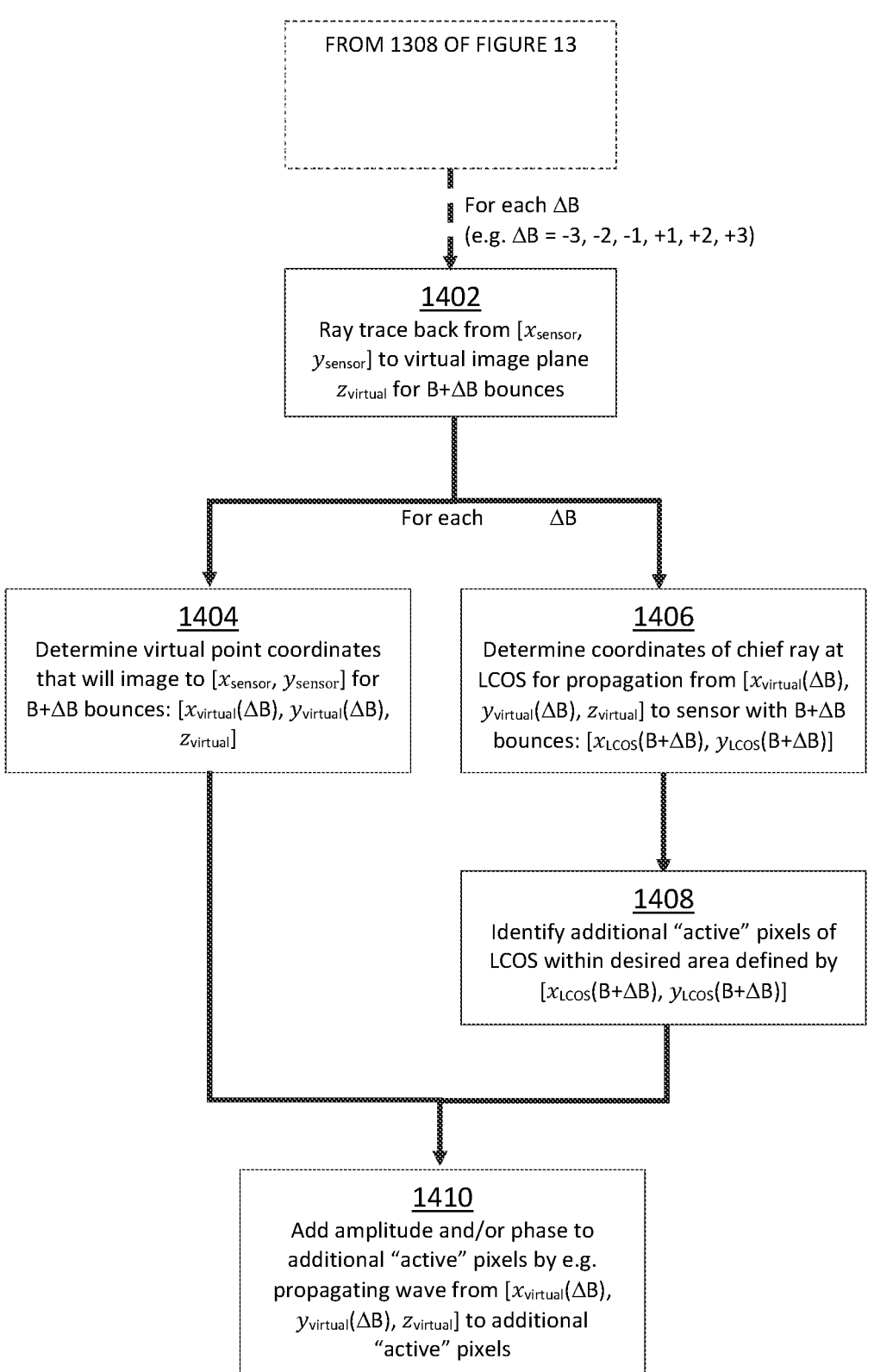

FROM 1308 OF FIGURE 13

For each ΔB
(e.g. ΔB = -3, -2, -1, +1, +2, +3)

1402
Ray trace back from $[x_{sensor}, y_{sensor}]$ to virtual image plane $z_{virtual}$ for B+ΔB bounces For each ΔB

1404
Determine virtual point coordinates that will image to $[x_{sensor}, y_{sensor}]$ for B+ΔB bounces: $[x_{virtual}(\Delta B), y_{virtual}(\Delta B), z_{virtual}]$

1406
Determine coordinates of chief ray at LCOS for propagation from $[x_{virtual}(\Delta B), y_{virtual}(\Delta B), z_{virtual}]$ to sensor with B+ΔB bounces: $[x_{LCOS}(B+\Delta B), y_{LCOS}(B+\Delta B)]$

1408
Identify additional "active" pixels of LCOS within desired area defined by $[x_{LCOS}(B+\Delta B), y_{LCOS}(B+\Delta B)]$

1410
Add amplitude and/or phase to additional "active" pixels by e.g. propagating wave from $[x_{virtual}(\Delta B), y_{virtual}(\Delta B), z_{virtual}]$ to additional "active" pixels

FIGURE 14

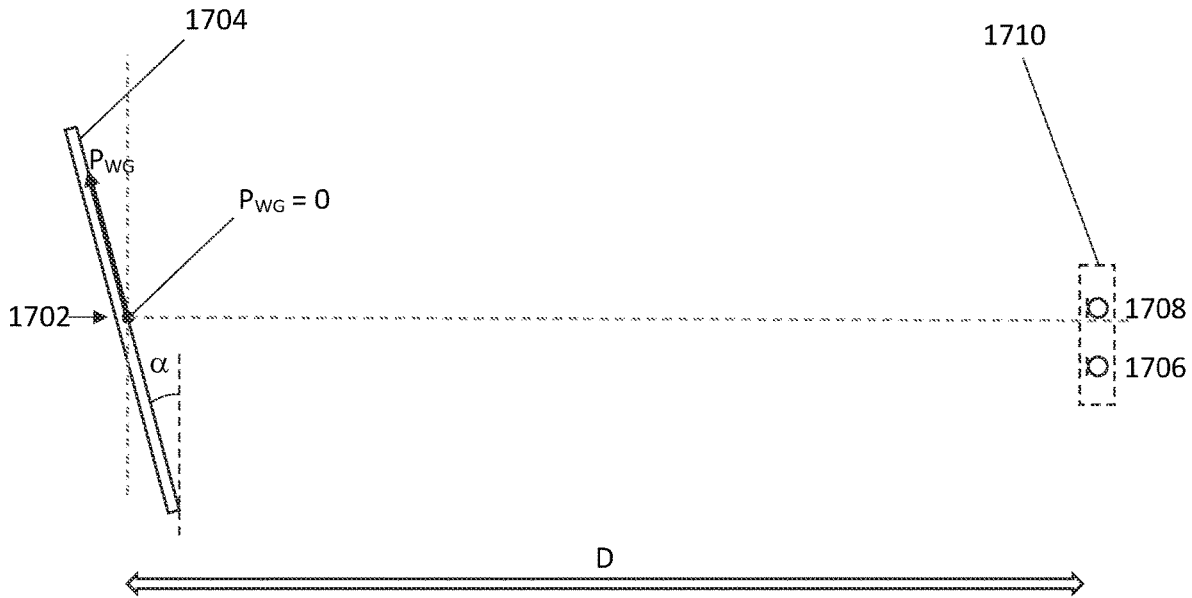
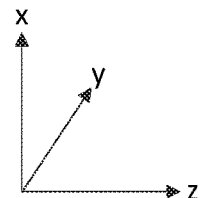
FIGURE 17

2000

Zone 4    Zone 3    Zone 2    Zone 1

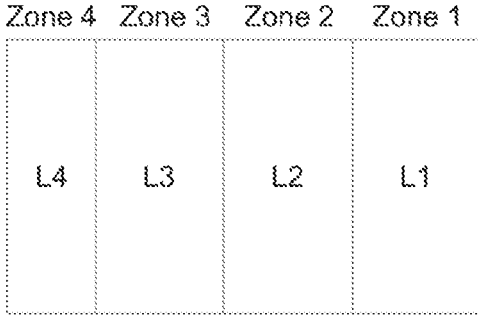
FIGURE 23A
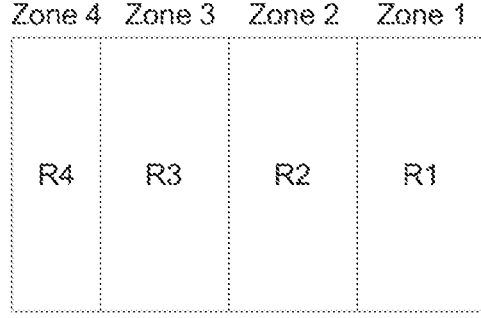
FIGURE 23B
FIGURE 23C
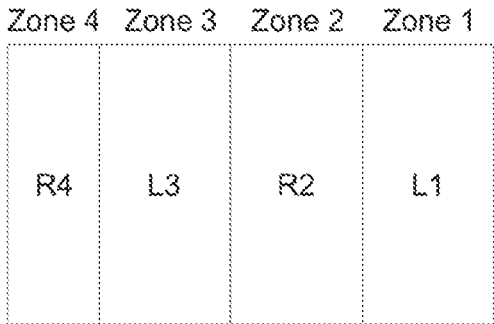
FIGURE 23D

Zone 4  Zone 3  Zone 2  Zone 1

R4

R2

Zone 4  Zone 3  Zone 2  Zone 1

L3

L1

2850

WAVEGUIDE PUPIL EXPANSION

CROSS REFERENCE TO RELATED APPLICATIONS

This application claims priority under 35 U.S.C. § 119 to UK Patent Application GB 2108456.1, titled "Waveguide Pupil Expansion," filed on Jun. 14, 2021, and currently pending. The entire contents of GB 2108456.1 are incorporated by reference herein for all purposes.

FIELD

The present disclosure relates to image projection. More specifically, the present disclosure relates to holographic projection and method for determining a diffractive structure such as a hologram or kinoform. Some embodiments relate to real-time hologram calculation based on eye-tracking information. Some embodiments relate to virtual image projection. Other embodiments relate to projection of a real image. Embodiments relate to viewing a projected image through a waveguide. Embodiments relate to controlling light of an image that is projected through a waveguide. Some embodiments relate to a light engine such as a picture generating unit. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LIDAR", for example.

SUMMARY

Aspects of the present disclosure are defined in the appended independent claims.

The present disclosure relates to image projection. It relates to a method of image projection and an image projector which comprises a display device. The present disclosure also relates to a projection system comprising the image projector and a viewing system. The present disclosure is equally applicable to a monocular and binocular viewing system. The viewing system may comprise a viewer's eye or eyes. The viewing system comprises an optical element having optical power (e.g. lens/es of the human eye) and a viewing plane (e.g. retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern (e.g., hologram) displayed on the display device.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s) and there is no intermediate holographic reconstruction formed, either in free space or on a screen or other light receiving surface, between the display device and the viewer. In such embodiments, the pupil of the eye may be regarded as being the entrance aperture (or "entrance pupil") of the viewing system and the retina of the eye may be regarded as the viewing plane of the viewing system. It is sometimes said that, in this configuration, the lens of the eye performs a hologram-to-image conversion.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it is possible to consider a plurality of different virtual image points of a virtual image. The distance from a virtual point to the viewer is referred to herein as a virtual image distance, for that virtual image point. Different virtual points may, of course, have different virtual image distances. Individual light rays, within ray bundles associated with each virtual point, may take different respective optical paths to the viewer, via the display device. However, only some parts of the display device, and therefore only some of the rays from one or more virtual points of a virtual image, may be within the user's field of view. In other words, only some of the light rays from some of the virtual points on the virtual image will propagate, via the display device, into the user's eye(s) and thus will be visible to the viewer. Conceptually, it may therefore be considered that the viewer is looking at a virtual image through an 'display device-sized window', which may be very small, for example 1 cm in diameter, at a relatively large distance, e.g. 1 metre. And the user will be viewing the display device-sized window via the pupil(s) of their eye(s), which can also be very small. Accordingly, the field of view becomes small and the specific angular range that can be seen depends heavily on the eye position, at any given time.

The present disclosure addresses a technical problem of how to increase the field of view—i.e., how to increase the range of angles of light rays that are propagated from the display device, and which can successfully propagate through an eye's pupil to form an image—when the display device is (in relative terms) small, and the projection distance is (in relative terms) large. In some embodiments, the projection distance is at least one—such as, at least two—orders of magnitude greater than the diameter, or width, of the aperture of the display device (i.e., size of the array of pixels). More specifically, the present disclosure addresses a technical problem of how to do this with so-called direct view holography in which a hologram of an image is propagated to the human eye rather than the image itself. In other words, the light received by the viewer is modulated according to a hologram of the image.

A waveguide is used to expand the field of view and therefore increase the maximum propagation distance over which the full diffractive angle of the display device may be used. Use of a waveguide can also increase the user's eye-box laterally, thus enabling some movement of the eye(s) to occur, whilst still enabling the user to see the image. The waveguide may therefore be referred to as a waveguide pupil expander. The present inventors, however, have found that for a non-infinite virtual image distance—that is, near-field virtual images—so-called 'ghost images' appear owing to the different possible light propagation paths through the waveguide. A ghost image is a lower intensity replica of a main image. The main, highest intensity image may be referred to as the primary image. Each ghost image may be referred to as a secondary image. The presence of ghost images can significantly reduce the quality of a perceived virtual image. The ghost images may give the appearance of blurring of the primary image.

The present disclosure sets out different approaches for addressing problems caused by the ghost images. Some solutions disclosed herein have been shown to successfully remove the ghost images. Some solutions disclosed herein have been shown to modify/manipulate the ghost image in order to enhance or reinforce the primary/non-ghost image.

A light engine is arranged to provide a viewing system, having an entrance pupil, with spatially modulated light. The display system comprises a display device arranged to display a hologram and spatially modulate light in accordance with the hologram. The display system further comprises a hologram engine arranged to receive contribution information identifying contributory and non-contributory areas of the display device based on the location of the entrance pupil. The contributory areas of the display device substantially propagate light passing through the entrance pupil at the determined location. The non-contributory areas of the display device substantially propagate light stopped by the entrance pupil at the determined location. The contribution information further identifies (i) at least one primary contributory area of the display device propagating light to the viewing system that contributes to a primary image and (ii) at least one secondary contributory area of the display device propagating light to the viewing system that contributes to a secondary image. The hologram engine is further arranged to determine a hologram based on the at least one primary contributory area of the display device identified by the processing engine. The hologram engine is further arranged to output the hologram to the display device for display.

For the avoidance of doubt, the image formed or perceived is a holographic reconstruction of a target image. The holographic reconstruction is formed from a hologram based on the target image. In some embodiments, the hologram is determined (e.g. calculated) from the target image.

By identifying contributory and non-contributory areas of the display device, the light engine can determine which part or parts of the display device can usefully be encoded by the hologram, in order to contribute positively to formation of the primary image, for a given location of the entrance aperture of the viewing system. For example, this may correspond to a location of a viewer's eye, at a given time. Moreover, the light engine can determine which parts of the display device cannot propagate light through the entrance aperture, and thus are not worth populating with hologram values. In addition, the light engine can distinguish between parts of the display device that contribute positively to a 'main' target image and parts which contribute to a copy/replica or 'ghost' version of the primary image. The hologram can thus be omitted in so-called secondary contributory areas, to eliminate the ghosts.

Alternatively, in a notable further improvement, the hologram displayed in an additional contributory area may be determined, based on a displaced or amended location of an image point (i.e., of a point within a desired image, that is to be holographically reconstructed). This amended location may be referred to as being a 'secondary image point' but this is shorthand for it being a secondary (i.e., changed) location of the (primary) image point. In brief, a modelled/computed location of an image point may be amended (e.g., translated on an image plane) so that light travelling from said amended location, via the additional contributory area on the display device, would arrive at a desired location on a viewing plane, in order to effectively reinforce the primary image. Therefore, in this alternative approach, the hologram for the additional contributory area is determined based on a different location of the image point to that which is used to identify a primary contributory area on the display device. The optical path length, from the primary image point, is typically different to the optical path length, from the secondary image point, to the corresponding image that is formed on the viewing plane. It may thus be said that the hologram determination process in relation to the additional contributory area comprises translating or shifting the image point used in the hologram determination process.

Thus, an intelligent and efficient light engine is provided, which can be configured and operated to provide sharp, accurate images, corresponding to holograms that have been determined in a streamlined and computationally efficient manner.

A method is provided of determining a hologram for display on a display device. The method comprises determining the location of an entrance pupil of a viewing system arranged to view the hologram and identifying contributory areas and non-contributory areas of the display device, wherein the contributory areas of the display device substantially propagate light passing through the entrance pupil of the viewing system at the determined location and non-contributory areas of the display device substantially propagate light stopped by the entrance pupil of the viewing system at the determined location. The method further comprises identifying at least one primary contributory area of the display device that provides light contributing to a primary image and at least one secondary contributory area of the display device that provides light contributing to a secondary image; and determining the hologram based on the at least one primary contributory area of the display device.

A diffractive structure is provided, arranged to spatially modulate light transformable by a viewing system into a target image, wherein the diffractive structure is configured to generate a plurality of discrete light patterns, each light pattern corresponding to a different part of the target image, wherein the shape of each discrete light pattern substantially corresponds to the shape of an entrance aperture of the viewing system.

A diffractive structure is provided, arranged to spatially modulate light transformable by a viewing system (comprising a lens) into an image, wherein the diffractive structure is arranged to direct light into a plurality of discrete light channels, wherein each light channel has a cross-sectional shape substantially corresponding to an entrance pupil of the viewing system and each light channel substantially corresponds to a different part of the image.

A method is provided of determining a hologram for display on a display device and formation of a virtual image perceivable from a viewing plane by viewing a hologram displayed on the display device through a waveguide. The method comprises, for each virtual image point of the virtual image, determining the coordinates of the virtual image point, $[x_{virtual}, y_{virtual}, z_{virtual}]$, determining a viewing position on the viewing plane, and determining a number of light reflections, B, within the waveguide associated with a primary image formed by the waveguide. The method further comprises ray tracing from the virtual image point to the viewing plane for 'B' light reflections within the waveguide and determining coordinates, $[x_{LCOS}(B), y_{LCOS}(B)]$, of a chief light ray at the display device for light propagation from $[x_{virtual}, y_{virtual}, z_{virtual}]$ to the viewing plane with B reflections. The method further comprises determining active pixels of display device within an area defined by $[x_{LCOS}(B), y_{LCOS}(B)]$; and determining a sub-hologram comprising an amplitude and/or phase hologram component for the active pixels by propagating a light wave from $[x_{virtual}, y_{virtual}, z_{virtual}]$ to the active pixels.

The chief ray may comprise a light ray that is determined (e.g., computed or modelled) as travelling from the virtual image point, via the display device, to a primary or 'main' image point, of the virtual image point, on the viewing plane.

The method may further comprise combining the sub-holograms—calculated respectively for two or more corresponding virtual image points—in order to form a hologram.

The method may further comprise determining a position on the viewing plane, $[x_{sensor}, y_{sensor}]$, of the main image of the virtual image point.

The method may further comprise, for each value of $\Delta B$ permitted by the waveguide, ray tracing back from $[x_{senor}, y_{senor}]$ to a virtual image plane $z_{virtual}$ for $B+\Delta B$ bounces and determining virtual point coordinates, $[x_{virtual}(\Delta B), y_{virtual}(\Delta B), z_{virtual}]$, that will image to $[x_{sensor}, y_{sensor}]$ for $B+\Delta B$ reflections. The method may further comprise determining the coordinates, $[x_{LCOS}(B+\Delta B), y_{LCOS}(B+\Delta B)]$, of a chief ray at the display device for light propagation from $[x_{virtual}(\Delta B), y_{virtual}(\Delta B), z_{virtual}]$ to the viewing plane with $B+\Delta B$ bounces and identifying additional active pixels of the display device within a second area (i.e., an additional area) that is defined by $[x_{LCOS}(B+\Delta B), y_{LCOS}(B-\Delta B)]$. The method may further comprise determining an additional sub-hologram comprising an amplitude and/or phase hologram component for the additional active pixels by propagating a light wave from $[x_{virtual}(\Delta B), y_{virtual}(\Delta B), z_{virtual}]$ to the additional active pixels.

Aspects of the present disclosure also relate to a hologram or kinoform characterised by the channelling or routing of holographic light. Specifically, there is disclosed herein a diffractive structure arranged to spatially modulate light transformable by a viewing system into an image, wherein the diffractive structure is configured to route light into a plurality of hologram channels, each hologram channel corresponding to a different part of the image.

The diffractive structure may be arranged such that the hologram channels propagate from the diffractive structure at different angles.

Each hologram channel may comprise spatially modulated light in accordance with a hologram of the respective different part of the image.

The diffractive structure may be arranged to spatially modulate the phase of light.

The diffractive structure may be arranged to route light through a waveguide. The waveguide may be arranged for pupil expansion.

The cross-sectional shape of the light pattern formable by each hologram channel may substantially correspond to the shape of an entrance aperture of the viewing system.

The hologram channels may be spatially separated or at least partially spatially separated.

There is further disclosed herein a system comprising the diffractive structure, a waveguide arranged to receive the spatially modulated light from the diffractive structure and a viewing system arranged to receive the spatially modulated light via the waveguide.

The system may be arranged such that light of each hologram channel follows a different optical path from the diffractive structure to the viewing system.

The different optical paths may comprise a different number of reflections within the waveguide. The different optical paths may have different lengths. The different optical paths may pass through the entrance aperture of the viewing system at a different angle.

The waveguide may be arranged so that all hologram channels are routed through the entrance aperture of the viewing system at any viewing position on a viewing plane.

The waveguide only routes each hologram channel via one optical path to the viewing system for each permitted viewing position.

At least two hologram channels of the plurality of hologram channels may be partially overlapping at the entrance aperture of the viewing system.

The diffractive structure may be a kinoform or hologram.

The system may comprise a "display system" or a "light engine".

The system may be arranged such that light of each hologram channel is emitted from each of multiple different transmission points on the waveguide, towards the viewing system. For example, each transmission point may occur after a different respective number of reflections (or, "bounces") of the light within the waveguide. The system may be arranged such that light of the same hologram channel propagates from each transmission point at the same angle, or range of angles. Each hologram channel may thus be referred to as an "angular channel". In other words, each hologram channel may comprise spatially modulated light in accordance with a different respective part of the image. Each hologram channel may thus correspond to different respective image content. Moreover, each hologram channel may have a unique respective "characteristic angle" (or characteristic range of angles), wherein each (i.e., "every") hologram channel is propagated from each (i.e., "every") transmission point on the waveguide, at its characteristic angle (or characteristic range of angles). Light of the same image content may be emitted from multiple different transmission points on the waveguide, all at the same angle, or within the same angular range, relative to a surface of the waveguide, even though the transmission points are spatially separated from one another on the waveguide.

The system may be arranged such that no more than one instance of each individual hologram channel reaches an individual eye, or individual viewing aperture or viewing window, of the viewing system. The hologram channels may be achieved through constraining the hologram, during calculation, in accordance with that individual eye or other viewing aperture/window. However, it is common for a viewing system to have multiple viewing apertures, each occupying a different location and thus each defining a different respective viewing position. For example, a human viewer typically has two eyes that are naturally spatially separated from one another. It has thus been recognised herein that, in the absence of any control to the contrary, there is a risk of a plurality instances of the light of the same (i.e., a common) hologram channel reaching a respective plurality of viewing apertures/windows (which may also be referred to as "entrance pupils") of the viewing system, substantially simultaneously. If this happened, the viewer's brain—or, the processor associated with a non-human viewing system—would perceive that both eyes (or, both or every viewing aperture) had received light of the same image content (that is, light of the same part or point of the image) at the same angle, despite the fact that those eyes or viewing apertures are themselves at different respective viewing locations. This is counterintuitive for a viewer or viewing system, as ordinarily two different viewing locations should, based on well-established mathematical principles, receive light from a common point at different respective angles.

Thus, the present disclosure addresses a technical problem of how to avoid viewing system confusion when viewing an image projected by a system that comprises a diffractive structure (and/or a display device configured to display such a diffractive structure), a waveguide arranged to receive spatially modulated light from the diffractive structure, and a viewing system having a viewing window with two or more viewing apertures, arranged to receive the spatially modulated light via the waveguide, wherein the diffractive structure causes the light of the image to be distributed into a plurality of different channels of spatially modulated light, according to image content. The light of the image may be in the hologram domain. Each of the different channels may have a different respective angular direction, when emitted from the waveguide.

The present disclosure provides a control device and a method for controlling light emitted by a waveguide. The present disclosure further provides a system including such a control device and a method for operating the system.

The control device is configurable to selectively block, or prevent, the propagation of one or more channels of spatially modulated light that are emitted by the waveguide, and to allow onward propagation of one or more respective other channels, towards the viewing system. Each channel may be defined by an angle, or an angular range, of the light propagation, relative to a reference surface or plane such as, for example, an emission (or, transmission) surface of the waveguide. The control device may comprise one or more openings, or apertures, and one or more walls, or barriers, in order to selectively emit and block light from the waveguide. The control device may be dynamically configurable in order to select, and/or to change, which portion(s) of the control device acts as an opening and which respective other portion(s) of the control device acts as a barrier, at a given time.

The control device may enable the spatially modulated light to be divided between a plurality of entrance pupils of the viewing system, wherein each entrance pupil has a different respective viewing position, so that no two entrance pupils receive light of exactly the same image content, at the same light ray angle, at the same time. In embodiments, the maximum light ray angle received by a first viewing position is substantially equal to a minimum light ray angle of a second eye position, at a given time.

Interlacing may be used, so that spatially modulated light of a first set of image content reaches a first viewing position at a first time and spatially modulated light of a second set of image content reaches the first viewing position at a second, different time. The interlacing may be rapid, for example the system may switch between the respective lights of the first and second sets of image content being received at the first viewing position within a time window that is shorter than the typical integration time for a human eye. The first and second sets of image content may combine to provide all the image content needed by the viewing system, to form the holographically reconstructed image. In some embodiments, at times when the first viewing position is receiving light of the first set of image content, a second viewing position is receiving light of the second set of image content, and vice versa. In some embodiments, at times when the first viewing position is receiving light of the first set of image content, a second viewing position is receiving light of a third set of image content, and at times when the first viewing position is receiving light of the second set of image content, the second viewing position is receiving light of a fourth set of image content. In these embodiments, the first, second, third and fourth sets of image content may combine to provide all the image content for the target image. Each set of image content may correspond to a different respective part, or region, of an image or plurality of images (e.g. one image for each viewing position of a pair of viewing positions). In embodiments, the first and second sets of image content may combine to provide all the image content for a first target image, for a first viewing position, and the third and fourth sets of image content may combine to provide all the image content for a second target image, for a second, different viewing position. The component image parts (i.e. sets of image content) of the same image may be delivered to the corresponding viewing position within the integration time of a human eye and/or within an interframe time of a video-rate sequence of images. For the avoidance of doubt, a first image provided to a first viewing position may be different to a second image provided to a second viewing position and each image may be delivered to each viewing position using a plurality of holograms displayed in succession (i.e. time interlaced) by dividing each image into a plurality of sets of image content, optionally, wherein each hologram corresponds to one set of image content for one viewing position. In some embodiments, a three-dimensional holographic image/reconstruction may be perceived by a viewing system or viewer.

According to an aspect, there is provided a light engine arranged to form an image visible from a viewing window, wherein the light engine comprises a display device arranged to display a hologram of the image and spatially modulate light in accordance with the hologram. The hologram is configured to angularly distribute spatially modulated light of the image in accordance with position of image content, such that angular channels of the spatially modulated light correspond with respective continuous regions of the image. The light engine further comprises a waveguide pupil expander arranged to receive the spatially modulated light and provide a plurality of different light propagation paths for the spatially modulated light from the display device to the viewing window, and a control device disposed between the waveguide and the viewing window. The control device comprises at least one aperture arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image.

The first and second channels of light may be received at the different viewing positions at substantially the same time or at different times such as in sequence one after the other. The control device is arranged to ensure that the first channel of light is not delivered to the second viewing position at the same time, and vice versa. For example, the control device may be configured to ensure that a replica of the first channel of light, formed by the waveguide pupil expander and on a course for the second viewing position, is blocked, and vice versa. In some embodiments, only one viewing position of a plurality of viewing positions receives light at the same time. For example, a first viewing position may receive one, or a plurality of different light channels, at the same time whilst the control device ensures (e.g. through aperture configuration) that the second viewing position does not receive any light channels. By way of another example, at any one time, a first viewing position may receive one light channel and a second viewing position may receive a plurality of light channels.

The viewing window may be an eye-box or eye motion box. The viewing system may be a human viewer.

The spatially modulated light of the image may be in the hologram domain. In other words, the visible image may be formed by the viewing system only when the spatially modulated light is received at the viewing window. There may be no intermediate image formed, either in free space or on a light receiving surface between the control device and the viewing window.

The system may be arranged to display two or more holograms substantially simultaneously. For example, the system may be arranged to display a first hologram that has been constrained in accordance with a first viewing aperture of a viewing system and a second hologram that has been constrained in accordance with a second, different viewing aperture of the viewing system. For example, the two or more holograms may respectively correspond to two or more respective views of an image that is to be produced, wherein a first view is from the perspective of a first viewing aperture and the second view is from the perspective of a second, different viewing aperture of the viewing system.

The two or more holograms may be combined, for example added, into a single hologram for display. The two or more holograms may be displayed on different respective parts of a display device. The two or more holograms may be displayed on a rapidly-alternating basis, for example alternating at a rate that is faster than the typical integration time of the human eye.

The image may be a real image or a virtual image. The image may be a virtual image perceived, by the viewing system or by a processor associated with the viewing system, to be located upstream of the display device.

The first and second regions of the image may each comprise a continuous region of the image. The first and second regions of the image may be adjacent to one another. The first and second regions of the image may be adjoining, or contiguous with one another. The first and second regions of the image may be overlapping or non-overlapping. The first and second regions may be non-adjacent. The first and second regions may comprise regions of the image as viewed from first and second different perspectives. For example, the first region may comprise a continuous region of the image as viewed from the first viewing position and the second region may comprise a continuous region of the image as viewed from the second viewing position.

The hologram may be calculated so as to angularly distribute spatially modulated light of the image in accordance with position of image content. For example, the hologram may be calculated using a plurality of image points within the image that is to be formed, wherein a primary contributory area on the display device is identified, via which light travels from each image point, of the plurality of image points, to the first viewing position or to the second viewing position within the viewing window. The hologram may be calculated from a plurality of sub-holograms. For example, the hologram may comprise a combination of a first hologram (or sub-hologram), representing the image as viewed from the first viewing position, and a second hologram (or sub-hologram), representing the image as viewed from the second viewing position.

The hologram may comprise any suitable type of hologram, for example it may comprises any of: a Fresnel hologram, or a Fourier hologram, or a point-cloud hologram.

The hologram (and/or, a hologram or sub-hologram that contributes to the hologram) may be constrained, during calculation, in accordance with an entrance pupil of the viewing system. For example, the entrance pupil may be located at the first viewing position or at the second viewing position within the viewing window. The hologram may be constrained using a location of the entrance pupil, at a given time. The hologram may be constrained using a dimension of the entrance pupil, such as a diameter of the entrance pupil, via which light can enter the viewing window, at a given time.

The angular distribution of image content owing to the hologram may result in each angular channel having a different respective angle, or range of angles, at which it is emitted from the display device, and/or from the waveguide pupil expander (which may be referred to simply as a "waveguide".) The maximum angle of a first angular channel may be equal to a minimum angle of a second angular channel. The size and/or shape of the light of an angular channel may correspond to a size and/or shape of an entrance pupil (or, viewing aperture) at the first viewing position or at the second viewing position.

The viewing window may comprise more than two viewing positions, at a given time. The number of viewing positions, within the viewing window, may vary dynamically.

The location of the first viewing position and/or of the second viewing position may vary dynamically. In embodiments, the hologram may be checked and/or may be recalculated, when one or other (or both) of the viewing position change/s. For example, if the hologram is constrained in accordance with an entrance pupil that is located at one of the viewing positions, and the entrance pupil is moved so as to change that viewing position, the hologram may be recalculated.

In embodiments, the first and second viewing position correspond to first and second positions of the same entrance pupil (or viewing aperture). The entrance pupil may be configured to move, for example to move rapidly, between the first and second viewing positions.

In embodiments, the first and second viewing positions correspond to first and second different entrance pupils (or viewing apertures) within the viewing window. For example, they may correspond to the right and left eyes of a viewer, respectively. Thus, the control device may be configured to prevent the same angular channel (and, thus, light of the same image content, at the same angle) reaching both entrance apertures simultaneously.

Adjacent angular channels of the spatially modulated light may correspond to adjacent regions of the image. Respective angular channels may be non-overlapping but may be continuous, in angular space. The maximum light ray angle of a first angular channel may be substantially equal to the minimum light ray angle of a second, adjacent angular channel.

Each of the plurality of different light propagation paths for the spatially modulated light, which the waveguide pupil expander provides from the display device to the viewing window, may comprise a plurality of angular channels, each corresponding to a different respective region of the image. In embodiments, the waveguide pupil expander and control device may be configured so that, for each light propagation path, only one angular channel will reach the first viewing position, at a given time. In embodiments, the waveguide pupil expander and control device may be configured so that, for each light propagation path, only one angular channel will reach the second viewing position, at a given time.

The control device may be coupled to an output face, or output port, of the waveguide pupil expander. For example, it may be provided optically downstream of the waveguide pupil expander, separated from it by a short distance. The waveguide pupil expander and control device may be attached to one another in any suitable manner. The waveguide pupil expander and control device may be arranged substantially parallel or with one another.

The control device may be configured to restrict the area, or areas, of the output face of the waveguide that is/are visible from the viewing window.

The waveguide pupil expander and viewing window may be non-parallel. For example, the viewing window may comprise a viewing plane, containing the first and/or second viewing positions, and a face of the waveguide pupil expander, such as an output face, from which the different light propagation paths are output, may be non-parallel to that viewing plane.

The control device may comprise a plurality of openings (which may instead be referred to as "apertures" or "windows", or as being substantially "open" or "transparent" portions or sections of the control device) wherein each opening provides the first viewing position and/or the second viewing position with a respective channel of spatially modulated light, such that non-identical image content is delivered, respectively, to the first and second viewing positions at substantially the same time. In embodiments, all the image content of the image may be fully delivered, via the openings, to the viewing window at substantially the same time, but wherein no part of the image content is delivered to both viewing positions at substantially the same time.

The control device may also comprise a plurality of barriers, or closed portions. The barriers may be provided on an alternating basis, with the openings, along a transmission face of the control device.

The size and/or location of one or more of the openings (and, thus, of one or more of the barriers) within the control device, may be dynamically variable. The size and/or location of the opening(s) may be determined in accordance with the hologram that is being displayed, at a given time. The size and/or location of the opening(s) may be determined in accordance with the location, at a given time, of the first viewing position and/or the second viewing position.

Although the term "opening" has been used to describe portions of the control device that emit light therethrough, at a given time, it should not necessarily be understood to mean a physical gap, or absence of material. Instead, an "opening" may comprise a portion of the control device that may be dynamically controlled to either be open, and thus optically transparent, or closed, and thus optically opaque. For example, an opening may comprise a portion of the control device from which a shutter or cover may be removed and/or it may comprise a portion of material which is dynamically configurable to be either optically transparent or opaque.

The control device may be formed, at least partially, from an optically variable material. The light transmission properties of at least part of the control device may be changed, and controlled, for example through application of a selected voltage, or through the application of light or heat thereto. The control device may comprise a pixelated device, wherein each pixel may be switchable between being optically transparent and optically opaque. For example, the pixelated device may be a liquid crystal device. Thus, the size and location of the "openings" of the control device may be determined by the number and location of the pixels that are switched to a transparent state, at a given time.

The control device may itself be referred to as a "waveguide aperture" or, simply, an "aperture". The control device may be configured such that each opening is switchable between an open position and a closed position such that a plurality of different control device configurations is provided, in which each control device configuration comprises an alternating sequence of open and closed portions of the control device.

The control device may be configured to provide a first control device configuration at a first time and a second control device configuration at a second time, wherein the first control device configuration and second control device configuration are complementary. For example, in the first control device configuration, the control device may enable light of a first part of the image to reach the first viewing position and light of a second part of the image to reach the second viewing position, and in the second control device configuration the control device may enable light of the second part of the image to reach the first viewing position and light of the first part of the image to reach the second viewing position.

A time interval between the first time and second time may be less than the typical integration time of the human eye.

In the first control device configuration, the control device may deliver light modulated in accordance with first and third image zones of a first image to the first viewing position and light modulated in accordance with second and fourth image zones of a second image to the second viewing position, wherein the first to fourth zones of each image are ordered, contiguous areas of that image.

In the second control device configuration, the control device may deliver light modulated in accordance with second and fourth image zones of the image to the first viewing position and light modulated in accordance with the first and third of the image to the second viewing position.

The image content of each zone, as delivered to the first viewing position, may be non-identical to the image content of each corresponding zone, as delivered to the second viewing position. In other words, the hologram (or holograms) may be calculated such that image content is divided into a first set of zones for delivery to the first viewing position and the image content is divided into a second set of zones for delivery to the second viewing position, wherein the apportionment of image content into each zone takes into account the perspective, of the corresponding viewing position, of the holographically reconstructed image that is to be seen (or perceived) by the viewing system. For example, the first viewing position may see the image as being translated, or displaced, as compared to how and where the second viewing position sees the image.

According to an aspect, a method is provided of controlling light propagation in a light engine, to form an image visible from a viewing window, wherein the light engine comprises a display device, a waveguide pupil expander and a viewing system within the viewing window. The method comprises displaying, on the display device, a hologram of the image and illuminating the display device to spatially modulate the light in accordance with the hologram. The hologram is configured to angularly distribute spatially modulated light of the image in accordance with position of image content, such that angular channels of the spatially modulated light correspond with respective continuous regions of the image. The method further comprises arranging the waveguide pupil expander to receive the spatially modulated light and to provide a respective plurality of different light propagation paths for the spatially modulated light from the display device to the viewing window, and controlling propagation of the plurality of different light propagation paths using a control device disposed between the waveguide and the viewing window, wherein the control device comprises at least one aperture. The step of controlling propagation of the plurality of different light propagation paths comprises configuring the control device so that a first viewing position within the viewing window receives a first channel of light spatially modulated by the hologram in accordance with a first region of the image and a second viewing position within the viewing window receives a second channel of light spatially modulated by the hologram in accordance with a second region of the image.

The method may further comprise calculating the hologram of the image. The hologram may comprise two or more holograms, or sub-holograms, which are displayed simultaneously or that are combined to form the hologram.

The step of configuring the control device may comprise allowing transmission of light through a first portion of the control device and preventing transmission of light through a second, different portion of the control device. It may further comprise allowing transmission of light through one or more further portions of the control device and/or preventing transmission of light through one or more respectively other further portions of the control device.

The waveguide pupil expander may comprise a plurality of transmission points, and wherein each of the plurality of different light propagation paths is transmitted from a different respective transmission point. Each transmission point may comprise a region, or area, on an output face of the waveguide pupil expander.

The method may further comprise identifying a first transmission point from which light of a first angular channel would propagate to the first viewing position, in the absence of the control device, identifying a second, different transmission point from which light of the first angular channel would propagate to the second viewing position, in the absence of the control device, and configuring the control device to block either a light path of the first angular channel to the first viewing position or a light path of the first angular channel to the second viewing position, at a selected time (t). For example, the method may comprise alternately blocking the light path of the first angular channel to the first viewing position and blocking the light path of the first angular channel to the second viewing position, during a selected time period, which includes the selected time (t). The alternation may be carried out very quickly, for example faster than the typical integration time of a human eye.

The method may further comprise identifying a plurality of continuous regions within the image, wherein each continuous region corresponds to light of a different respective angular channel, and configuring the control device to permit the light of a first sub-set of continuous regions, within said plurality, to be transmitted only to the first viewing position and to permit the light of a second, different sub-set of continuous regions, within said plurality, to be transmitted only to the second viewing position, within a selected time period. The first and second sub-sets may combine to provide all of the image content for the image.

Embodiments describe pupil expansion in one-dimension but the present disclosure extends to two-dimensional pupil expansion using, for example, a first elongate waveguide to expand in a first dimension and second waveguide to expand in the second, perpendicular dimension. In accordance with embodiments, the control device is located after the first waveguide pupil expander. The light engine of this disclosure may therefore comprise a second waveguide pupil expander. The control device disclosed herein may be positioned between the first and second waveguide pupil expander. In some embodiments, the control device is not immediately adjacent to the exit of the first waveguide. In some embodiments, the control device is located immediately before the entrance to the second pupil expander. In other embodiments, the control device is located downstream of the second waveguide pupil expander—i.e. between the second waveguide pupil expander and viewing window.

The transmissivity of the control device (i.e. the apertures or shutters disclosed herein) may be switchable in a direction substantially parallel to the straight line joining the centres of the entrance pupils of the viewing systems. The aperturing or shuttering may be only one-dimensional, for example, in the horizontal direction even in the case of 2D pupil expansion. The open or closed apertures provided by the control device may be switchable in the direction of pupil expansion of the first waveguide pupil expander. That is, in an elongate dimension of the first waveguide pupil expander.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction may be a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object (i.e. target image for reconstruction). Such a holographic recording may be referred to as a phase-only hologram. Embodiments relate to a phase-only hologram but the present disclosure is equally applicable to amplitude-only holography. The present disclosure is not limited to any particular method of hologram calculation. Some embodiments relate to point cloud holograms—that is, holograms built up using point cloud methods—by way of example only. However, the present disclosure is equally applicable to Fourier or Fresnel-type holograms and holograms calculated according to other techniques such as coherent ray tracing.

The present disclosure is also equally applicable to forming a holographic reconstruction using amplitude and phase information related to the original object (i.e. target image). In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 6b shows a magnified view of the optical paths of FIG. 6a;

FIG. 14 shows a flow chart of a further improved method to derive an improved data structure in accordance with embodiments;

FIG. 17 shows a waveguide and a viewing system;

FIG. 23A shows a desired image to be received by a left eye, divided into zones;

FIG. 23B shows a desired image to be received by a right eye, divided into zones;

FIG. 23C shows image zones received by a viewer in a first phase of a control device in accordance with embodiments;

FIG. 23D shows image zones received by a viewer in a second phase of a control device in accordance with embodiments;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
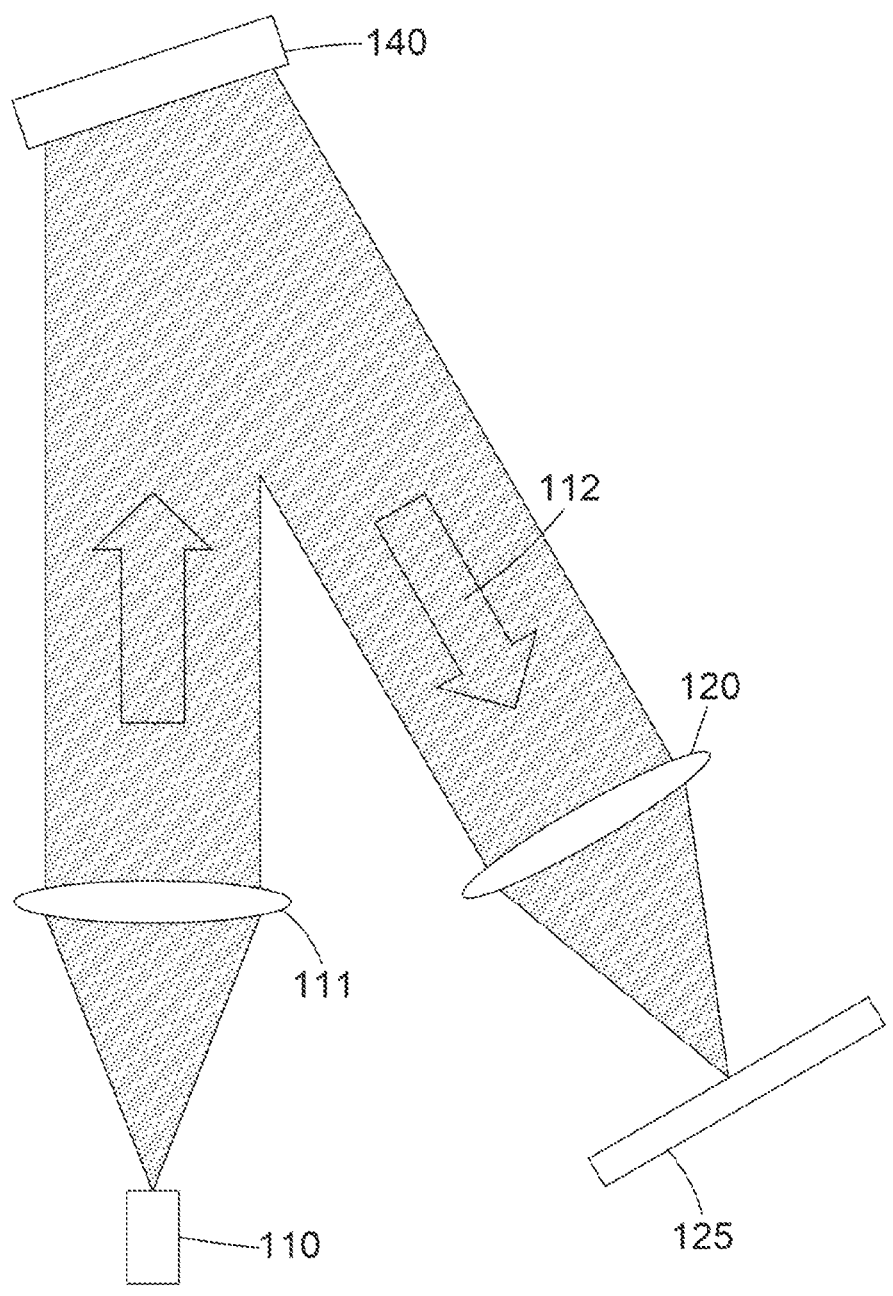
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It will be appreciated that this is merely an example, and that other methods for computer-generating the hologram are contemplated in the present disclosure. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
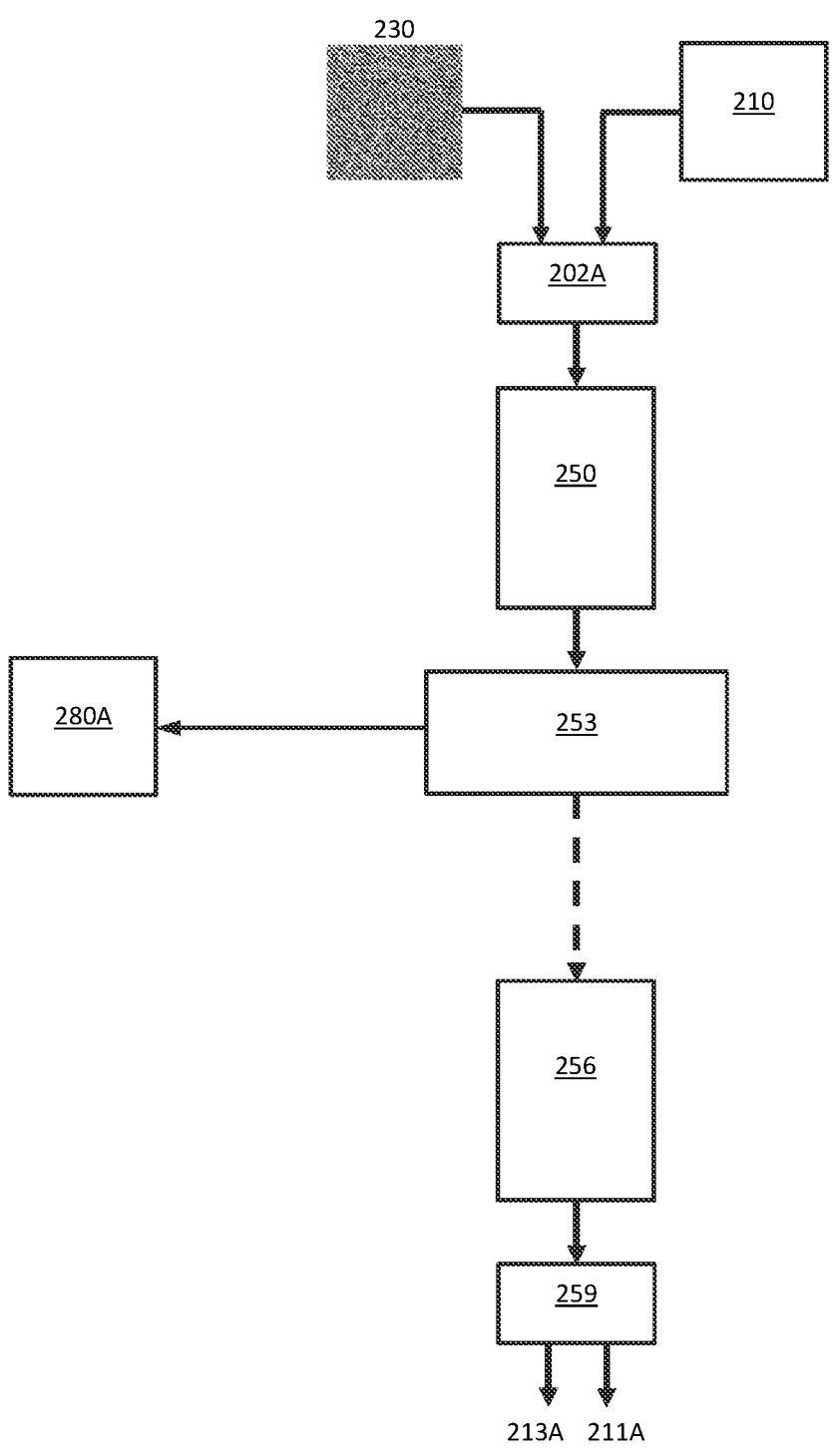
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
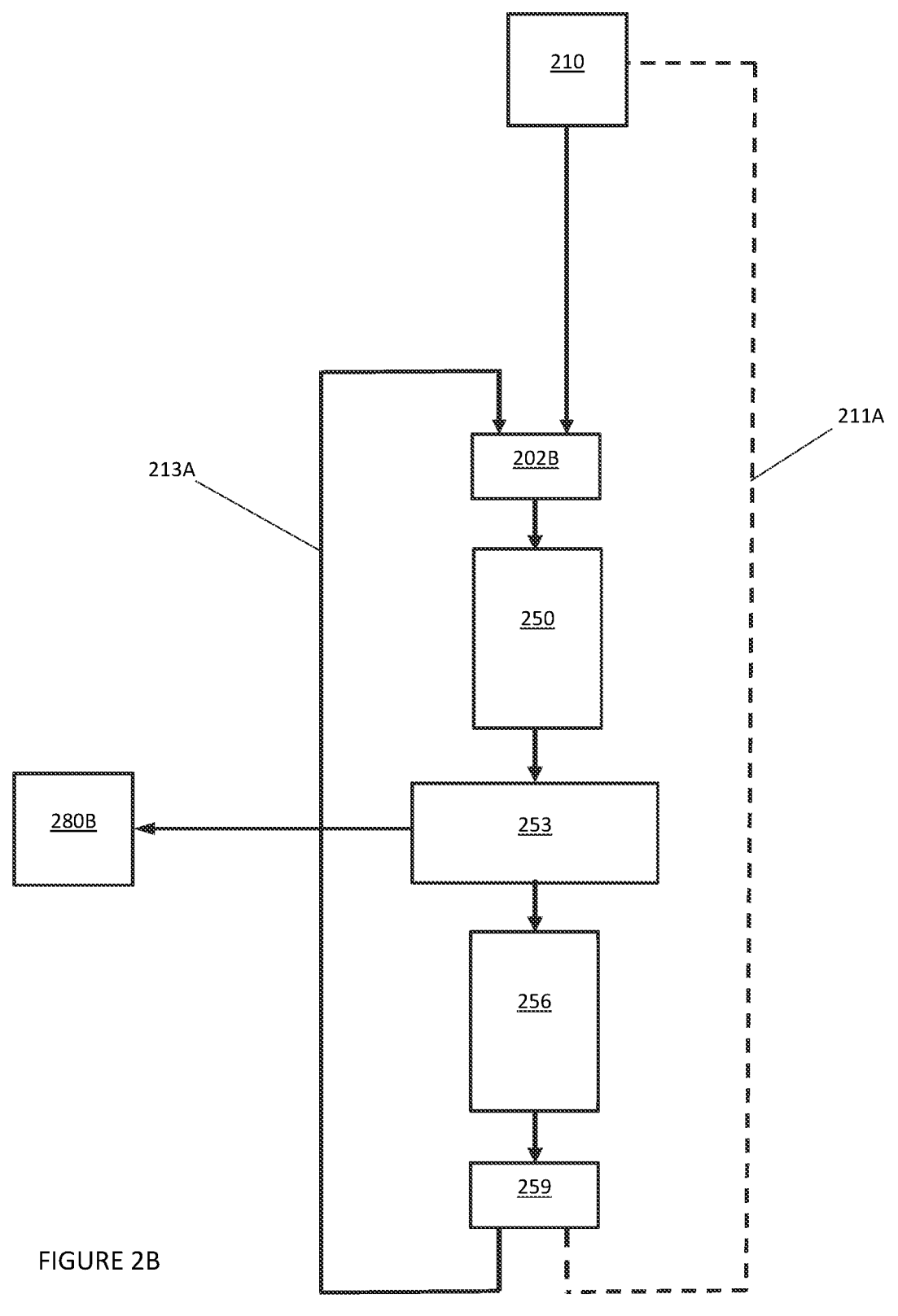
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
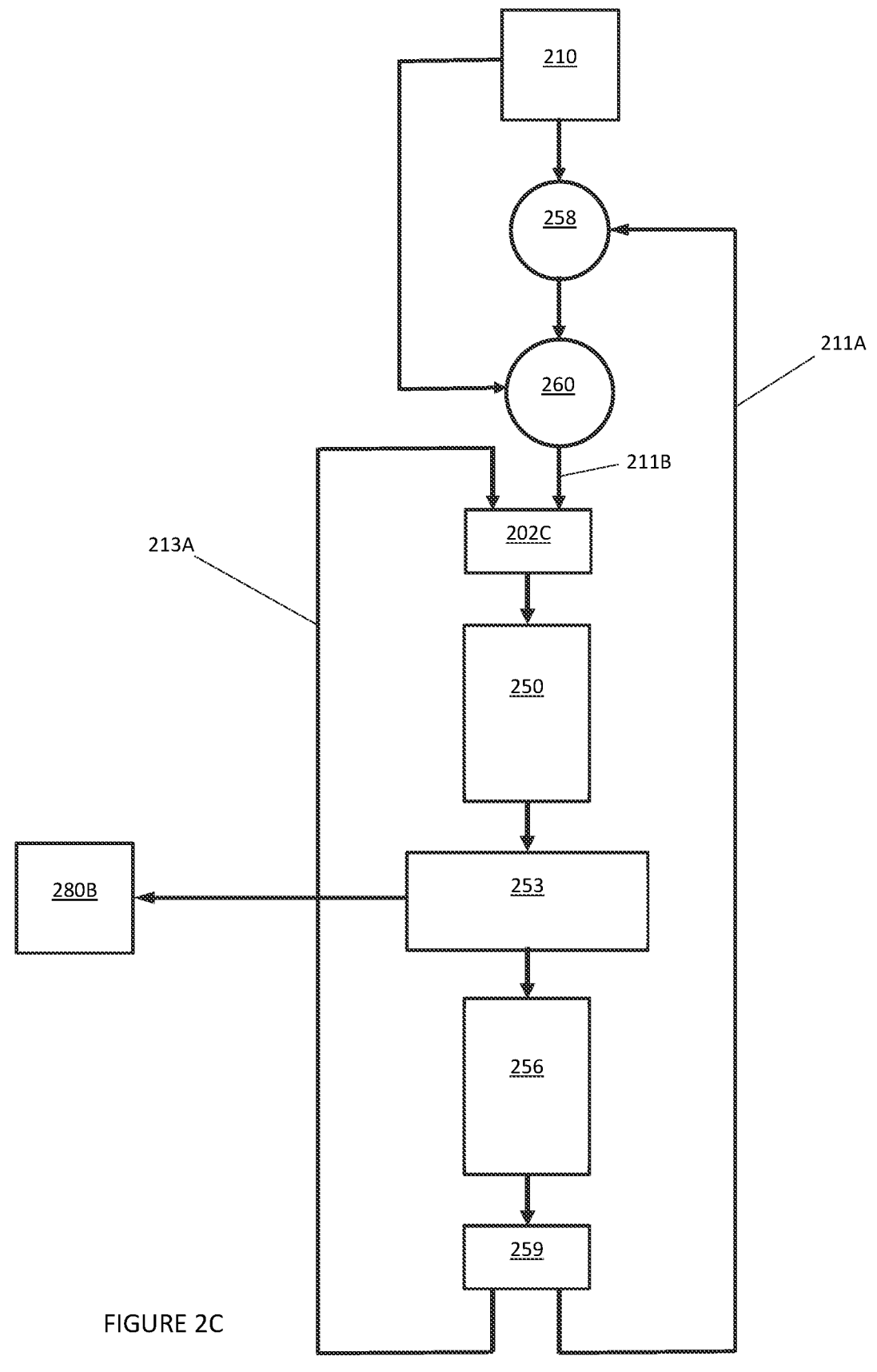
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:

F' is the inverse Fourier transform;

F is the forward Fourier transform;

R[x, y] is the complex data set output by the third processing block 256;

T[x, y] is the input or target image;

$\angle$ is the phase component;

$\psi$ is the phase-only hologram 280B;

$\eta$ is the new distribution of magnitude values 211B; and $\alpha$ is the gain factor.

The gain factor $\alpha$ may be fixed or variable. In some embodiments, the gain factor D is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\psi(u, v)$ comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods. As will be seen, subsequent Figures herein are described as comprising a point cloud method for hologram calculation. However other methods of hologram calculation, including the Fourier method described above in relation to FIGS. 2A to 2C, may instead be used.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
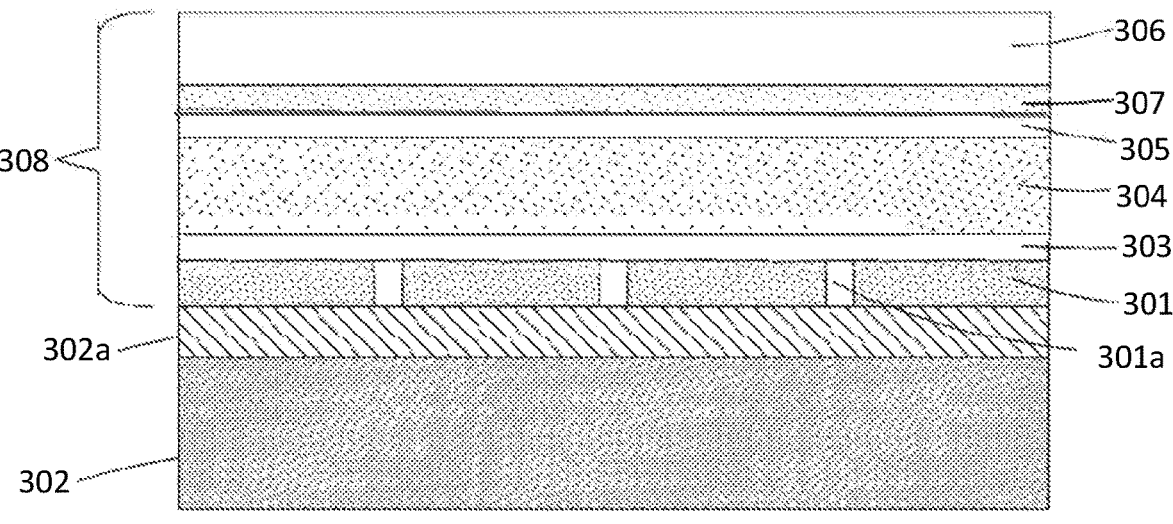
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e. distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The display device comprises pixels that display the hologram. The pixel structure of the display device is diffractive. The size of the holographic image is therefore governed by the rules of diffraction. A consequence of the diffractive nature of the display device is explained below with reference to FIG. 4.

Figure 4:
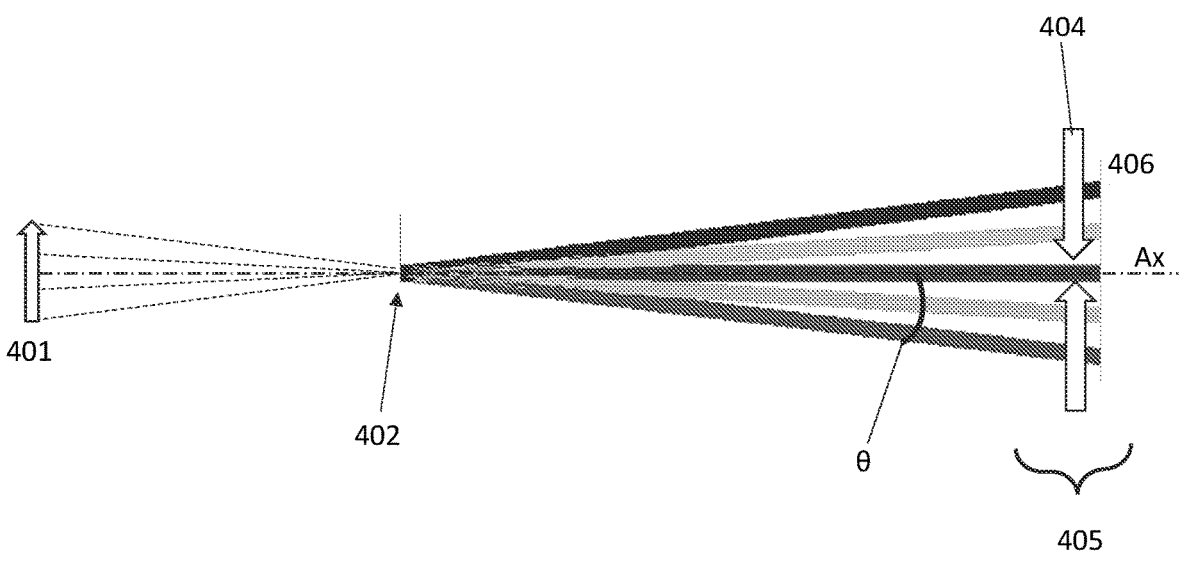
FIG. 4 shows angular content of a virtual image effectively propagating from a display device towards an aperture.

FIG. 4 shows a pixelated display device 402 arranged to display a hologram forming a virtual image 401 upstream of the display device 402. The diffraction angle, q, of the display device determines the size of the virtual image 401. The virtual image 401, display device 402 and viewing system 405 are arranged on an optical axis, Ax.

The viewing system 405 has an entrance aperture 404 and viewing plane 406. The viewing system 405 may be a human eye. The entrance aperture 404 may therefore be the pupil of the eye and the viewing plane 406 may be the retina of the eye.

The light travelling between the display device 402 and viewing system 405 is modulated with a hologram of the image (not the image itself). However, FIG. 4 illustrates how the hologram divides the virtual image content by angle. Each illustrated light ray bundle relates to a different part of the virtual image 401. More specifically, the light in each light ray bundle is encoded by the hologram with information about one part of the virtual image. FIG. 4 shows five example ray bundles each characterized by a respective angle to the optical axis, Ax, and each representing a respective part of the virtual image. In this example, one of the light bundles passes through the pupil 404 and the other four light bundles are blocked by the pupil 404. Again, the five different ray bundles correspond to five different parts of the virtual image 401. The full image content of the virtual image is effectively divided by angle. The light bundle travelling along the optical axis, Ax, carries the centre part of the image information—that is, the information relating to the centre of the image. The other light bundles carry the other parts of the image information. The two light bundles shown at the extremes of the light cone carry the edge parts of the image information. A consequence of this division of the image information by angle is that not all image content can pass through the entrance aperture 404 of the viewing system at a given viewing position. In other words, not all image content is received by the eye. In the example of FIG. 4, only one of the five light bundles illustrated passes through the pupil 404 at any viewing position. The reader will understand that five light bundles are shown by way of example only and the process described is not limited to division of the image information of the virtual image into only five light bundles.

In this example, the centre part of the image information is received by the eye. The edge part of the image information is blocked by the pupil of the eye. The reader will understand that if the viewer moves up or down, a different light bundle may be received by the eye and, for example, the centre part of the image information may be blocked. The viewer therefore only sees a portion of the full image. The rest of the image information is blocked by the entrance pupil. The view of the viewer is heavily restricted because they are effectively looking at the image through the small aperture of the display device itself.

In summary, light propagates over the range of diffraction angle from the display device. At a 1 m viewing distance, only a small range of angles from the display device can propagate through the eye's pupil to form image at the retina for a given eye position. The only parts of the virtual image that are visible are the ones falling within the small angular range shown in FIG. 4 that passes through the entrance aperture. Accordingly, the field of view is very small, and the specific angular range depends heavily on the eye position.

The problem of the small field of view and sensitivity to eye position explained with reference to FIG. 4 is a consequence of the large viewing distance and small aperture of the display device. The importance of viewing distance is explained further with reference to FIGS. 5 to 7.

Figure 5A:
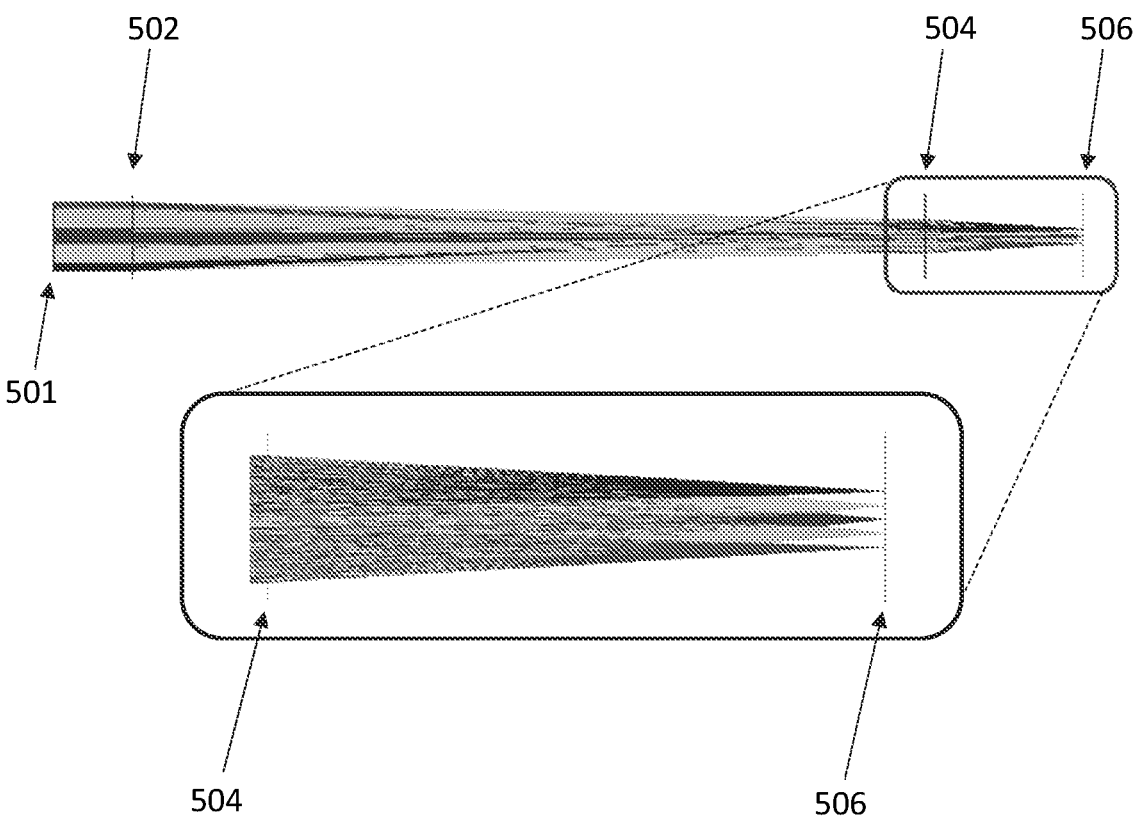
FIG. 5a shows a viewing system with a relatively small propagation distance.

FIG. 5A shows a display device 502 arranged to display a hologram and propagate light modulated in accordance with the hologram to a viewing system comprising an entrance aperture 504 and viewing plane 506. The virtual image 501 is at infinity and so the rays traced between the virtual image and display device are collimated. The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

FIG. 5A only shows those rays of light that can propagate through the aperture 504; any other rays, which cannot pass through the aperture 504, are omitted. However, it will be understood that those other rays would also propagate from the display device 502, in practice. In FIG. 5A, the distance between the display device and viewing plane is small enough that the full diffraction angle from the display device can form the image on the retina. All light propagation paths shown from the virtual image pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
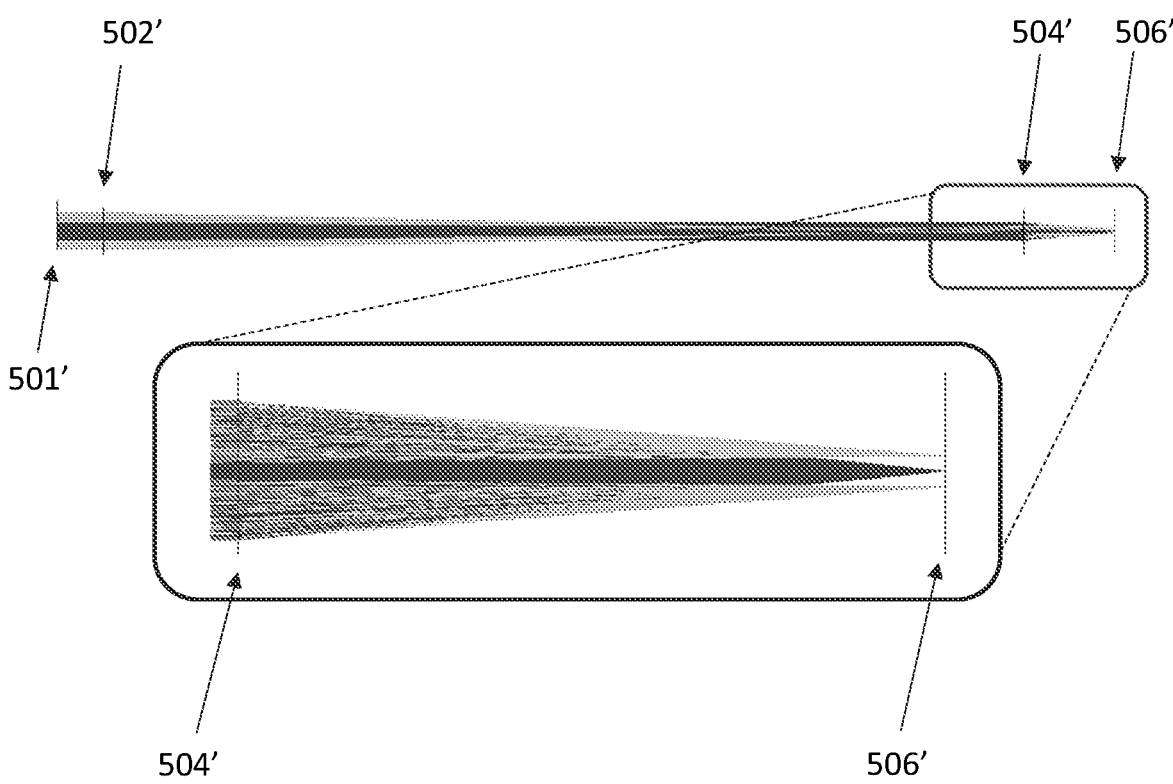
FIG. 5b shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image 501' and display device 502' are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'. At the larger viewing distance of FIG. 5B, some of the ray bundles are blocked by the entrance aperture 504'. Specifically, ray bundles associated with edge parts of the virtual image are blocked by the entrance pupil 504'. Accordingly, the entire virtual image is not visible and the part of the virtual image that is visible is heavily dependent on eye position. Thus, large distances between the display device and viewing system are problematic owing to the small size of the display device.

Figure 6A:
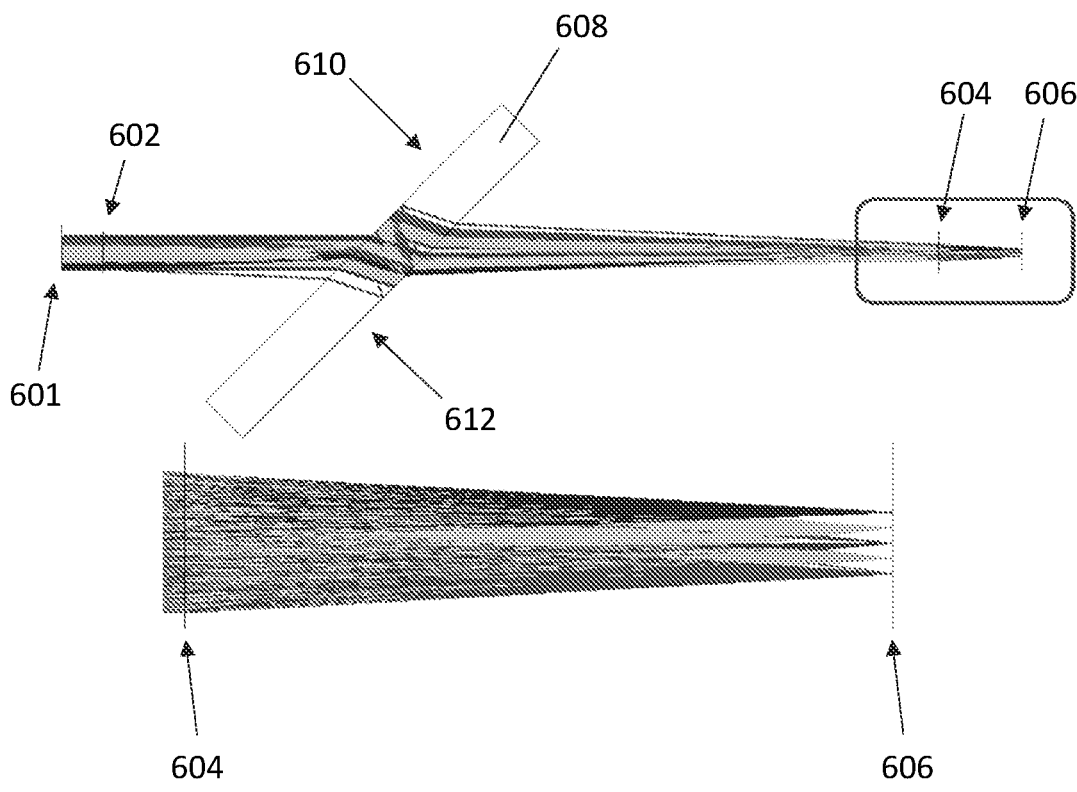
FIG. 6a shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 606. This figure is schematic and therefore physiological detail of the eye is not shown.

The viewing distance of FIG. 6A is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612. Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
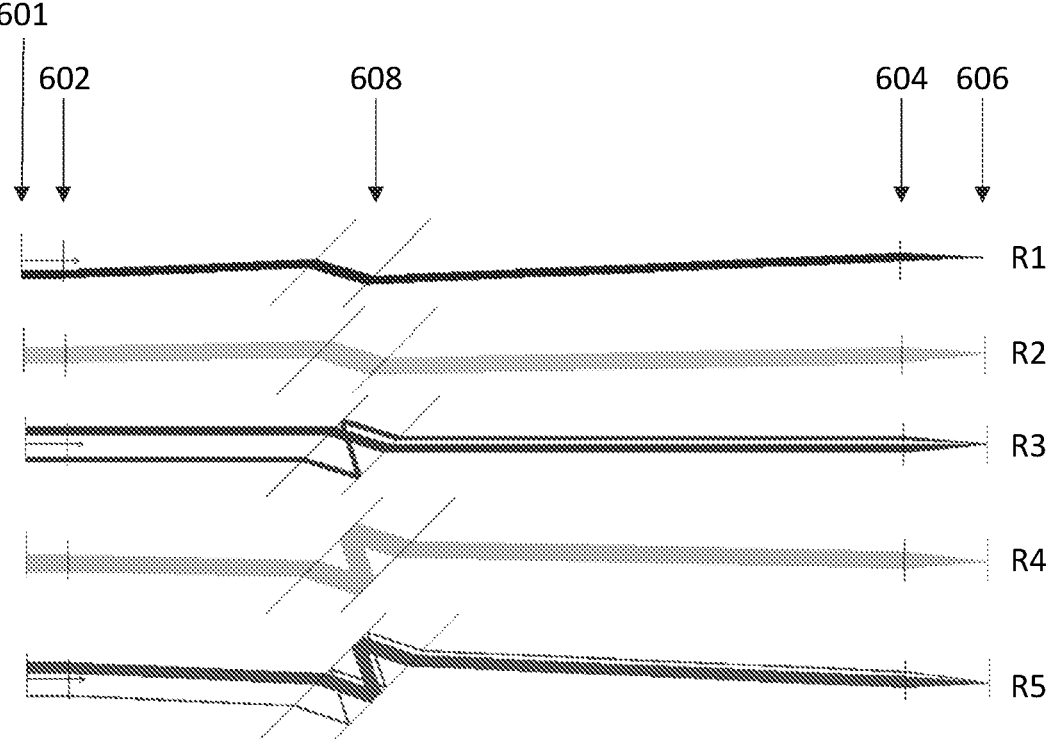

FIG. 6B shows the individual optical paths for each of the five ray bundles that contribute to five respective image points within the virtual image 601 that is formed in FIG. 6A—labelled from top to bottom as R1 to R5, respectively.

As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

The present inventors have recognised that, at least in some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few metres, for example 3 metres or 5 metres, in front of the viewer's vehicle or windscreen.

Figure 7:
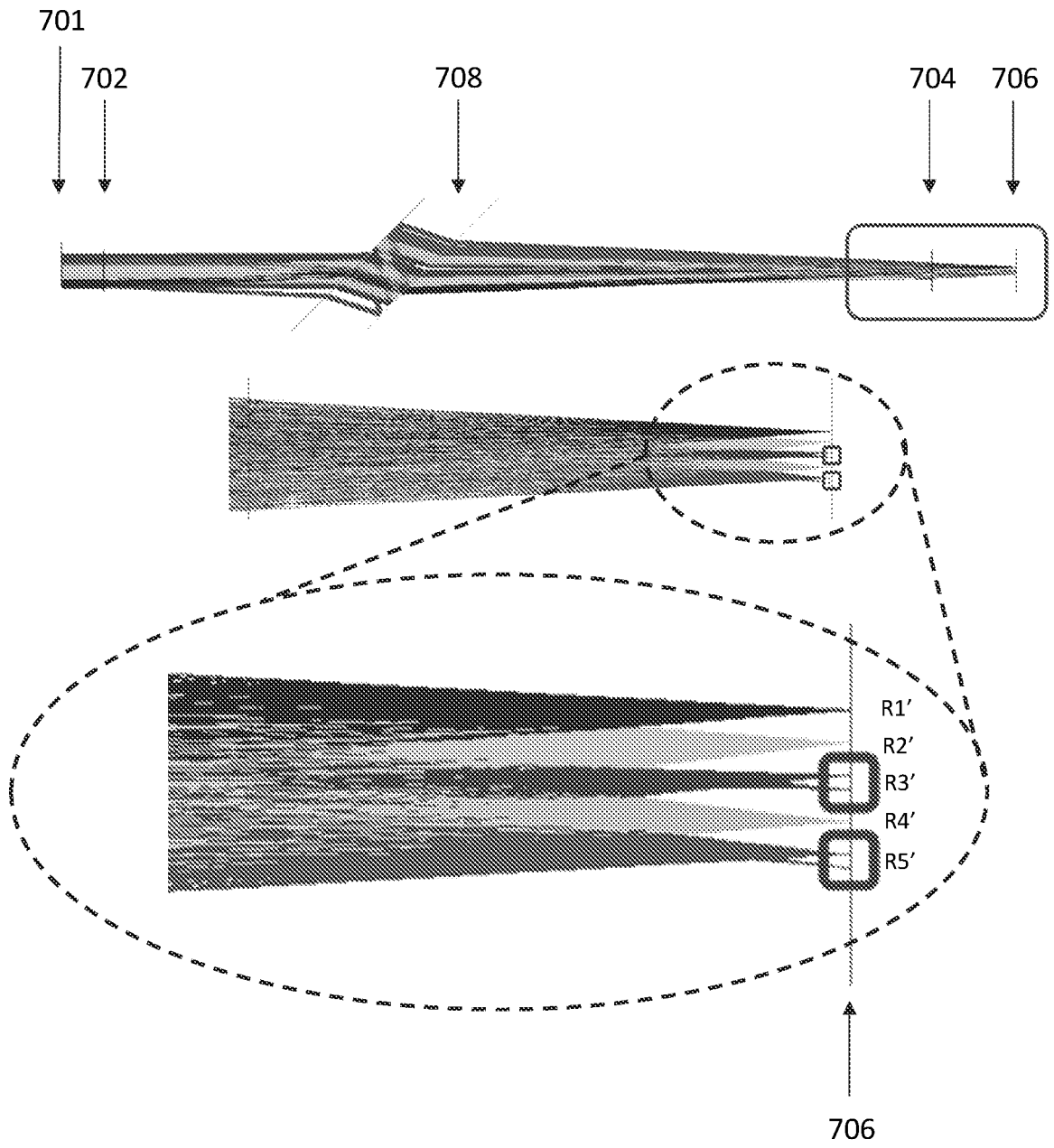
FIG. 7 shows how with a finite virtual image and waveguide pupil expander, ghost images can be formed.

The top part of FIG. 7 shows a system comprising a display device 702 propagating light 703, that has been encoded with (i.e., modulated in accordance with) a hologram displayed on the display device 702, towards an eye that comprises an entrance aperture 704 and a viewing plane 706. There is a light source (not shown) arranged to illuminate the display device 702. The system further comprises a waveguide 708 positioned between the display device 702 and the entrance aperture 704, to act as a pupil expander as described in detail in relation to FIG. 6a, above. The middle part of FIG. 7 shows a magnified view of the entrance aperture 704 and the viewing plane 706, and the lowest part of FIG. 7 shows a further magnified view of the viewing plane 706. This Figure is schematic and therefore physiological detail of the eye is not shown. In this arrangement, the eye perceives the virtual image 701 as being located at a finite distance, upstream of the display device 702. The rays between the virtual image 701 and display device 702 are divergent because the virtual image distance is finite.

As per FIG. 6A, above, the presence of the waveguide 708 in FIG. 7 effectively enables the full diffractive angle of the display device 702 to be accessed at a relatively large projection distance, such that the full image content is visible to the user at the viewing position shown.

However, a further technical problem is introduced. The different optical paths of light from different parts of the display device 702, for certain of the ray bundles, can lead to those ray bundles each forming multiple image points on the retina 706 when the virtual image is formed at a finite virtual image distance. This is shown in relation to the ray bundles labelled R3' and R5' in FIG. 7a. The additional image points that are formed, which are subsidiary to a main image point for a given point within the virtual image, can be referred to as 'ghost image points' and collectively they form 'ghost images' or simply 'ghosts'. As the person skilled in the art of image formation will appreciate, the formation of ghosts can cause blurring and a general decrease in the perceived quality of a virtual image, from the viewer's perspective. This is particularly true if the "ghost" partially overlaps the "main" image.

Figure 8:
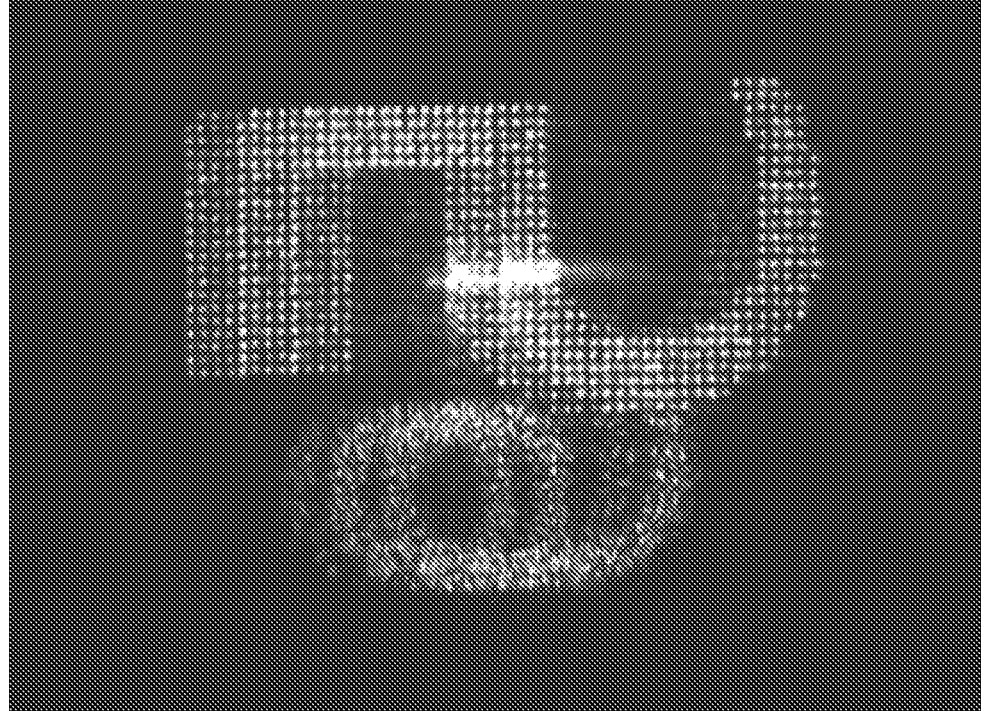
FIG. 8 shows a virtual image that comprises a primary image and two ghost images.

FIG. 8 shows an example of a virtual image of the numbers '5' and '9', created using a viewing system similar to that shown in FIG. 7a, that includes ghost images in addition to a main image. The main image can be seen as the brightest, central image for each number, with ghosts to the left and the right. In the example of FIG. 8, the '9' is formed when the viewing distance is larger than it is for the '5', therefore the blurring is more pronounced for the '9'.

The inventors have addressed the problem of the ghost images. The inventors have recognised that it is desirable to provide a viewing system in which a virtual image can be formed at a finite virtual image distance, which comprises all the angular image content that is output by a display device, and which reduces or removes the formation of ghost images. Moreover, the inventors have found that, as the size of a viewing aperture increases in a conventional viewing system, the risk of forming ghost image points increases, because the aperture can admit additional light rays, which may form additional image points on the display plane. Therefore, it is desirable to provide an improved viewing system that can accommodate apertures of different sizes, whilst still reducing or removing the formation of ghost images. The solutions provided by the inventors, detailed below, are applicable to a range of different sizes of—and arrangements of—aperture, waveguide, and display device, and may be applied for different propagation distances, for which one or more ghost images may conventionally be formed.

In overview, the inventors have recognised that it is possible to provide a light engine for generating a hologram that, in effect, identifies one or more areas of a display device that would, in a conventional arrangement, contribute to one or more ghost images, wherein the hologram is derived in order to control the contributions from those one or more areas of the display device, and thus to avoid or reduce the formation of ghost image points when the hologram is displayed on the display device and illuminated. The inventors have further recognised that it is possible to provide a hologram engine for provision of such a hologram, and to provide an improved viewing system for the display and illumination of an improved hologram, for the formation of improved images, even when the projection distances in the viewing system are relatively large and the display device and/or the viewing aperture is relatively small.

The inventors have recognised that, because of the angular restrictions imposed by having a viewing system that includes a waveguide—such as that shown in FIGS. 6A and 7A herein—comprising a relatively small viewing aperture, and optionally also a relatively small display device, it is possible to consider the different possible propagation paths within the waveguide separately. Moreover, they have recognised that, as a result of such consideration, it is possible to identify each of: areas of the display device that are the source of light contributing to a desired 'main' image; areas of the display device that are the source of light contributing to an undesirable 'ghost' image; and areas of the display device that are the source of light that is blocked by the aperture and thus do not contribute to either the main image or a ghost image. The inventors have further recognised that it is possible to limit the hologram calculation to only areas of the display device that contribute to the main image.

The recognitions made by the inventors, and the improved systems and methods embodying those recognitions, may be further understood with reference to the figures as detailed below.

Figure 9A:
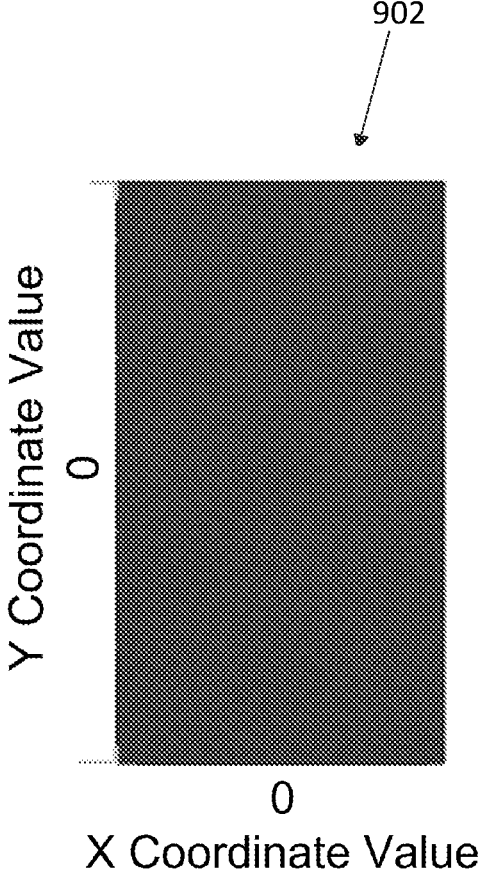
FIGS. 9A to 9C shows an example in which the entire LCOS is used to form an primary image point and two corresponding ghost image points.
Figure 9B:
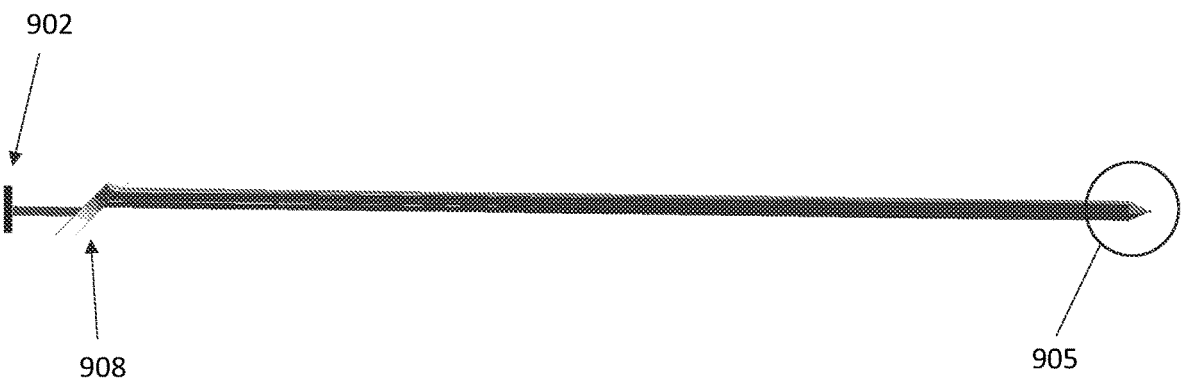
Figure 9C:
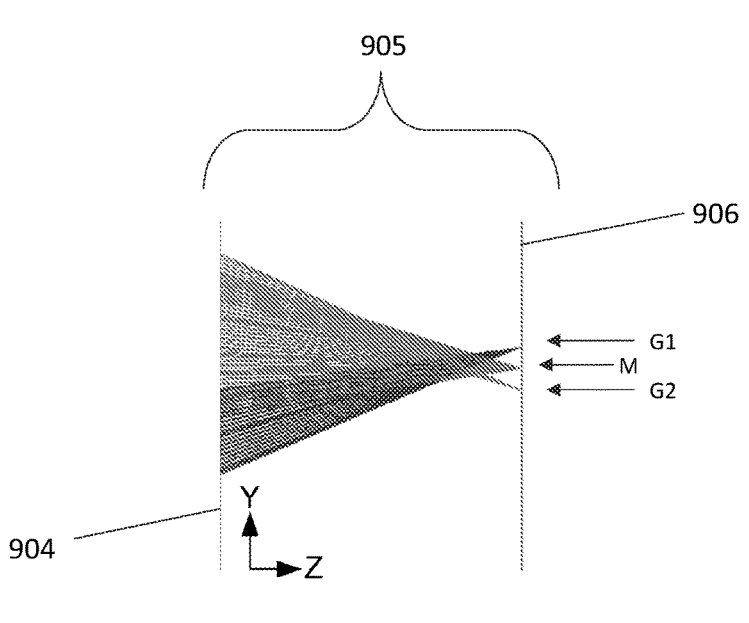

FIG. 9 shows a display device 902, which in this example is an LCOS spatial light modulator. Reference to "LCOS" in the following is made as shorthand for "display device". The teachings of the present disclosure are not limited to an LCOS display device. FIG. 9 traces the light rays in relation to one virtual image point from the LCOS 902, via a waveguide 908, towards a viewing entity/system 905, which in this example comprises a viewer's eye. FIG. 9 further comprises a magnified view of the eye 905, showing the rays at the pupil 904 (i.e., the entrance aperture) and the retina 906 (i.e., the sensor or viewing plane). In this example, the entire LCOS area contributes to formation of the image point on the retina 906. In other words, the entirety of the LCOS 902 is 'visible' to the viewer. This contribution of the entire LCOS 902, to the image, is illustrated by the entirety of the LCOS being shaded, denoting its whole surface area as a 'contributory area'.

As can be seen, the light traced from the LCOS 902 in FIG. 9 leads to the formation of three image points—labelled as G1, M and G2, respectively—on the retina 906 for this particular virtual image point. The middle image point 'M' comprises a main image point, which contributes to the primary/main virtual image perceived by the viewer. The top image point G1 comprises a first ghost image point and the bottom image point G2 comprises a second, different ghost image point of the same virtual image point. Notably, in a yet further advancement, the inventors have recognised that it is possible to identify the region(s) of the LCOS 902 that contribute to the main image point M and/or to the ghost image points G1, G2.

Figure 10A:
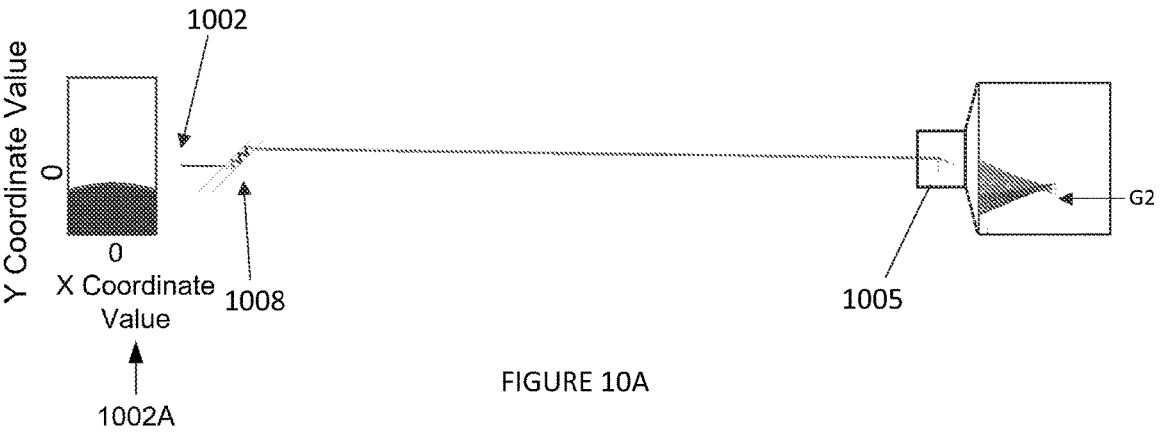
FIGS. 10A to 10C shows first, second and third propagation paths through a waveguide giving rise to a second ghost point, main image point and first ghost point, respectively.
Figure 10B:
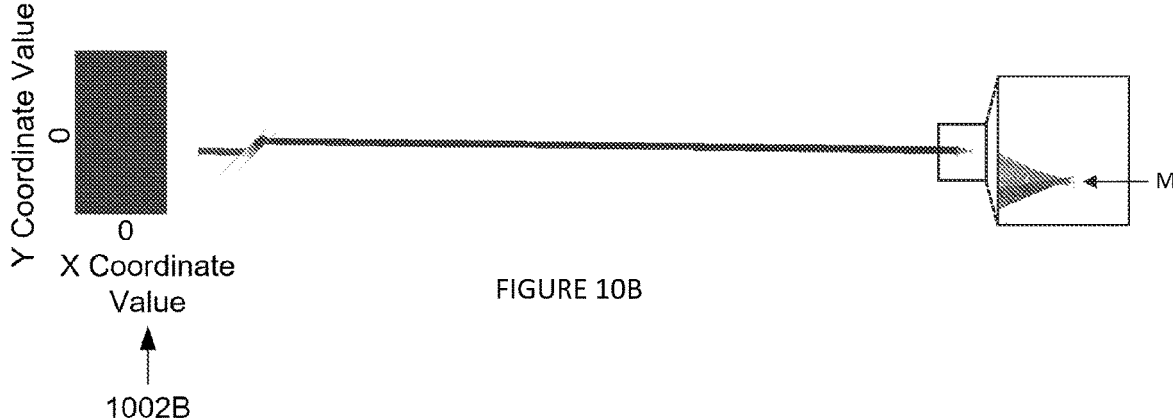
Figure 10C:
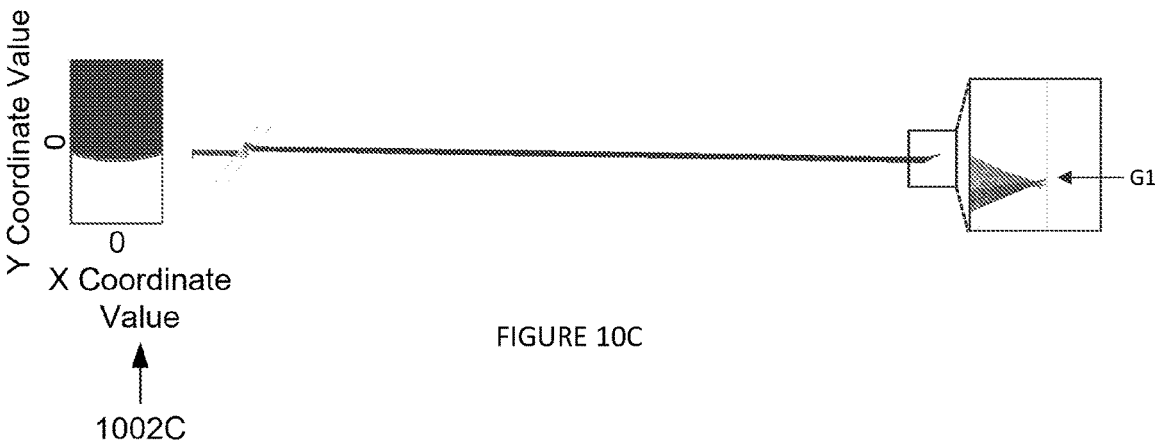

FIGS. 10A to 10C show the LCOS 902 and ray diagram of FIG. 9 divided up into three respective propagation paths—the first of which comprises the light that contributes to the bottom ghost image point G2, the second of which comprises the light that contributes to the main image point M, and the third of which comprises the light that contributes to the top ghost image point G1. As can be seen in FIG. 10A, the light that contributes to G2 bounces three times before being transmitted by the waveguide 908. As can be seen in FIG. 10*b*, the light that contributes to M bounces twice before being transmitted by the waveguide 908. As can be seen in FIG. 10C, the light that contributes to G1 bounces once before being transmitted by the waveguide 908.

Each FIG. 10A, 10B, 10C) also shows, illustrated by shading, the portion(s) of the LCOS 902 that contribute to the respective image point. Thus, it can be seen that the bottom ghost image point G2 is contributed to by a region towards the lower part of the LCOS 902, the top ghost image point G1 is contributed to by a region towards the upper part of the LCOS 902, and the main image point is contributed to by the entire LCOS 902.

The aperture 904 (i.e., the viewer's pupil) is relatively wide in the example of FIGS. 9 and 10*a* to 10*c*, which explains why the entire LCOS 902 contributes to the main image point. In other words, the f-number of the viewing system is relatively low in this example. FIGS. 10A to 10C show that, although parts of the LCOS 902 also contribute to one or other ghost image G1, G2, there is a region of the LCOS 902 that contributes to neither ghost image G1, G2, but only contributes to the main image point M. The inventors have recognised that this region may be identified as being a contributory area, for the LCOS 902 in this example—more specifically, it may be identified as being a 'primary contributory area', as will be understood further from the description of the subsequent Figures. It can therefore be seen, in this case, that the primary contributory region is not limited to being a circle or ellipse and may take other more complex shapes.

Figure 11A:
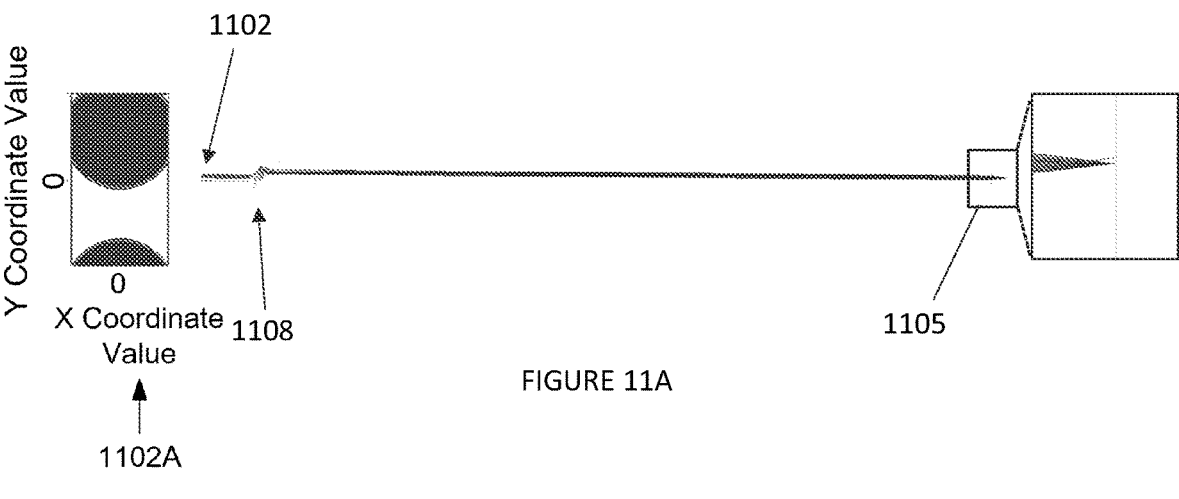
FIG. 11A to 11C shows three the propagation path and LCOS utilisation in relation to three different field/image points.
Figure 11B:
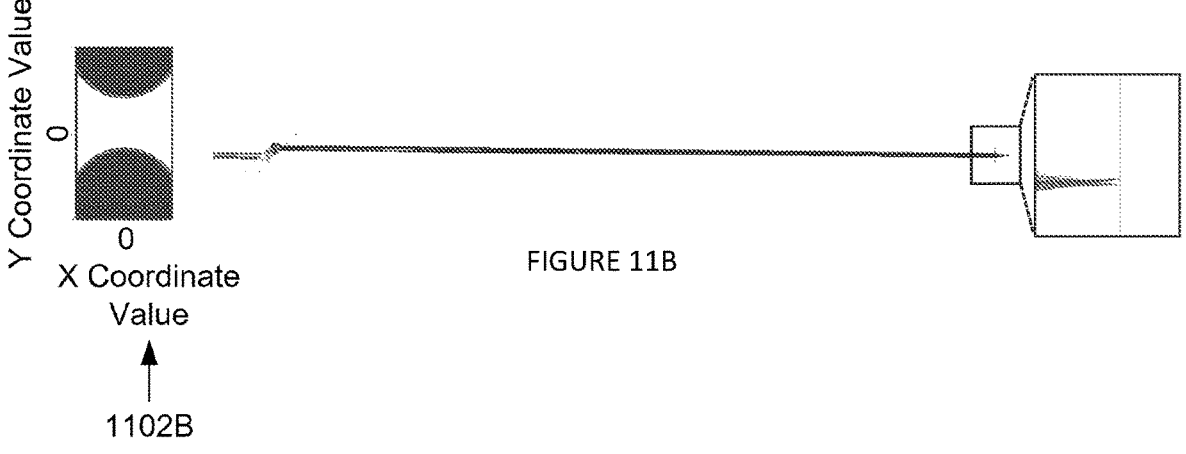
Figure 11C:
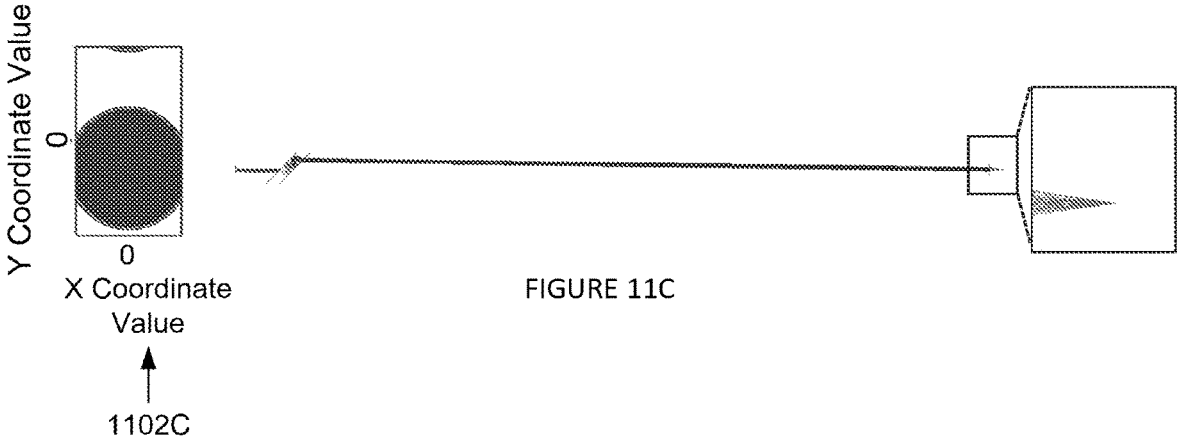

FIGS. 11A to 11C show the corresponding ray diagrams for different points of the virtual image when the entrance aperture is relatively small (i.e. the f-number is relatively high). FIG. 11A relates to a first field point of the virtual image (i.e. a first virtual image point), FIG. 11B relates to a second field point of the virtual image and FIG. 11C relates to a third field point of the virtual image. FIGS. 11A to 11C show that not all of the LCOS 902 contributes to the main image point. In fact, FIGS. 11A to 11C show that a first region of the LCOS correspond to the main image points (herein refer to as a "primary contributory area") and a second region of the LCOS corresponding to the ghost image points (herein referred to as a "secondary contributory area").

The inventors have recognised that, under certain conditions, different respective regions of the LCOS 902 (or other display device, in a viewing system) will contribute either to a main image or to a ghost image or will not contribute to any visible part of an image. They have further recognised that the hologram determination process can be optimised using this information. For example, light from certain parts of the display device may be omitted, or, in some cases, the manner in which they are encoded, by the hologram, may be changed so as to contribute positively to the main image, instead of contributing to a ghost image. Furthermore, additional areas of the display device may be identified, which may be configured to contribute to positively to the main image.

The recognitions made by the inventors will be described below in relation to point cloud holograms by way of one example. However, they may be applied to other types of hologram such as a Fourier or Fresnel hologram. That is, other hologram calculation methods can be optimised using the LCOS information that can be determined in accordance with this disclosure.

As will be well understood, usually for calculation of a point cloud hologram of an image (such as a virtual image), the image is broken down into (i.e., represented by) a plurality of individual points—referred to herein as 'virtual points', since we describe the formation of virtual images. A spherical wave (or 'wavelet') is then propagated computationally—i.e., using a model or other theoretical tool—from each virtual point, at its intended or desired location, within the virtual image, to the plane of the display device—such as the plane of the LCOS, in the examples described hereabove. The way in which such wavelets would interfere with one another is considered and the resulting amplitude and/or phase of the wavelet that would be received at each pixel of the display device is calculated. The display device can then be tuned, in a manner that is well known and so will not be described herein, to exhibit the amplitude and/or phase modulation that is required at each pixel location, in order to mimic the calculated wavelets, and thus to create a hologram of the image.

The inventors have recognised that, for a viewing system with a waveguide and large viewing distance as described herein, if the entire display device is populated with the net amplitude and phase of the corresponding wavelets of all the virtual points, the hologram that will be created may, when displayed and illuminated, generate one or more ghost images as well as a main image. For example, this may occur when the viewing system is configured so that a virtual image is perceived at a finite distance from the viewer.

Moreover, in many cases, light rays emitted from the pixels in some parts of the device will be wasted (i.e., they will not contribute to the image that the viewer sees or perceives) because the physical constraints of the viewing system (such as a small aperture and/or a small display device and/or a large projection distance) will dictate that light from those parts of the device will not enter the viewer's eye. Therefore, the inventors have recognised that an intelligent selection may be applied, in respect of which portions of the display device are tuned to provide a hologram. Specifically, if only those portions (or, parts, or, regions) of the LCOS that contribute to a main image are selected—and if wavelets are computationally propagated only from the virtual points of the intended virtual image, to those portions of the LCOS—and not to other portions of the LCOS, which do not contribute to the main image—the resulting amplitude and/or phase of the wavelet that would be received at each pixel within the selected region of the display device can be calculated. No calculation is needed for any respective other parts of the display device.

The display device can then be tuned, in accordance with the improved calculation, to exhibit the amplitude and phase modulation that is required at each pixel location, within the selected portion(s), in order to mimic the calculated wavelets, and thus to create a hologram of the main image. When this is done, there will be no tuning of any other portions of the LCOS, and therefore no image information will propagate from those other portions, to the viewer's eye (or other viewing entity), when the calculated hologram is displayed on the display device and illuminated. Therefore, there will be no information available to the viewer, which could lead to it forming an undesirable "ghost" image point. As a result, the ghost(s) is/are eliminated or 'quenched'. Moreover, no computation or image information is wasted, since only those pixels of the display device that are known to provide light that will be admitted through the viewer's pupil (or, through the aperture of a corresponding other viewing entity), for a given set of conditions (such as for a particular aperture width and location of the eye), will be tuned.

Figure 12A:
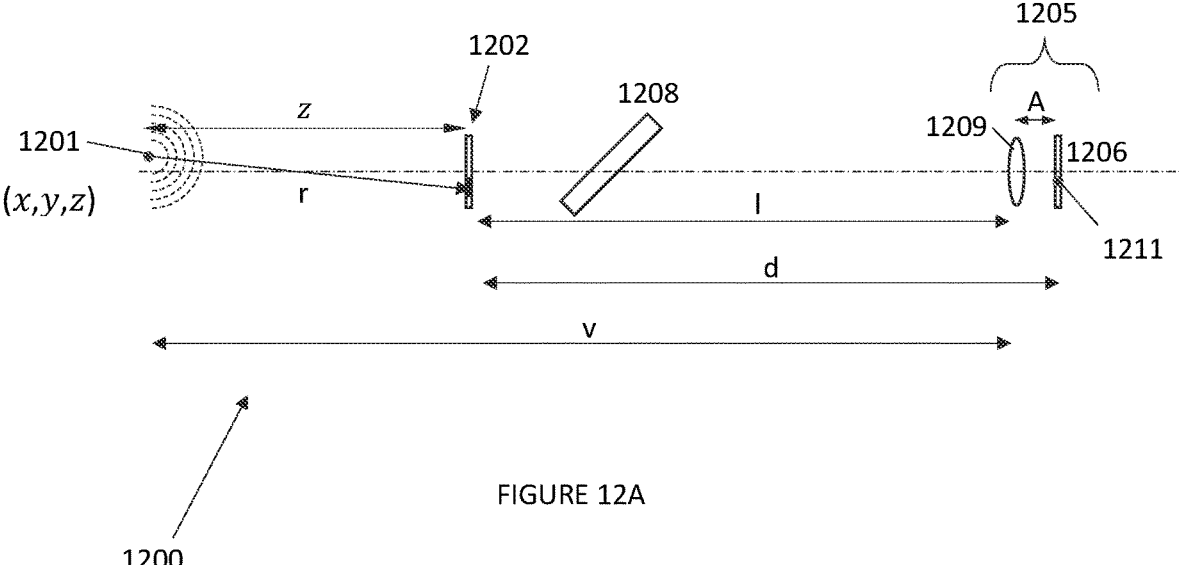
FIG. 12A shows a viewing system including a virtual image point and an image of that virtual image point formed by a viewing system and waveguide.
Figure 12B:
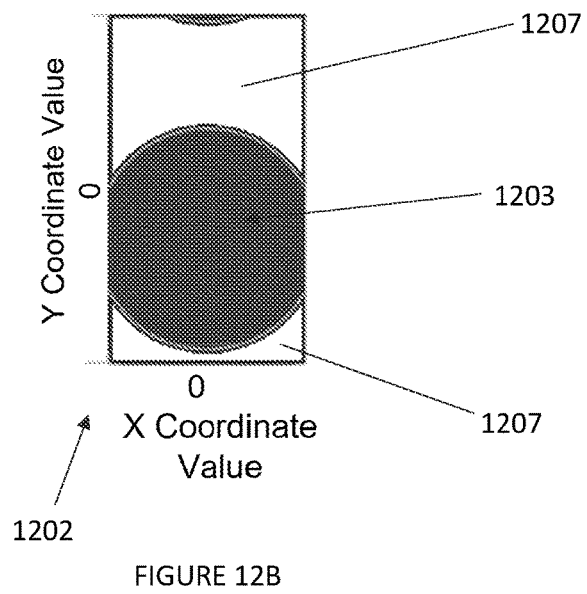
FIG. 12B shows the primary contributory area of the LCOS in relation to the example of FIG. 12A.

FIG. 12 shows a system 1200 forming a virtual image comprising an example virtual point 1201. The viewing system 1200 comprises a display device 1202, which in this example is an LCOS SLM, which comprises a contributory area 1203 and a non-contributory area 1207, identified in accordance with the present disclosure. The display device 1202 is arranged to display a hologram of the virtual image and to project light that has been encoded in accordance with the hologram, towards an eye 1205 that comprises a pupil (not shown) that acts as an aperture, a lens 1209, and a retina 1206 that acts as a viewing plane. The lens 1209 and retina are separated by a separation distance 'A'. There is a light source (not shown) arranged to illuminate the display device 1202. The viewing system 1200 further comprises a waveguide 1208 positioned between the LCOS 1202 and the eye 1205. This image is schematic and therefore physiological detail of the eye is not shown.

The virtual point 1201 is located upstream of the display device 1202, which in FIG. 12 is depicted by the virtual point 1201 being to the left of the display device 1202. The virtual point 1201 has a location defined by spatial coordinates, which in this example comprise Cartesian (x, y, z) coordinates but other coordinate systems or other means of identifying the virtual point's location may be used. A distance 'z' is defined between the virtual point 1201 and the display device 1202, in a direction substantially parallel to the optical axis of the display device 1202. There is also a display-to-lens distance 'l' defined between the display device 1201 and the eye lens 1209, in a direction substantially parallel to the optical axis of the display device 1201. The numerical values of both 'z' and 'l' will vary dependent on the particular arrangements of the viewing system 1200, at a given time, including viewer position. For example, the display-to-lens distance 'l' may be of the order of approximately 1 metre and the display-to-image distance 'z' may be larger, for example of the order of a few metres. But these numerical examples are purely illustrative and should not be regarded as being limiting.

The inventors have recognised that, if a virtual image comprising the virtual image point 1201 is to be perceived, by a viewer, at the location depicted in FIG. 12, a corresponding image point 1211 must be formed on the retina 1206. Light rays can be tracked from the virtual point 1201 of the virtual image to a corresponding point 1211 on the retina 1211, via the LCOS 1202.

It will be appreciated that more than one possible optical path may be taken, between the virtual point 1201 and its corresponding point 1211 on the retina, via the LCOS 1202 owing to the possible paths created/generated by the waveguide 1208. According to embodiments, a chief light ray may be determined, which comprises a light ray path amongst a plurality of light ray paths, between the virtual image point 1201 and the corresponding point 1211, on the viewing plane (i.e., the retina 1206). When this chief ray path is identified, the number of bounces that the light undergoes within the waveguide is determined. That number of bounces (B) can be set as being the number of bounces for which rays should be traced, between the virtual image and the viewing plane. According to embodiments, the chief ray—and the associated number (B) of bounces—may be identified, as an initial step.

In the present example, ray tracing can determine the portion of the LCOS 1202 through which the 'chief ray' light travels, between each virtual image point 1201 to the corresponding point 1211 on the retina, in order to identify the 'contributory area' 1203 for that virtual image point 1201. There is therefore a light ray 'r' depicted as propagating between the virtual image point 1201 and the contributory area 1203 of the display device 1202 in FIG. 12. In accordance with the recognitions made by the inventors, only wavelets contributing to the contributory area of the LCOS need to be modelled (or otherwise computationally considered), from the virtual image point 1201 to the display device 1202. In other words, only the identified contributory area 1203 of the display device 1202 needs to be encoded (or, 'tuned')—in order to generate an appropriate hologram. Such a hologram, when encoded on the display device and suitably illuminated, would enable the virtual image point 1201 to be perceived by the viewer without any ghost images of that virtual point 1201 also being present. This can be understood further from FIGS. 13 and 14, discussed below.

The contributory area 1203 in FIG. 12—and the contributory areas discussed in relation to FIGS. 13 and 14 below—may be sized and shaped based on the size and shape of the entrance aperture of the corresponding viewing entity and of the associated optics (e.g., waveguide geometry, any reflections within a larger optical system, and so on). Therefore, when the viewing entity is a human eye, the contributory area on the display device may, in some cases, comprise a substantially circular, or elliptical, shape, or any other suitable shape such as a complex shape, of a similar size to the receiving pupil. However, the present disclosure encompasses more complex shapes for the contributory area. Eye pupil diameter may be measured or estimated in any suitable way. For example, measurement of the eye pupil diameter may be carried out by an eye tracking system. Alternatively, it may be estimated based on known ranges of pupil diameter of the eye (e.g. 2-6 mm) or based on another estimate given the ambient light conditions at a given time.

The contributory area may be set so as to deliberately contribute to an area (on the aperture plane) that is a little larger than the pupil, and/or to contribute to an area (on the aperture plane) that is a slightly different shape to the pupil (or other aperture). In such a case, not all light from a "contributory area" may pass through the pupil at all times, but the eye would be able to move around a little while still collecting sufficient light to form a good image on the retina.

Figure 13:
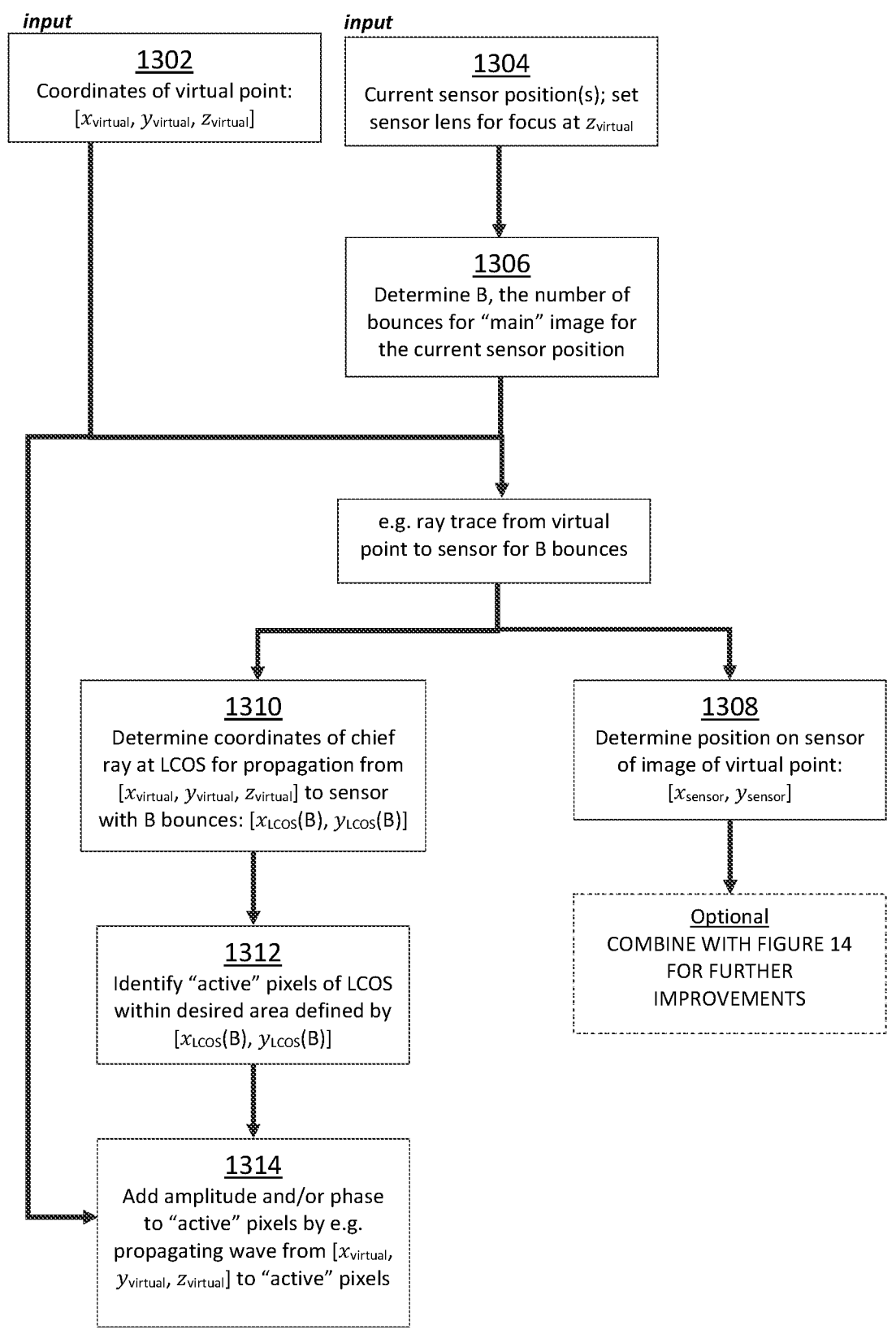
FIG. 13 shows a flow chart of an improved method to derive an improved data structure in accordance with embodiments.

FIG. 13 shows a method for determining the contributory and non-contributory areas of the display device, in accordance with a primary aspect of this disclosure. Optionally, these determinations can then be used to optimise generation of one or more holograms for display and illumination by a viewing system such as the system 1200 of FIG. 12. In the method described with reference to FIG. 13, the viewing system comprises a lens having an 'f'-number (i.e. focal length and aperture) and a camera. The light-sensitive component of the camera may be, for example, a CCD array and is positioned on the viewing plane. Functionally, the lens and camera substitute the eye lens and retina of the human eye of a viewer and are solely used for the process of determining the contributory and non-contributory areas of the display device. These areas of the display device may be determined for a plurality of viewing positions (e.g., eye positions within an eye-motion box) and/or a plurality of image distances (e.g., virtual image distances in front of a vehicle). In some respects, the method disclosed with reference to FIG. 13 may be considered a precursor to hologram calculation. The method may be considered an optimisation or even a calibration process.

As will be well understood, each virtual image that is to be generated can be represented by one or more virtual image points, each with a corresponding location—for example, as defined by (x, y, z) coordinates. Steps one 1302 to six 1312 (detailed below) of the method 1300 of FIG. 13 may be applied separately to each virtual image point, within a virtual image that is to be created. Moreover, the method 1300 applies for a specific set of conditions—i.e., for particular measurements and constraints, of the viewing system. Therefore, any given iteration (or, 'run') of the method 1300 applies for building up a particular image that is to be created (virtual image point by virtual image point), and for when the system has a particular display-to-image distance 'z', a particular distance 'd' between the display device and the retina, a particular aperture (pupil) width, and a particular virtual image distance at which the eye is focussed. An iteration of the method 1300 is also specific to a particular size and type of display device, and for a particular position of the eye, with a permitted viewing window. There may be other measurements and/or constraints, to which each iteration of the method is specific. According to embodiments, if any of those measurements or constraints change, the method 1300 may be re-run, to re-determine the contributory area(s) of the display device under the changed circumstances. It will be understood, however, that, according to embodiments, certain tolerances may be applied to one or more of those measurements or constraints, such that the method may not have to be re-run if they change by less than a predetermined amount and/or for less than predetermined length of time. The rules regarding when the method should be re-iterated may be determined on a per-system basis.

The method 1300 may be performed by a suitable processor. The processor may comprise, or be comprised within or in communication with, a hologram engine. The processor or hologram engine may be comprised within a light engine.

The processor may obtain or receive boundary information regarding the viewing system before the method 1300 is carried out. For example, it may obtain or receive information regarding the size of components such as the display device, information regarding the absolute and/or relative positions of various components and of the viewing system (e.g., potential human viewer), information regarding the light source, and so on.

According to the method 1300, in a first step 1302 the location—e.g., the coordinates $[x_{virtual}, y_{virtual}, z_{virtual}]$ of the virtual image point (also referred to herein as the "virtual point" for shorthand) is obtained, in accordance with the location at which the virtual image is to be perceived. The virtual image distance between the lens 1209 and the virtual point is then obtained or determined. This virtual image distance may be set or determined by the processor that is performing the method 1300, or it may be set or determined by another entity, and communicated to that processor. It may be pre-set or selected from a plurality of possible virtual image distances, in some arrangements. In real-world operation, when the viewing system is an eye, eye-tracking or head-tracking information may be used in the determination of the virtual image distance.

In a second step 1304 the required distance 'A' between the lens and the sensor is determined for focus on the virtual image point. Each virtual image point can also be defined by an angle—see FIG. 4. Reference herein to "angular content" is made with respect to the virtual image points of the virtual image.

In a third step 1306, a number of reflections or bounces 'B' of light within the waveguide associated with a main or primary image formed by the viewing system is determined. The person skilled in the art of optics will appreciate that the waveguide generates a plurality of replicas of the light associated with the virtual image point and each replica may be associated with a different number of light bounces/reflections within the waveguide. By way of example only, one way to determine B is to determine the intersection of the chief ray with the display device for each possible light propagation path in the waveguide and select the number of reflections/bounces that puts the chief ray closest to the centre of the display device. Advantageously, this approach is such that the area of the display device contributing to the viewing system is largest.

Alternatively, another way of calculating the number of bounces to use in the third step 1306 comprises sub-steps 1 to 5 below:

1. Eye position known and used as input
2. Ray trace from the centre of the display device to the determined eye position for a first number of bounces, B. The extrapolation of that ray towards the virtual image defines an angle in the field of view ($\theta_B$) for this number of bounces (B).
3. Ray trace from the centre of the display device to the determined eye position for a second number of bounces, B+1. The extrapolation of that ray towards the virtual image defines an angle in the field of view ($\theta_{B+1}$) for this number of bounces (B+1).

4. B is the number of bounces used for angular content between $\theta_B$ and $\theta_B+(\theta_{B+1}-\theta_B)/2$ 5. B+1 is the number of bounces used for angular content between $\theta_B+(\theta_{B+1}-\theta_B)/2$ and $\theta_B$ The output from the first step 1302 (i.e., the coordinates of the virtual image point) and third step 1306 (the parameter, B) are used in a fourth step 1308 to determine the corresponding image position/point on the sensor [$x_{sensor}$, $y_{sensor}$, $z_{sensor}$]. That is, the fourth step 1308 determines the point on the sensor on which light of the virtual image point is received. In other words, the point on the sensor at which the virtual image point is imaged. This point on the sensor is referred to below, in relation to FIG. 14, as the main image point [$x_{sensor}$, $y_{sensor}$, $z_{sensor}$]. By way of example only, computational ray tracing from the virtual point to the sensor for B bounces within the waveguide may be used but the present disclosure is not limited to this approach to the fourth step.

The person skilled in the art will appreciate that a chief light ray (or simply chief ray) from the virtual point [$x_{virtual}$, $y_{virtual}$, $z_{virtual}$] to the point on the sensor [$x_{sensor}$, $y_{sensor}$, $z_{sensor}$] may be identified. Again, computational ray tracing may be used to identify or trace the chief ray but other methods are equally applicable. In a fifth step 1310, a display device intersection point [$x_{LCOS}(B)$, $y_{LCOS}(B)$, $z_{LCOS}(B)$] is identified, wherein the display device intersection point is the location on the display device at which the chief ray intersects the display device. The display device intersection point may be determined, calculated, or measured, for example by computational ray tracing.

In a sixth step 1312, an area of the display device associated with the display device intersection point [$x_{LCOS}(B)$, $y_{LCOS}(B)$, $z_{LCOS}(B)$] is identified. The area of the display device may be geometrically centred on this point [$x_{LCOS}(B)$, $y_{LCOS}(B)$, $z_{LCOS}(B)$]. For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as a "primary contributory area" because it corresponds to a primary image formed by the viewing system. The word "contributory" reflects that the pixels of the display device within the identified area of the display device are the pixels that provide the necessary information content to the sensor. Other areas of the display device (i.e., other pixels of the display device) do not contribute to formation of the image point on the sensor. The other pixels may, of course, contribute to other image points on the sensor associated with other virtual image points.

The method in accordance with the primary aspect of the present disclosure ends with determination of the primary contributory area of the display device. Optionally, a hologram may be determined based on the primary contributory area—rather than on the entire area of the display device.

Accordingly, in an optional, seventh step 1314, a hologram component is determined for the primary contributory area based on the virtual point. Specifically, light parameters for the primary contributory area are determined. The light parameters may be amplitude and/or phase for each pixel of the primary contributory area. For example, a light amplitude and phase may be determined for each pixel within the primary contributory area based on the propagation of light from the virtual point to the primary contributory area using a point cloud method familiar to the person skilled in the art. The hologram component for the virtual point may be stored and combined with the hologram component for the other virtual points as part of the iterative process described in the following paragraph in order to build up a complete hologram for the entire virtual image.

In overview, in the seventh step 1314, a light modulation value (e.g. an amplitude and/or phase value) is assigned to each pixel value of the display device within the primary contributory area. This is achieved by considering the propagation of a light wave from [$x_{virtual}$, $y_{virtual}$, $z_{virtual}$] to the primary contributory area and adding the amplitude and/or phase to the pixels of the display device within the desired radius of [$x_{LCOS}(B)$, $y_{LCOS}(B)$, $z_{LCOS}(B)$]. That is, the amplitude and/or phase of light originating from the virtual image point and arriving at each point (i.e. pixel) of the primary contributory area is determined by considering the propagation of the light wave—that is, the amplitude and/or phase of the light wave after travelling the distance from the virtual image point to each pixel. This determination may be performed by any one of a number of different techniques known to the person skilled in the art of optics. This determination may be made by experimental measurement.

The first to seventh steps may be repeated for each virtual point, within a virtual image that is to be projected using the hologram. For example, the plurality of hologram components may be added together, to produce a resultant hologram for each pixel of the display device. For example, the complex amplitude may be added up at each pixel for propagation from all virtual image points. If the hologram is to be displayed on a phase-only modulator, the amplitude component of the resulting complex amplitude sum may be ignored, leaving only the phase. More broadly, this resultant is a diffractive structure corresponding to the virtual image which, if displayed and illuminated on the display device within the viewing system, forms the virtual image.

The hologram can be displayed or encoded on to the display device. As a result, the display device will be tuned to modulate light in a manner that enables the virtual image to be perceived by the viewer, at the required virtual image distance.

The method 1300 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification of the contributory area(s), and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1300 may be run (or re-run) very quickly, in order to display a number of different virtual images in quick succession, and/or to respond accurately to changes in conditions such as movement of the user. Although only one eye is shown in the system of FIG. 12, the method 1300 can be configured to consider both the viewer's eyes. Moreover, although certain of the descriptions above may refer to an aperture width, it will be appreciated that a pupil (and most other apertures, for viewing entities) is two dimensional and can change size in each of those two dimension. The method 1300 may be configured to take two-dimensional aperture size, and changes thereto, into consideration.

The inventors found that a hologram of a virtual image could be efficiently determined using the method disclosed with reference to FIG. 13. However, the inventors also observed that in some cases only a relatively small portion of the LCOS was being utilised, when all areas of the LCOS that would conventionally propagate light that would form ghost images were not used. In a notable further technical advancement, the inventors found ways to use additional areas of the LCOS, in additional to the primary contributory area, and to calculate hologram values for those additional areas that would enable them to contribute light to reinforce the primary image, rather than forming unwanted ghost images.

As will be well understood, the optical path that a light ray takes through a waveguide in a viewing system may increase its path length, vis-à-vis the path lengths for respective other rays. Typically, such increases are likely to be small in comparison with the virtual image distance 'v', and so will not be visible to the eye.

FIG. 14 shows a yet further improved method 1400, in accordance with additional recognitions made by the inventors, which can be applied for a system such as the system 1200 of FIG. 12. The method 1400 of FIG. 14 comprises all the steps of the method 1300 of FIG. 13 and, in addition, it comprises processing of one or more of the ghost image points, corresponding to the virtual point, which may also be present, and which conventionally would lead to the perception of one or more ghost images of the virtual image.

The method 1400 may be performed by a suitable processor. The processor may comprise, or be comprised within or in communication with, a hologram engine. The processor or hologram engine may be comprised within a light engine.

The processor may obtain or receive boundary information regarding the system before the method is carried out. For example, it may obtain or receive information regarding the size of components such as the display device, information regarding the absolute and/or relative positions of various components and of the viewer, information regarding the light source, and so on.

In some cases, the inventors have found that the ghost image points arise due to light, from the corresponding virtual point, travelling through a part of the display device that is different to the 'primary contributory area', through which the chief ray of the main image travels. In preceding Figures herein, such parts of the display device are referred to as being 'secondary contributory areas'. The light that creates one or more ghost image points, may be referred to as comprising one or more 'ghost rays'. The light rays giving rise to the ghost image may undergo a different number of bounces, within the waveguide, to those corresponding to the main image, in order to also travel through the narrow pupil of the viewer's eye and coincide with the retina. Therefore, if it is determined that the chief ray corresponding to the main image undergoes 'B' bounces within the waveguide, it may be determined that the light corresponding to a ghost image undergoes 'B+ΔB' bounces, where AB may be a negative or positive whole number, usually a single digit number, for example in the range from −5 to +5.

According to the improved method 1400 of FIG. 14, after the fourth step 1308 of the method 1300 of FIG. 13, in which the location of the main image point on the viewing plane is established—for example, its coordinates ($x_{sensor}$, $y_{sensor}$, $z_{sensor}$)—the subsequent steps of the method 1300 of FIG. 13 may continue and, in addition, for example in parallel or at a later time, a further set of steps may be performed, as follows, for at least one value of DB. In summary, the improved method 1400 of FIG. 14 determines how many bounces 'B+ΔB' a ghost ray would have undergone, from the coordinates [$x_{virtual}$, $y_{virtual}$, $z_{virtual}$] of the virtual point, in order to form a ghost image point at the viewing plane. Then, the improved method 1400 determines a translated (or, amended) location of the virtual point, from which light could travel and undergo 'B+ΔB' bounces within the waveguide and arrive at the main image point on the viewing plane, rather than forming a separate ghost image point. A location on the LCOS, via which a light ray travels, from the translated location of the virtual point, to the main image point, may then be identified and may be encoded with a hologram, accordingly. Thus, one or more additional areas of the LCOS (other than the primary contributory area) may be encoded with hologram values to contribute to the main image, whilst still avoiding the creation of ghost images.

In more detail, the improved method 1400 is as follows:

In a first further step 1402, light rays from the main image point ($x_{sensor}$, $y_{sensor}$, $z_{sensor}$) are traced back to the virtual image, but for light rays that undergoes 'B+ΔB' bounces/reflections (rather than B bounces), within the waveguide.

In a second further step 1404, the location—e.g., the coordinates ([$x_{virtual}(\Delta B)$, $y_{virtual}(\Delta B)$, $z_{virtual}(\Delta B)$]—are determined (e.g., as a result of the ray tracing that was performed at the first further step 1402), of a secondary virtual point of the virtual image that would image to the main image point [$x_{sensor}$, $y_{sensor}$, $x_{sensor}$]—i.e., that would propagate light that would travel through the display device, waveguide and entrance aperture to coincide with the viewing plane at the location [$x_{sensor}$, $y_{sensor}$, $x_{sensor}$]—if the light underwent 'B+ΔB' bounces. The term 'secondary virtual point' is used herein as shorthand for a secondary (i.e., a displaced, or amended) location of the (primary) virtual point. That is, the present inventors have recognised that, if the location of the virtual point was shifted to the 'secondary virtual point' location [$x_{virtual}(\Delta B)$, $y_{virtual}(\Delta B)$, $z_{virtual}(\Delta B)$], any light from the 'secondary virtual point' that underwent 'B+ΔB' bounces/reflections in the waveguide would contribute to the main image, at the viewing plane.

In summary, a third further step 1406 comprises determining the coordinates [$x_{LCOS}(B+\Delta B)$, $y_{LCOS}(B+\Delta B)$, $z_{LCOS}$] of a chief ray at the display device for light propagation from [$x_{virtual}(\Delta B)$, $y_{virtual}(\Delta B)$, $z_{virtual}$] to the viewing plane for B+DB bounces within the waveguide. In some cases, $z_{virtual}$ may be adjusted to take account of the different path length through the waveguide (i.e., because of the different number of bounces. This chief ray may be referred to as a 'secondary chief ray'.

In more detail, in the third further step 1406, a point on the display device is identified where the 'secondary chief ray' from the secondary virtual point to the main image point [$x_{sensor}$, $y_{sensor}$, $z_{sensor}$] would travel, undergoing B+ΔB bounces in the waveguide, via this point. This point on the display device has the coordinates [$x_{LCOS}(B+\Delta B)$, $y_{LCOS}(B+\Delta B)$, $z_{LCOS}$].

In a fourth additional step 1408, the point [$x_{LCOS}(B+\Delta B)$, $y_{LCOS}(B+\Delta B)$, $z_{LCOS}$] is assigned a radius or other suitable indicator of the extent, or size, of an area associated therewith. The area associated with the point [$x_{LCOS}(B+\Delta B)$, $y_{LCOS}(B+\Delta B)$, $z_{LCOS}$] is referred to herein as an "additional contributory area" because it propagates light that contributes to the main image point at the viewing plane, but only when that light originates from a displaced, or amended, location of the (primary) virtual point—i.e. [$x_{virtual}(\Delta B)$, $y_{virtual}(\Delta B)$, $z_{virtual}$] not [$x_{virtual}$, $y_{virtual}$, $z_{virtual}$]—as determined in the second further step 1404.

The fourth further step 1408 is similar to the sixth step 1312. Specifically, the fourth further step 1408 comprises identifying an area of the display device associated with the display device intersection point [$x_{LCOS}(B+DB)$, $y_{LCOS}(B+DB)$, $z_{LCOS}(B)$]. The area of the display device may be geometrically centred on this point [$x_{LCOS}(B+DB)$, $y_{LCOS}(B+DB)$, $z_{LCOS}(B)$]. For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as an "additional contributory area" because it will propagate light contributing to the virtual image, if an appropriate hologram is calculated based on the displaced, or amended, location of the (primary) virtual point.

A fifth further step 1410 is similar to the seventh step 1314. The fifth further step 1410 is optional. In the fifth further step 1410, a hologram component is determined for the additional contributory area based on the amended location of the (primary) virtual point, [$x_{virtual}(\Delta B)$, $y_{virtual}(\Delta B)$, $z_{virtual}$]. Specifically, light parameters for the additional contributory area are determined. The light parameters may be amplitude and/or phase for each pixel of the additional contributory area. For example, a light amplitude and phase may be determined for each pixel within the additional contributory area based on the propagation of light from the different virtual point, [$x_{virtual}(\Delta B)$, $y_{virtual}(\Delta B)$, $z_{virtual}$], to the additional contributory area using a point cloud method familiar to the person skilled in the art. The hologram component for the different virtual point, [$x_{virtual}(\Delta B)$, $y_{virtual}(\Delta R)$, $z_{virtual}$], may be stored and combined with the hologram component for the other virtual points as part of the iterative described in the following paragraph in order to build up a complete hologram for the entire virtual image.

This required light modulation, by the display device, which is output in relation to a single individual virtual point, may be referred to as a "hologram component" for that virtual point. The hologram component may be stored, by the processor, during a subsequent repetition of the method 1300 for one or more other virtual points, within the virtual image that is to be created.

The steps 1402 to 1410 of the further improved method 1400 of FIG. 14 may, along with the steps one 1302 to seventh 1314 of the method 1300 of FIG. 13, be repeated for each virtual point, within a virtual image that is to be created. When the modulation behaviours, and corresponding hologram components, for each virtual point have been determined, the hologram components may be added together, to produce a resultant modulation behaviour for each pixel of the display device. This resultant modulation behaviour represents a diffractive structure, or hologram, for the virtual image, which, if displayed and illuminated on the display device within the viewing system, leads only to a main image being formed and does not form any ghost images. The main image that would be formed as a result of the improved method 1400 of FIG. 14 being carried out may be brighter than a corresponding main image resulting from the method 1300 of FIG. 13 alone.

The processor may output data corresponding to the hologram, in any suitable manner. The hologram can be encoded on to the display device. As a result, the display device will be tuned to modulate light in a manner that enables the virtual image to be perceived by the viewer, at the required virtual image distance, without the formation of any ghost images.

The method 1400 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1400 may be run (or re-run) very quickly, in order to display a number of different virtual images in quick succession, and/or to respond accurately to changes in conditions such as movement of the user. Although only one eye is shown in the system of FIG. 12, the method 1400 can be configured to consider both the viewer's eyes. Moreover, although certain of the descriptions above may refer to an aperture width, it will be appreciated that a pupil (and most other apertures, for viewing entities) is two dimensional and can change size in each of those two dimensions. The method 1400 may be configured to take two-dimensional aperture size, and changes thereto, into consideration.

In accordance with a primary aspect of this disclosure, the inventors found that each virtual image point corresponds to a different primary contributory area on the display device. The inventors further recognised that this means that light from different parts of the virtual image (i.e. different virtual image points) follows different optical paths through the system. In an embodiment illustrated by FIGS. 15A and 15B, the inventors configured the system such that, in simple terms, (i) the virtual image comprises a plurality of discrete virtual image components or areas and (ii) light of each virtual image component is associated with a different number of bounces/reflections within the waveguide 1508.

Figure 15A:
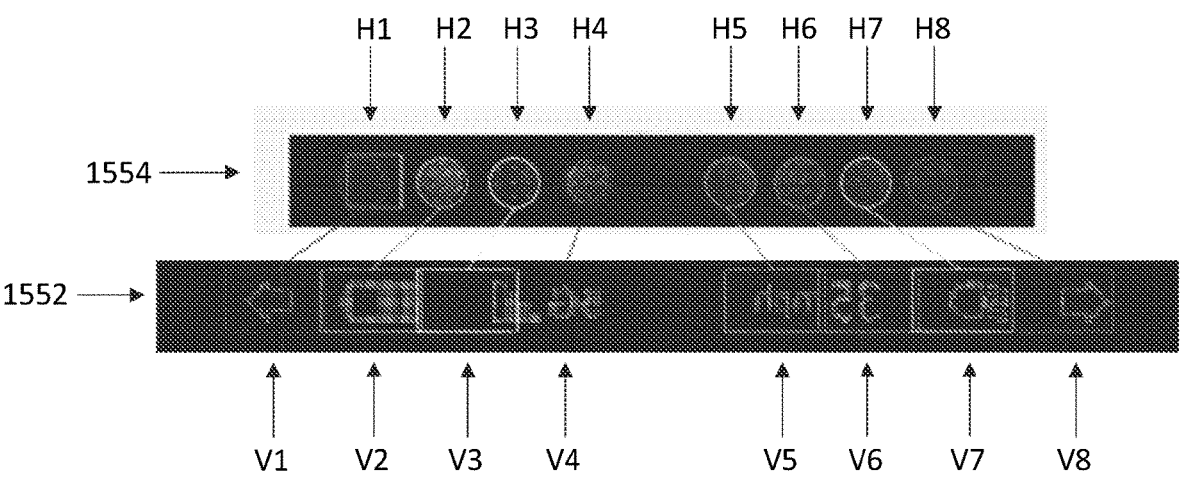
FIG. 15A shows an image comprising a plurality of image areas (bottom) and corresponding hologram comprising a plurality of hologram components (top)
Figure 15B:
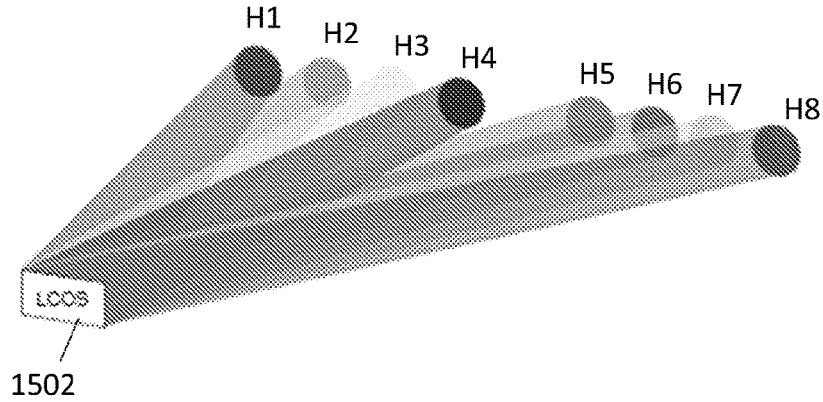
FIG. 15B shows a hologram, in accordance with the present disclosure, characterised by the routing or channelling of holographically encoded light into a plurality of discrete hologram channels.

FIG. 15A shows an image 1552 for projection comprising eight image areas/components, V1 to V8. FIG. 15A shows eight image components by way of example only and the image 1552 may be divided into any number of components. FIG. 15A also shows the encoded light pattern 1554 that can reconstruct the image 1552—e.g. when transformed by the lens of a suitable viewing system. The encoded light pattern 1554 comprises first to eighth sub-holograms or components, H1 to H8, corresponding to the first to eighth image components/areas, V1 to V8. FIG. 15A further shows how a hologram calculated in accordance with this disclosure effectively decomposes the image content by angle. The hologram may therefore be characterised by the channelling of light that it performs. This is illustrated in FIG. 15B. Specifically, the hologram in accordance with this disclosure directs light into a plurality of discrete areas. The discrete areas are discs in the example shown but other shapes are envisaged. The size and shape of the optimum disc may, after propagation through the waveguide, be related to the size and shape of the entrance pupil of the viewing system.

This channelling of light only occurs due to the specific method of determining the hologram disclosed herein.

Figure 15C:
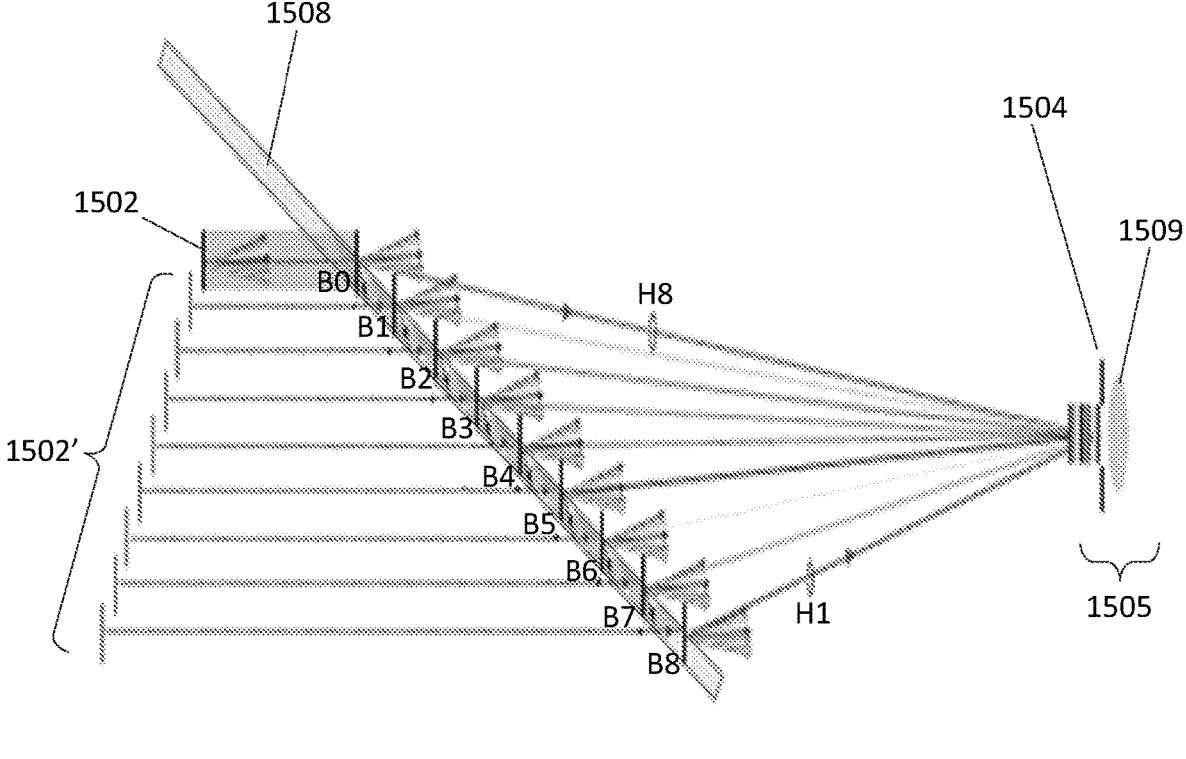
FIG. 15C shows an optimised system arranged to route the light content of each hologram channel through a different optical path to the eye.

FIG. 15C shows an improved viewing system 1500, in accordance with the recognitions illustrated in FIGS. 15A and 15B. The method 1300 of FIG. 13 or the method 1400 of FIG. 14 may be applied to the scheme illustrated by FIGS. 15A and 15B.

The viewing system 1500 comprises a display device, which in this arrangement comprises an LCOS 1502. The LCOS 1502 is arranged to display a modulation pattern (or 'diffractive pattern') comprising the hologram and to project light that has been holographically encoded towards an eye 1505 that comprises a pupil that acts as an aperture 1504, a lens 1509, and a retina (not shown) that acts as a viewing plane. There is a light source (not shown) arranged to illuminate the LCOS 1502. The lens 1509 of the eye 1505 performs a hologram to image transformation.

The viewing system 1500 further comprises a waveguide 1508 positioned between the LCOS 1502 and the eye 1505. The projection distance in FIG. 15C may be relatively large. However, as described in relation to previous Figures, the presence of the waveguide 1508 enables all angular content from the LCOS 1502 to be received by the eye 1505, even at this relatively large projection distance. This is because the waveguide 1508 acts as a pupil expander, in a manner that has been described hereabove.

Additionally, in this arrangement, when the LCOS 1502 has been encoded in accordance with the methods described herein, the waveguide 1508 can be oriented at an angle with respect to the LCOS 1502 in order to establish a unique relationship, between the light from the LCOS 1502 and the virtual image that the viewer will perceive. The size, location, and position of the waveguide 1508 are configured to ensure that light from each part of the virtual image enters the waveguide 1508 and is guided along its elongate axis, bouncing between the substantially planar surfaces of the waveguide 1508. Each time the light reaches the second planar surface (nearest the eye 1505), some light is transmitted and some light is reflected.

FIG. 15C shows a total of nine "bounce" points, B0 to B8, along the length of the waveguide 1502. The reader will notice that the centre of the image 1552 is kept blank. FIG. 15C shows zeroth to ninth light "bounce" or reflection points, B0 to B8, within the waveguide. Although light relating to all points of the image (V1-V8) is transmitted out of the waveguide at each "bounce" from the second planar surface of the waveguide 1508, only the light from one of angular part of the image (e.g. light of one of V1 to V8) has a trajectory that enables it to reach the eye 1505, from each respective "bounce" point, B0 to B8. Moreover, light from a different angular part of the image, V1 to V8, reaches the eye 1505 from each respective "bounce" point. FIG. 15C shows light from all the different angular content being emitted at each "bounce" point, (depicted by a plurality of short arrows at each transmission point), but then only shows the optical path, to the eye 1505, of the respective angular content that will actually reach the eye 1505—and therefore will contribute to a respective portion of the virtual image that the viewer will perceive—from that respective part of the waveguide. For example, for the zeroth bounce, B0, the light that is transmitted by the waveguide 1508 is simply refracted and does not undergo any reflections therein. Light of the eighth sub-hologram, H8, reaches the eye from the zeroth bounce, B0. For the next bounce B1, the light that is transmitted by the waveguide 1502 undergoes one bounce therein, before transmission. Light from the seventh hologram, H7, reaches the eye from the next bounce, B1 This continues in sequence until the light that is transmitted by the waveguide 1508 at the final bounce, B8, has undergone eight bounces, before being transmitted and reaching the eye 1505, and comprises light encoded in accordance with the first hologram, H1.

In the example shown in FIG. 15, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein, can enable a diffractive pattern (or, light modulation pattern) comprising a hologram to be generated that, when displayed on an LCOS or other suitable display device, can enable the light to be emitted therefrom effectively in a plurality of 'discs', or ray bundles of light, each of which corresponds to (more specifically, encodes) a different respective part of the corresponding virtual image.

Thus, improved methods and arrangements are described herein that enable holograms to be calculated, and to be displayed on a suitable display device, in a manner that enables clear images to be seen, by a viewer, when the display device is illuminated by a suitable light source. The images that the viewer sees can be free of ghosts and may be made brighter by the contribution of light, which would conventionally have contributed to a ghost image, instead contributing to the single main image.

The improved methods and arrangements described herein can be implemented in a variety of different applications and viewing systems. For example, they may be implemented in a head-up-display (HUD). In an improvement over many conventional HUDs, in which virtual images are formed, the improved methods and arrangements described herein can be implemented for creating virtual images at finite image distances—which can be selected and tuned by a suitable controller—whilst still eliminating ghost images.

Although virtual images, which require the eye to transform received modulated light in order to form a perceived image, have been discussed herein, the improved methods and arrangements described herein can be applied to real images.

Waveguide Aperture

Although the Figures above have shown a single eye or a single "opening" or "entrance pupil", all the arrangements and methods described herein are applicable to a viewing system with multiple entrance pupils—for example, and most commonly, to a human viewer having two eyes.

The inventors have recognised that, when a hologram of a target image is calculated as described above, which includes constraining the hologram in accordance with an entrance pupil of the viewing system, consideration should be given to the possible effects when the viewing system has multiple entrance pupils—for example, when the viewer is viewing the holographically reconstructed image with both eyes. In embodiments, the hologram may be constrained in accordance with one entrance pupil of the multiple entrance pupils, but some or all of the image may also be visible to one or more other entrance pupils, of the multiple entrance pupils. In embodiments, the hologram may be constrained in accordance with two or more entrance pupils, of the multiple entrance pupils. For example, two sub-holograms, each of which is constrained in accordance with a different respective entrance pupil, may be calculated and combined (e.g., summed) into a single hologram for display on a display device. For example, a left eye hologram and right eye hologram may be calculated from a respective left eye image and right eye image, wherein the left eye hologram is constrained during calculation in accordance with the entrance pupil of the left eye of the viewer and the right eye hologram is constrained during calculation in accordance with the entrance pupil of the right eye of the viewer. In embodiments, two or more holograms, each constrained in accordance with a different respective entrance pupil of the multiple entrance pupils, may be interlaced with one another. In other words, the two holograms may be displayed alternately, in quick succession, so that the viewer perceives the two corresponding images as being formed substantially simultaneously.

The inventors have recognised that additional guidance or control may be applied, to the light propagating from the displayed hologram towards a viewing system, in order to make it more suitable for receipt by multiple entrance pupils of that viewing system.

As described in detail hereabove, when a hologram is calculated in accordance with the described methods and displayed and propagated with a system such as that shown in FIG. 15c, at each transmission point—or "bounce point" such as B0 to B8 as shown in FIG. 15c—light relating to all points of the image (V1-V8) is transmitted out of the waveguide. The middle region of the image 1552 in FIG. 15A is blank and so a hologram channel associated with the middle of the image is not shown or labelled in FIG. 15B. Accordingly, in FIG. 15C, the optical path associated with transmission point B4 may not deliver any image content to the viewing system. However, for a single-entrance pupil viewing system, only the light from one angular part of the image (e.g., light of a respective one of each of V1 to V8) has a trajectory that enables it to reach the eye 1505, from each respective "bounce" point, B0 to B8. Moreover, light from a different angular part of the image, V1 to V8, reaches the eye 1505 from each respective "bounce" point. Therefore, in FIG. 15c, a single entrance pupil 1504 is shown as receiving all of the angular content of an image, but with each angular part of the image coming from a different respective "bounce" point on the waveguide 1508. However, the present inventors have recognised that, if a viewing system has two or more entrance pupils, there is a risk that light from the same angular part of the image will reach both entrance pupils simultaneously, since all angular parts of the image are emitted at each bounce point on the waveguide. For example, when the viewing system is a human and the multiple entrance pupils comprise both eyes, the right eye may receive light comprising particular angular content $V_x$ via a light path that is emitted from the waveguide after a first number of bounces $B_y$, and the left eye may receive the same angular content $V_x$ simultaneously (or, substantially simultaneously, given the speed of light) via a light path that is emitted from the waveguide after a second, different number of bounces B. This may lead to confusion since the human brain—and, indeed, a processor associated with any non-human viewing system—does not expect to receive the same part of an image (i.e., the same image content), at the same angle, simultaneously at two entrance pupils that are spatially separated from one another. Instead, the brain (or other processor) would expect the light from a single point, or single part of an image, to be received by the two (or more) entrance pupils at different respective angles.

Figure 16:
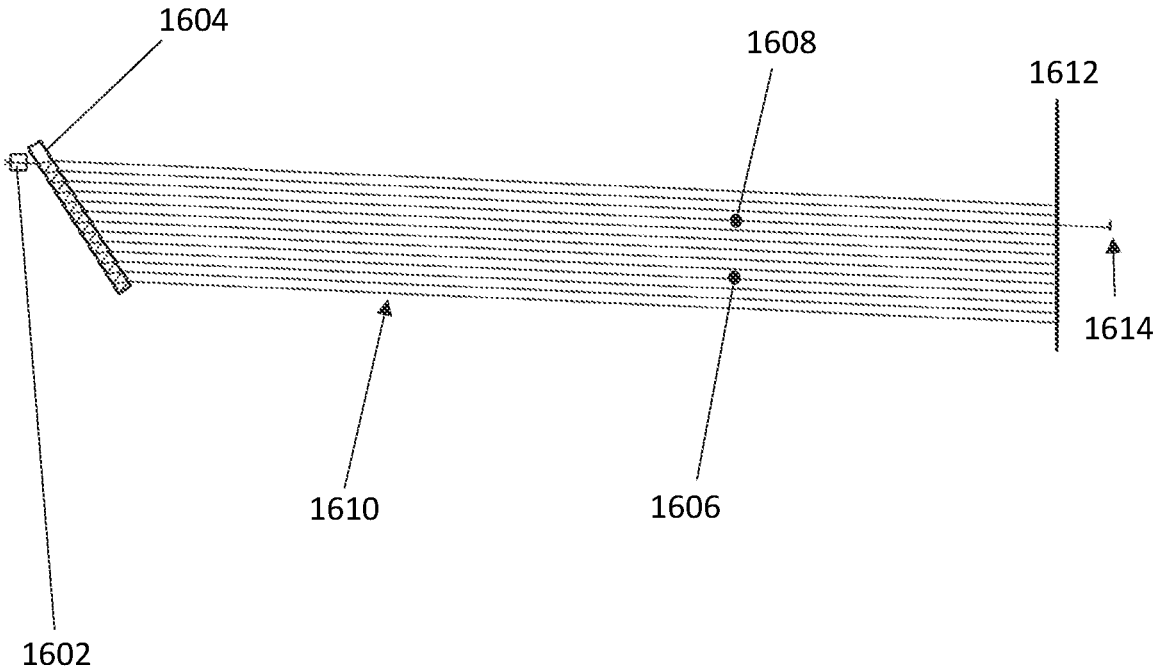
FIG. 16 shows a system including a waveguide outputting multiple instances of an angular light channel.

FIG. 16 illustrates the above-described problem, which the present inventors have addressed. FIG. 16 shows a display device 1602 that displays a hologram that has been calculated in accordance with the methods described herein.

The display device 1602 is illuminated by a light source (not shown). The light is spatially modulated by the displayed hologram and propagated towards a waveguide 1604. As described in detail in relation to previous figures, the light is refracted within the waveguide 1604. After refraction, some of the light is emitted towards the viewer at a first transmission point (or "bounce point") and other portions of the light are reflected (or "bounced") internally within the waveguide 1604 before transmission, with respective portions of the light being emitted towards the viewer at different respective transmission points (or "bounce points") along the length of the waveguide 1604.

FIG. 16 only shows the optical paths 1610 for the light of one part ($V_x$) of an image that is represented by the displayed hologram. The lights of the other parts of the image would, in practice, also be transmitted from the waveguide towards the viewer, but they have been omitted from FIG. 16 for ease of understanding. It will be appreciated that the lights of the other angular parts of the image would follow different respective optical paths, between the bounce points on the waveguide 1604 and the viewer, and that light of each (i.e., every) angular part of the image would be emitted at each (i.e., every) bounce point on the waveguide, towards the viewer.

FIG. 16 shows an entrance pupil plane 1612, indicating a plane at which the pupils of the viewer's eyes are located, and an image display plane 1614, indicating a plane at which an image is formed, on the retinas of the viewer's eyes. FIG. 16 also shows a first marker 1608 that indicates which one of the optical paths 1610 is travelling towards, and will enter through the entrance pupil of, the viewer's right eye, and a second marker 1606 that indicates which one of the optical paths 1610 is travelling towards, and will enter through the entrance pupil of, the viewer's left eye. As can be seen, each eye will only receive the light of one optical path of the multiple optical paths 1610, and each eye will receive the light via a different optical path 1610 to the respective other, because the viewer's eyes are naturally spatially separated from one another. However, as described above, all of the optical paths shown in FIG. 16 comprise light of the same (i.e., of a common) part of the image. Therefore, both eyes will receive the same image content at the same incident angle, albeit via different respective optical paths. The present inventors have recognised that this may lead to confusion and may impair the clarity of the image that the viewer perceives. The present inventors have addressed this potential problem, as will be understood from the description below. Moreover, although only the optical paths of the light of one angular part of the image are shown in FIG. 16, it is possible that the light of one or more other angular parts of the image may also be received simultaneously by both the viewer's left and right eyes, in a similar fashion.

FIG. 17 shows a display system, or light engine, that includes a waveguide 1704 and a viewing system 1710 comprising two entrance pupils. In this example, the viewing system 1710 is a human viewer and the two entrance pupils are part of the viewer's left eye 1706 and right eye 1708, respectively, however this should be regarded as non-limiting and the present disclosure also applies to other types of viewing system. Other parts of the display system have been omitted from FIG. 17. The waveguide 1704 has a (substantially) central point 1702, defined on its large face that is nearer the viewing system 1710, wherein it is defined that the "position along the waveguide" ($P_{WG}$) is equal to zero ($P_{WG}$=0) at that central point 1702. An optical axis is represented by a substantially horizontal dashed line, extending (in the "z" direction, in this example) from the central point 1702 to the viewing system 1710. An "x" axis is defined by a substantially vertical line, extending from the central point 1702, substantially perpendicular to the optical axis. The waveguide 1704 is arranged at an angle "a" to the x axis. An entrance pupil plane on which the pupils of the viewer's eyes are located, spatially separated from one another on the entrance pupil plane, is substantially parallel to the x axis, in this example. However, the present disclosure is not limited to the arrangement of FIG. 17, nor to the relative positions of any of the features therein. For example, in practice a viewer's eyes may not be precisely located on a common entrance pupil plane that is perpendicular to an optical axis extending towards the viewer from the waveguide. The locations of the viewer's eyes, at a given time, may be calculated or otherwise obtained by a processor that is comprised within, or in communication with, the display system. For example, any suitable eye tracking method may be employed.

The "position along the waveguide" ($P_{WG}$) of other points on that face of the waveguide 1704 may be defined according to their position relative to the central point 1702. By way of non-limiting example, any points located to the right of the central point 1702, as seen by the viewer 1710 in FIG. 17, may be assigned a positive (+) value of $P_{WG}$, with the magnitude of the $P_{WG}$ being defined by the distance, along the face of the waveguide, between the central point 1702 and the other point. Conversely, any points located to the left of the central point 1702, as seen by the viewer 1710 in FIG. 17, may be assigned a negative (−) value of $P_{WG}$, with the magnitude of the $P_{WG}$ again being defined by the distance, along the face of the waveguide, between the central point 1702 and the other point. A distance "D" is defined, substantially parallel to the optical axis, between the central point 1702 and the entrance pupil plane. The distance "D" may be relatively large, compared to the size of the entrance pupils of the viewer's eyes and/or compared to the size of the display device (not shown) that displays a hologram of an image to be viewed by the viewing system 1710. For example, the distance "D" may be approximately 1000 millimetres (1000 mm).

It can be seen that the viewer's eyes 1706, 1708 are, naturally, spatially separated from one another. The separation between the entrance pupils of the viewer's eyes may be referred to as an "inter-pupil distance" (IPD). In the example shown in FIG. 17, the entrance pupil of the right eye 1708 is displaced from the intersection of the optical axis and the entrance pupil plane in a positive (+) direction along the x axis whereas the entrance pupil of the left eye 1706 is displaced from the intersection of the optical axis and the entrance pupil plane in a negative (−) direction along the x axis. Again, this is just one example and is non-limiting. The present inventors have recognised that control may be provided so that the different respective positions of the viewer's two eyes (and, correspondingly, the different respective locations of two or more entrance pupils within any multi-entrance pupil viewing system) may be accounted for, to ensure that no part of an image is received by both eyes at substantially the same time. As a reminder, the special type of hologram in accordance with this disclosure effectively divides or separates the image content (albeit in the hologram domain) by angle.

Figure 18:
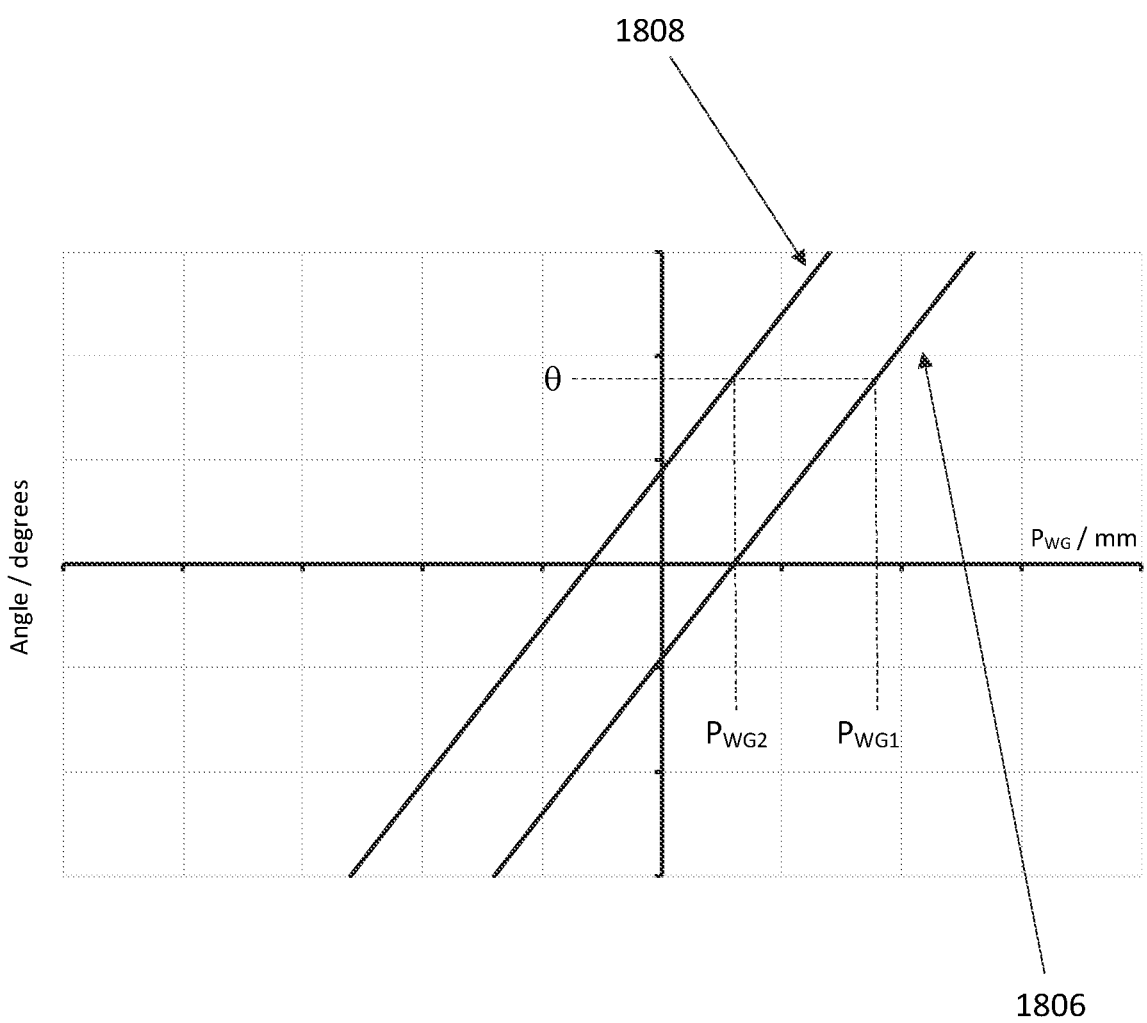
FIG. 18 comprises a graph showing a relationship between a light ray angle and position along the waveguide $(P_{WG})$ for the waveguide of FIG. 17.

FIG. 18 comprises a graph that illustrates the recognitions made by the present inventors, as applied to a display system or light engine, such as that shown in FIG. 15c, 16 or 17 herein. The graph shows the relationship between a position along the waveguide ($P_{WG}$) of a point on the large face of the waveguide, which faces a viewer or viewing system, and an angle from each eye to the point on the waveguide. In embodiments, the waveguide is tilted with respect to the display device (i.e. hologram) and/or viewing or entrance pupil plane of the viewing system.

The graph in FIG. 18 shows two lines—one 1806 for a first entrance pupil of a viewing system, such as the viewer's left eye, and the other 1808 for a second, different entrance pupil of the viewing system, such as the viewer's right eye. As can be seen, for any given angle of light, θ, there is a first position along the waveguide, $P_{WG1}$, from which the light is emitted in order to reach the left eye. For that same angle of light, θ, there is a second, different position along the waveguide, $P_{WG2}$, from which the light is emitted in order to reach the right eye. Therefore, both eyes will receive the same image content (i.e. angle of light) at substantially the same time but from different parts of the waveguide. This is the cause of a problem addressed by the inventors.

All of the rays (or ray bundles) that correspond to different respective parts of the image are emitted from multiple locations (i.e., from multiple "bounce points") on the waveguide. Therefore, if two or more rays of spatially modulated light that are emitted from the waveguide from different respective positions but at the same angle enters both entrance pupils substantially simultaneously, the image content received by both entrance pupils (e.g., by both the viewer's eyes) will be the same. This may lead to viewer confusion and may inhibit the quality of the image that the viewer sees or perceives.

The present inventors have therefore recognised that, according to embodiments, the light that is received by each entrance pupil of a multi-entrance pupil viewing system should be controlled. For example, the simultaneous receipt, by two or more entrance pupils of a multi-entrance pupil viewing system, of light of the same image content at the same angle should be reduced and at least in some cases should be eliminated. Moreover, the present inventors have recognised that two or more entrance pupils of a multi-entrance pupil viewing system should, at least in some cases, be prevented from both simultaneously receiving light of the same image content (i.e. light at the same specific range(s) of angle). The inventors' solution will be understood in relation to FIG. 19, which also shows first 1906 and second 1908 lines representing the light received by the left and right eyes, respectively, of a viewer according to an example.

Figure 19:
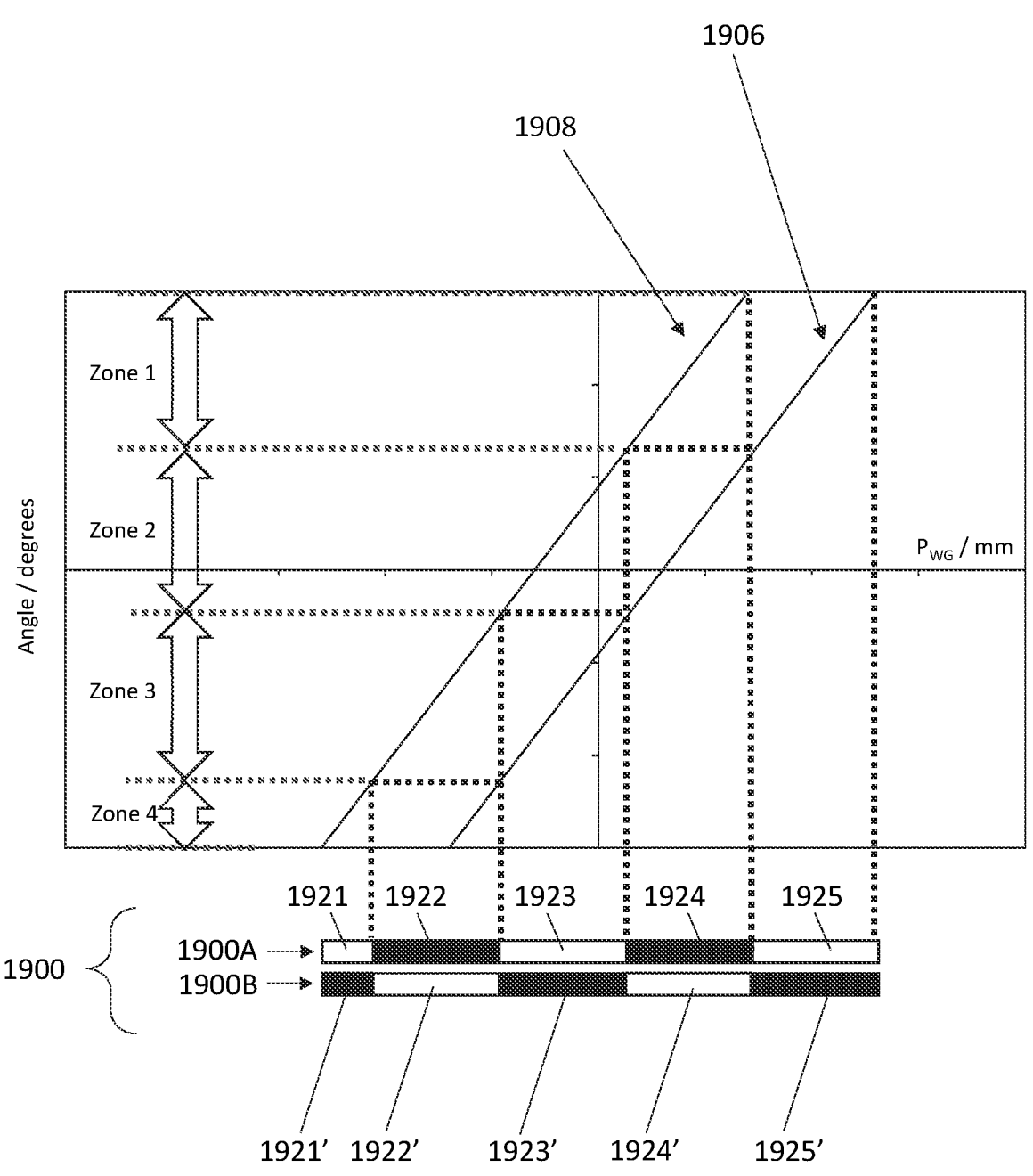
FIG. 19 shows a control device in accordance with embodiments, arranged relative to the graph of FIG. 18, for an image having 4 zones.

Each angle in FIG. 19 corresponds to a different part of the image owing to the special type of hologram employed in accordance with this disclosure. In summary, the inventors have identified from their analysis of this optical geometry that a plurality of angular ranges or "zones" (i.e. sub-areas) of the waveguide may be identified in which only one of the eyes will receive the corresponding image content. For example, in zone 2 of the waveguide, the angular range of light receivable by the left eye is non-overlapping with the angular range of light receivable by the right eye. In any zone, the maximum angle receivable by one eye is less than the minimum angle receivable by the other eye such that there is no overlap. But the zones are seamlessly connected such that all image content (i.e. all angles) is delivered to the viewing system. Looking at this the other way, the range of angles associated with zone 2 in FIG. 19 is delivered to the first eye from a first sub-area (i.e. first range of $P_{WG}$) of the waveguide that is non-overlapping (but seamlessly connected) to a second sub-area (i.e. second range of $P_{WG}$) of the waveguide that delivers the same angular content to the second eye. The end of the first sub-area (e.g. the upper limit of $P_{WG}$ for the first eye) is immediately adjacent (i.e. seamlessly connected to) the start of the second sub-area (e.g. the lower limit of $P_{WG}$ for the other eye), or vice versa. In short, owing to the geometry of the system and nature of the hologram, the inventors identified that a plurality of zones (i.e. sub-areas) of the waveguide existed from which the two eyes would receive light encoded with different (and, crucially, non-overlapping) parts of the image. The person skilled in the art will appreciate that the approach described with reference to FIG. 19 approximates a complex optical system and, for example, the finite size of the entrance pupils may still allow some crosstalk of angular content between the eyes. However, the inventors have found that this method is highly effective at identifying waveguide aperture configurations that significantly reduce the crosstalk between the two eyes whilst still delivering the full image content to both eyes.

In more detail, FIG. 19 shows, by way of example, 4 different zones, wherein each zone (zone 1, zone 2, zone 3, zone 4) defines a different respective range of angles of light, that will be emitted from the waveguide, towards the viewer. Each zone (zone 1, zone 2, zone 3, zone 4) corresponds to a different respective angular channel and thus corresponds to different respective image content. In other words, because of the unique manner in which the hologram has been calculated, each zone represents a different respective part of the image, and thus is said to correspond to different image content. The zones are adjacent to one another, and contiguous with one another, such that in combination they cover the full range of angles making up the image, and thus combine to provide all the image content necessary for the image to be holographically reconstructed by the viewer's brain, on receipt of the spatially modulated light.

The present inventors have recognised that, for every part of the image, and therefore for each zone, the light should preferably only be allowed to be received by one entrance pupil (i.e., by one of, not both of, the viewer's eyes), in order to avoid viewer confusion. Notably, the present inventors have devised a control device, at a selected location or locations between the waveguide and the viewer, in order to ensure that light from each part of the image (i.e. each angle) is only received by one of the viewer's eyes, at any given time. The control device may comprise one or more openings, or apertures, and one or more barriers or blockades. The control device may be referred to as being an "aperture" or a "waveguide aperture" which has closed portions and open portions. The waveguide aperture(s) may be configured so that the viewer's first eye receives angular content that cannot be received by the second eye, and vice versa.

An example waveguide aperture 1900 is shown in FIG. 19, in a first phase 1900A and in a second phase 1900B. These phases may instead be referred to as "configurations". The present disclosure is not limited to the particular phases shown in the Figures. These are illustrative examples only.

Figure 22A:
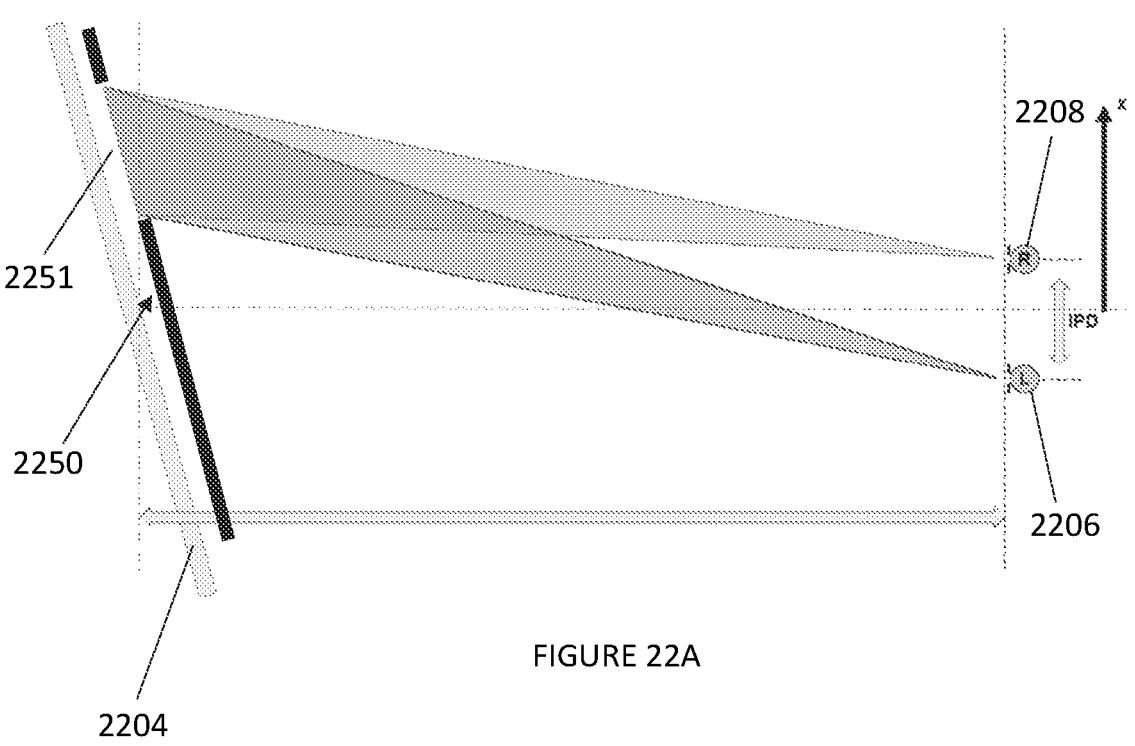
FIG. 22A shows a display system including a control device in accordance with embodiments.
Figure 24A:
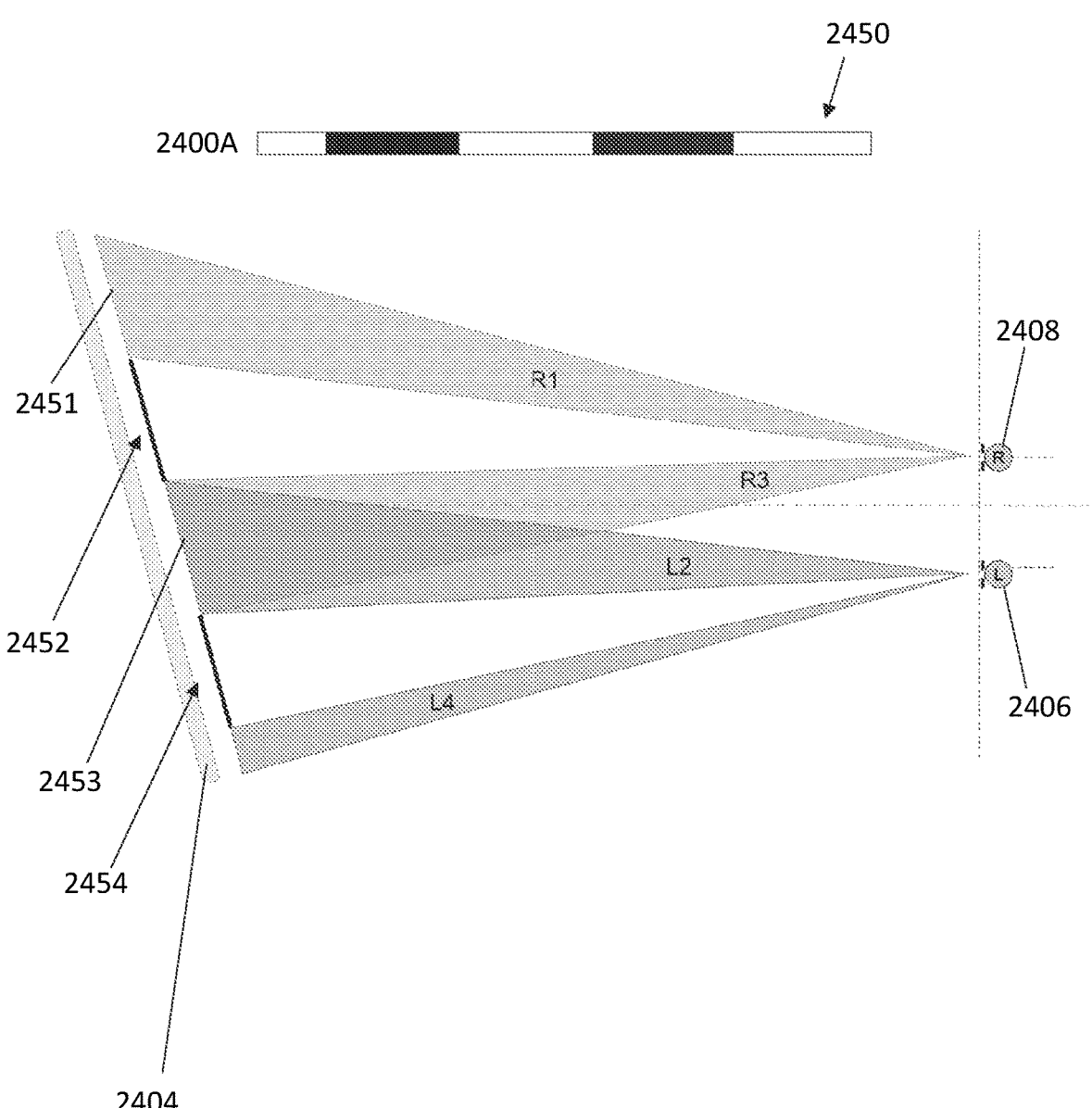
FIG. 24A shows a display system including a control device in a first phase.
Figure 25A:
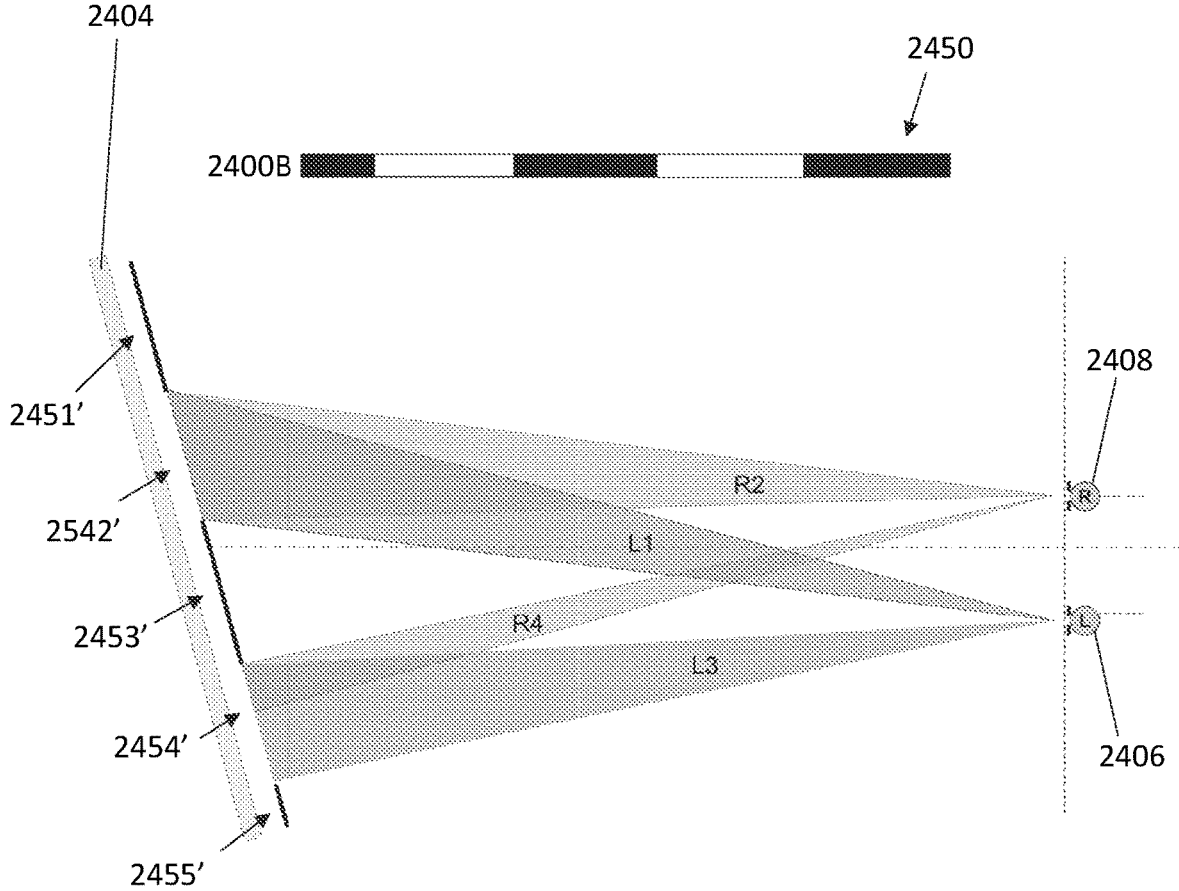
FIG. 25A shows the display system of FIG. 24A but with the control device in a second phase.

The waveguide aperture 1900 is shown adjacent to a graph in FIG. 19, which is similar to the graph in FIG. 18, to show how the waveguide aperture 1900 would affect the light that would otherwise propagate towards a viewer's eyes, via a waveguide, from zones 1 to 4 of a hologram. Each phase 1900A, 1900B represents one possible waveguide aperture configuration that may be applied, to ensure that only one eye receives the light of each zone at any given time. For each phase 1900A, 1900B, the waveguide aperture 1900 comprises "open" portions and "closed" portions, with each portion corresponding to a range (in millimetres, mm) of positions along the waveguide ($P_{WG}$), from which light might be emitted. In practice, the waveguide aperture 1900 may be physically located close to the waveguide, extending across light paths between the waveguide and the viewer, to selectively permit and block certain light paths as detailed below. For example, the waveguide aperture may be located immediately in front of the waveguide, as illustrated in FIGS. 22A, 24A and 25A herein. In such an arrangement, the waveguide aperture may be tilted with respect to the entrance pupil plane, for example it may be substantially parallel to the elongate face of the waveguide. However other locations and orientations of waveguide aperture are contemplated, which would provide similar function.

A fixed waveguide aperture may be provided, corresponding to either phase 1900A, 1900B, wherein the fixed waveguide aperture is positioned between the waveguide and the viewer to permit light that is emitted from certain positions along the waveguide ($P_{WG}$) to reach the viewer and to block light from certain other positions along the waveguide ($P_{WG}$), as defined by the open (white) and closed (black) portions shown in FIG. 19. A plurality of different fixed waveguide apertures may be provided, wherein a selected one of the plurality may be disposed with the waveguide, at a given time, to provided selected control of the spatially modulated light between the waveguide and the viewer. Alternatively, a dynamically-reconfigurable waveguide aperture may be provided, which alternates between the first phase 1900A and the second phase 1900B. Taking each phase in turn, the waveguide aperture 1900 may be understood in more detail, as follows:

For the first phase 1900A, the waveguide aperture is spatially divided into 5 portions, each defining a range of positions along the waveguide ($P_{WG}$), wherein the portions are alternately open and closed. In more detail: a first open portion 1921 is defined, at the left-hand side of the Figure. It will be appreciated that positional terms such as "left", "right" and so on are used only to aid understanding of the examples that are shown in the Figures and should not be regarded as limiting. The first open portion 1921 defines a range of positions along the waveguide ($P_{WG}$) for which the right eye receives the light of zone 4. The left eye does not receive any light from this range of positions. Moving from left to right, immediately adjacent the first open portion 1921 is a first closed portion 1922, which defines a range of positions along the waveguide ($P_{WG}$) for which the right eye could receive the light of zone 3. However, since it is a closed portion 1922, it ensures that the right eye will not receive any light from zone 3. Additionally, the first closed portion 1922 also covers a range of positions from which the left eye could have received light from zone 4. However, again, since it is a closed portion 1922, it ensures that the left eye will not receive any light from zone 4. Moving further to the right, immediately adjacent the first closed portion 1922 is a second open portion 1923, which defines a range of positions along the waveguide ($P_{WG}$) for which the left eye receive the light of zone 3. In addition, that same range of positions along the waveguide is the range for which the right eye receives light of zone 2. Moving further to the right, immediately adjacent the second open portion 1923 is a second closed portion 1924, which defines a range of positions along the waveguide ($P_{WG}$) for which the left eye would receive the light of zone 2. However, since it is a closed portion 1924, it ensures that the left eye will not receive any light from zone 2. Additionally, the second closed portion 1924 also covers a range of positions from which the right eye would receive light from zone 1.

However, again, since it is a closed portion 1924, it ensures that the right eye will not receive any light from zone 1. Finally, immediately adjacent the second closed portion 1924 is a third open portion 1925. It defines a range of positions along the waveguide ($P_{WG}$) for which the left eye receives the light of zone 1. The right eye does not receive any light from this range of positions. Therefore, when the waveguide aperture is in a configuration represented by the first phase 1900A, the light from each zone is permitted to enter one eye and is prevented from entering the respective other eye. Thus, duplication of received image content is avoided.

For the second phase 1900B, the waveguide aperture is again spatially divided into 5 portions, defining the same respective ranges of positions along the waveguide ($P_{WG}$) as the corresponding portions in the first phase 1900A do, but in the second phase 1900B, the portions are alternately closed and open when viewed from left to right, as defined in FIG. 19. In more detail: a first closed portion 1921' prevents light from zone 4 entering the right eye. It does not affect the left eye, because the left eye does not receive any light from this range of positions. Moving to the right, immediately adjacent the first closed portion 1921' is a first open portion 1922'. It allows light from zone 4 to enter the left eye and allows light from zone 3 to enter the right eye. Moving again to the right, immediately adjacent the first open portion 1922' is a second closed portion 1923'. It prevents light from zone 3 from entering the left eye and prevents light from zone 2 from entering the right eye. Moving again to the right, immediately adjacent the second closed portion 1923' is a second open portion 1924'. It allows light from zone 2 to enter the left eye and allows light from zone 1 to enter the right eye. Moving again to the right, immediately adjacent the second open portion 1924' is a third closed portion 1925'. It prevents light from zone 1 from entering the left eye. Thus, the functions of the two phases of the waveguide aperture are summarized in Table 1, below.

Embodiments describe an arrangement in which a first and second aperture configuration are opposite—i.e. perfectly complementary—by way of example only. It is not essential that the phases of the control device are perfectly complementary. In other embodiments described here, more complex configurations and phases are used particularly when the finite size of each entrance pupil is fully considered.

Figure 20:
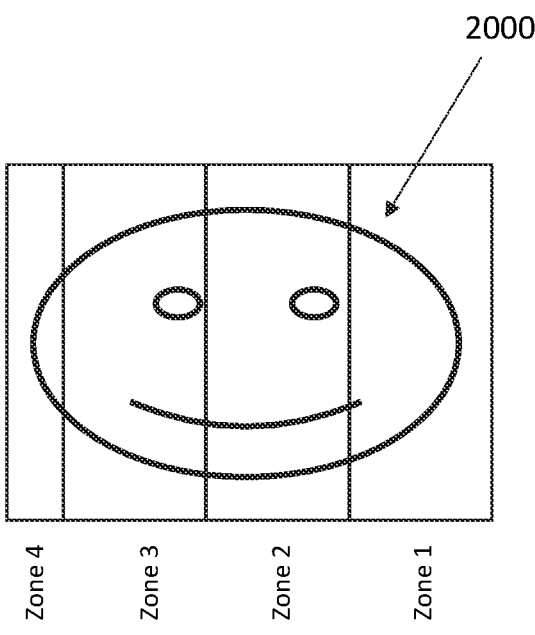
FIG. 20 shows a target image divided into 4 zones.

FIG. 20 is an example of a target image 2000, for which a hologram is calculated according to the methods described herein, to form a virtual image comprising a holographic reconstruction. The target image 2000 is divided into the 4 zones, each with different respective image content. Thus, the spatially modulated light that the display device and the waveguide emit, when the hologram is suitably displayed and illuminated, comprise 4 distinct rays (or ray bundles, or angular channels), each with a unique respective angular range, and each of which comprises different respect portion of the image.

The hologram is calculated such that it divides the image content by angle. A variety of different methods may be used to calculate such a hologram. In general, it may be said that the hologram is constrained in accordance with at least one entrance pupil of the viewing system. The characterizing feature of the hologram is the angular division of image content into channels. According to embodiments, the hologram is calculated using a point cloud method, as detailed above, which calculates the hologram using individual virtual image points of a virtual image that is to be generated. However, this method is described by way of example only and other methods of calculating a hologram characterized by the angular channeling of image content may be used. In embodiments utilizing the non-limiting, example point cloud method, each virtual image point may correspond to one light ray angle of the light between the display device and an entrance pupil of the viewing system. Each virtual image point may be regarded as an individual image component. In embodiments, a zone of the virtual image may comprise a single virtual image point or a plurality of virtual image points. In embodiments, two or more neighbouring virtual image points may be comprised within a zone of the virtual image, wherein the angular range for that zone comprises all the angles that respectively correspond to the individual virtual image points that are comprised within the zone.

To successfully control the content that reaches each eye (or entrance pupil) of a viewer (or viewing system), wherein each eye (or entrance pupil) occupies a different respective viewing position, each portion of the waveguide aperture disclosed herein (i.e. each zone) defines a maximum light ray angle and minimum light ray angle that can be received from each viewing position—e.g., from each eye, when the viewing system is a human viewer with two eyes. To avoid overlap of received hologram content between the viewing

TABLE 1

| Waveguide aperture phase | Hologram zone | Eye through which light permitted | Waveguide aperture portion permitting light | Eye through which light blocked | Waveguide aperture portion blocking light |
|---|---|---|---|---|---|
| First 1900A | 1 | Left | Third open portion 1925 | Right | Second closed portion 1924 |
| First 1900A | 2 | Right | Second open portion 1923 | Left | Second closed portion 1924 |
| First 1900A | 3 | Left | Second open portion 1923 | Right | First closed portion 1922 |
| First 1900A | 4 | Right | First open portion 1921 | Left | First closed portion 1922 |
| Second 1900B | 1 | Right | Second open portion 1924' | Left | Third closed portion 1925' |
| Second 1900B | 2 | Left | Second open portion 1924' | Right | Second closed portion 1923' |
| Second 1900B | 3 | Right | First open portion 1922' | Left | Second closed portion 1923' |
| Second 1900B | 4 | Left | First open portion 1922' | Right | First closed portion 1921 | positions (e.g., between the two eyes), for each zone, the maximum light ray angle of the first eye position is less than the minimum light ray angle of the second eye position. If the two viewing positions are configured to received content from two adjacent zones, the maximum light ray angle of the first eye position is substantially equal to the minimum light ray angle of the second eye position. For example, the waveguide aperture may be configured so that the first viewing position receives spatially modulated light corresponding to content in an angular range up to and including its maximum light ray angle ($\theta_{max1}$) and the second viewing position receives spatially modulated light corresponding to content in an angular range above, but not equal to $\theta_{max1}$, up to a maximum light ray angle of the second eye position ($\theta_{max2}$).

Figure 21:
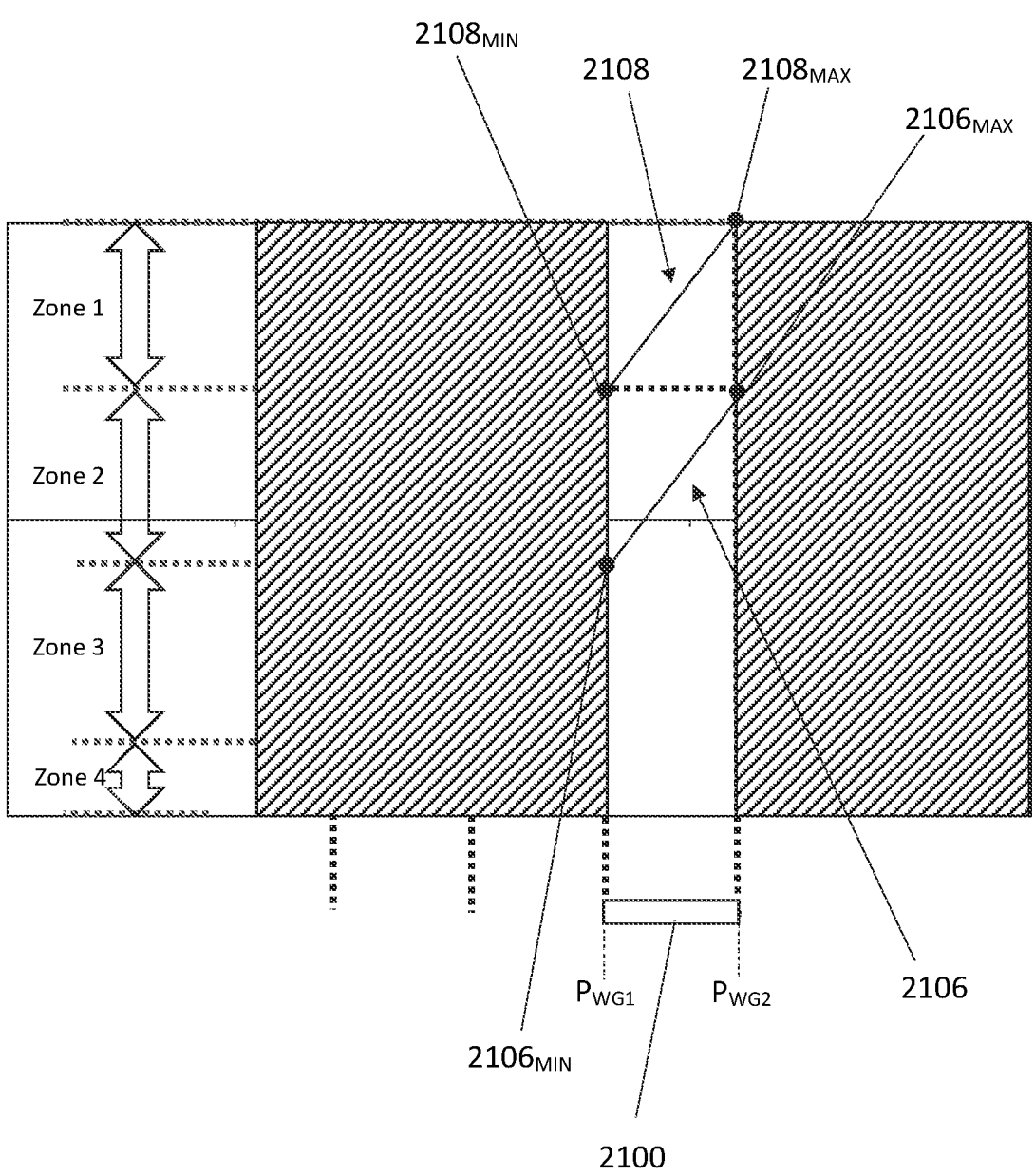
FIG. 21 shows one portion of a control device in accordance with embodiments, arranged relative to the graph of FIG. 19.

FIG. 21 illustrates the above, wherein an open portion 2100 of a waveguide aperture is shown, with the remainder of the waveguide aperture not shown. The open portion 2100 should be located, relative the waveguide (not shown), to permit passage, towards the viewer, of any light that is emitted from the waveguide from the highlighted range of positions along the waveguide ($P_{WG}$), between $P_{WG1}$ and $P_{WG2}$. It therefore allows light from zone 2 to enter the left eye, illustrated by a first line 2106, and allows light from zone 1 to enter the right eye, illustrated by a second line 2108. The angular range for zone 2 is shown as extending from a minimum angle $2106_{MIN}$ to a maximum angle $2106_{MAX}$ Similarly, the angular range for zone 1 is shown as extending from a minimum angle $2108_{MIN}$ to a maximum angle $2108_{MAX}$. As shown by a dashed horizontal line in FIG. 21, the maximum angle $2106_{MAX}$ for the zone 2, and therefore the left eye, is equal to the minimum angle $2108_{MIN}$ for zone 1, and therefore the right eye. Thus, the full range of angles from the lower limit for zone 2, $2106_{MIN}$, to the upper limit for zone 1, $2108_{MAX}$, is covered, with light that is spatially modulated by every part of the image in zones 1 and 2 being received through open portion 2100 by one eye or the other.

FIG. 22A illustrates a waveguide aperture 2250 in operation. The waveguide aperture 2250 is provided in front of—i.e., optically downstream of—a waveguide 2204 that is provided as part of a display system or light engine. Other elements of the display system are not shown. For example, the display system also comprises a display device configured to display holograms that are calculated as described herein, and to be illuminated by a suitable light source. A viewer is positioned optically downstream of the waveguide aperture 2250, with the entrance pupils of the viewer's left eye 2206 and right eye 2208 defining an entrance pupil plane in the "x" direction. The separation between the viewer's eyes 2206, 2208 is defined as an "inter-pupil distance" (IPD) in the x direction. The waveguide aperture 2250 is provided just in front of, and substantially parallel to, the waveguide 2250, such that both are tilted with respect to the entrance pupil plane.

An open portion 2251 of the waveguide 2250 is shown as allowing light to be emitted, towards the viewer, from a predefined range of positions along the waveguide ($P_{WG}$). In embodiments, there will be more than one open portion in the waveguide aperture, but just one is shown in FIG. 22A for ease of understanding. As described above in relation to FIG. 21, the waveguide aperture 2250 allows light in a first angular range to be emitted from the open portion 2251 and reach the right eye 2208, and allows light in a second, different angular range to be emitted from the open portion 2251 and reach the left eye 2206. The skilled reader will appreciate that, in practice, light may also be emitted from the waveguide 2204 and through the open portion 2251 of the waveguide aperture 2250 at other angles as well, but only the two angular ranges shown comprise light from the open portion 2251 that will reach one or other of the viewer's eyes.

Figure 22B:
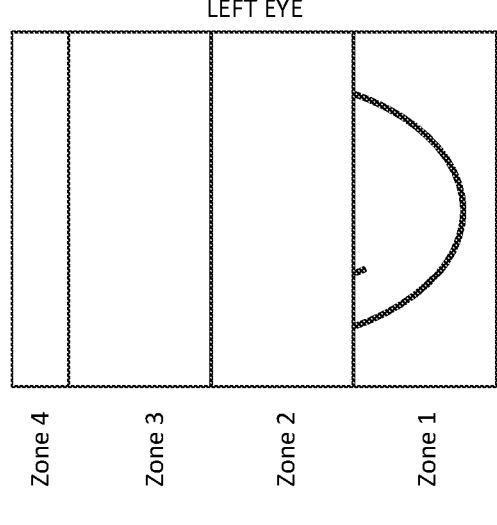
FIG. 22B shows image content received by the left eye in FIG. 22A.
Figure 22C:
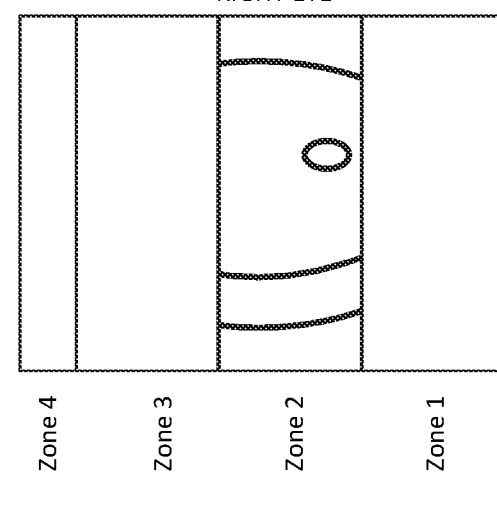
FIG. 22C shows image content received by the right eye in FIG. 22B.

FIG. 22B shows the image content of zone 1 of the target image 2000, light of which will be delivered to the viewer's left eye, using the system of FIG. 22A. FIG. 22C shows the image content of zone 2 of the target image 2000, light of which will be delivered to the viewer's right eye. As the skilled reader will appreciate, the viewer's brain (or, a processor in a non-human viewing system) can combine the image content received from each eye (or other entrance pupil) in order to "see" both zones at the same time. However, because of the different perspectives of the viewer's two eyes, the image content comprised in each zone should, at least in some cases, in fact be slightly different for each eye.

According to embodiments, the "target image", for which a hologram is calculated, and which is holographically reconstructed, according to the present disclosure, is different for each eye. The holograms corresponding to the image, which are calculated separately for each eye, may thus in fact each be a hologram of a different image. In other words, the hologram calculated for the left eye is a hologram corresponding to the image when viewed from the perspective of the left eye and, conversely, the hologram for the right eye is a hologram corresponding to the image when viewed from the perspective of the right eye.

Thus, the present inventors have recognised that, the image content comprised within each zone may be different for each eye (or, for each aperture, of any other multiple aperture viewing system). Therefore, according to embodiments, the waveguide aperture disclosed herein may be configured to supply light of all zones to each eye, within a narrow time window, so that the brain (or processor associated with a non-human viewing system) perceives that each eye has received all of the hologram content for its respective image, substantially simultaneously.

According to embodiments, the waveguide aperture may be dynamically configurable, and/or there may be more than one waveguide aperture or other control device provided, wherein a suitable controller can control switching between different respective configurations of the waveguide aperture, and/or switching between the different control devices, on a dynamic basis. Preferably, this should be done very quickly, for example more quickly than the typical integration time for a human eye. The switching enables all of the spatially modulated light that is emitted by the control device in both phases to be received by the viewer within a very short time window, such that the viewer perceives that it has all been received simultaneously.

FIG. 23A shows an image that is desired for a viewer's left eye, split into 4 zones, labelled respectively as L1, L2, L3 and L4. FIG. 23B shows an image that is desired for the viewer's right eye, split into 4 zones, labelled respectively as R1, R2, R3 and R4. To ensure that both eyes receive all the desired image content within a short time window, but that no image content is received by both eyes at the same angle at exactly the same time, a control device such as a waveguide aperture is provided that is configured to be dynamically switched between a first phase and a second phase, which are complementary to one another. FIG. 23C shows the target image for hologram calculation for phase 1 and FIG. 23D shows the target image for hologram calculation for phase 2. That is, the target image in FIG. 23C is used to calculate a first hologram that is reconstructed during phase 1 and the target image in FIG. 23D is used to calculate a second hologram that is reconstructed during phase 2. The target images used ensure that each eye receives content tailored to its position/perspective of the image.

Figure 24B:
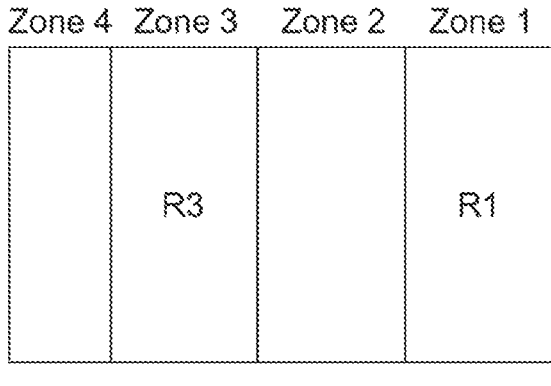
FIG. 24B shows image zones received by the right eye during the first phase of FIG. 24A.
Figure 24C:
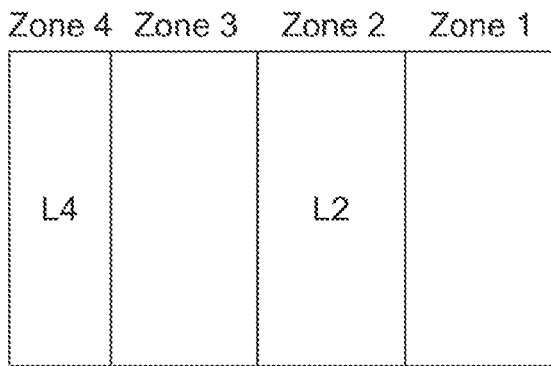
FIG. 24C shows image zones received by the left eye during the first phase of FIG. 24A.

The first phase can be understood more fully from FIGS. 24A to 24C. The waveguide aperture 2450 is arranged in a first configuration 2400A in the first phase, with 3 open portions 2451, 2453, 2455 and two closed portions 2452, 2554. The waveguide aperture 2450 is provided in a display system, or light engine, which is like the system of FIG. 22A, wherein the waveguide aperture 2450 is tilted with respect to an entrance pupil plane defined by the viewer's left 2406 and right 2408 eyes, such that the waveguide aperture 2450 is substantially parallel to the waveguide 2404 from which it receives spatially modulated light. Other aspects of the display system, such as the display device displaying a hologram or holograms calculated as described herein, are not shown. In the first phase, the first open portion 2451 permits light of zone 1 of the right eye view image to reach the right eye—thus image content "R1" is received. The second open portion 2453 permits light from zone 3 of the right eye view image to reach the right eye—thus image content "R3" is received. The second open portion 2453 also permits light from zone 2 of the left eye view image to reach the left eye—thus, image content "L2" is received. Finally, the third open portion 2455 permits light from zone 4 of the left eye view image to be received by the left eye—thus, image content "L4" is received. FIG. 24B therefore shows the image content received by the right eye 2408 and FIG. 24C shows the image content received by the left eye 2406, in the first phase.

Figures 25B, 25C:
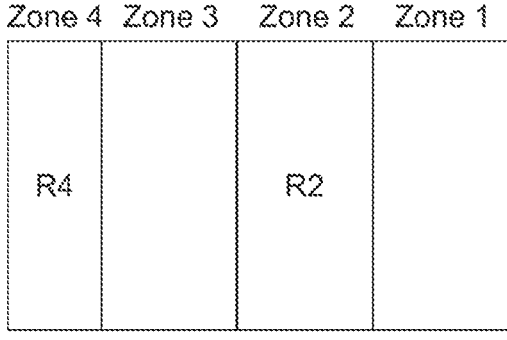
FIG. 25B shows image zones received by the right eye during the second phase of FIG. 25A.
FIG. 25C shows image zones received by the left eye during the second phase of FIG. 25A.

The second phase can be understood more fully from FIGS. 25A to 25C. The waveguide aperture 2450 is in a second phase 2400B, with 2 open portions 2452', 2454' and three closed portions 2451', 2453', 2455'. Again, other aspects of the display system would be present in practice but are not shown in FIG. 25A. In the second phase, the first open portion 2452' permits light of zone 2 of the right eye view image to reach the right eye—thus image content "R2" is received. The first open portion 2452' also permits light of zone 1 of the left eye view image to reach the left eye—thus image content "L1" is received. The second open portion 2454' permits light of zone 4 of the right eye view image to reach the right eye—thus, image content "R4" is received. Finally, the second open portion 2454' also permits light of zone 3 of the left eye view image to be received by the left eye—thus, image content "L3" is received. FIG. 25B therefore shows the image content received by the right eye 2408 and FIG. 25C shows the image content received by the left eye 2406, in the second phase.

The waveguide aperture 2450 may be controlled to switch between the first and second phases quickly, for example more quickly than the typical integration time of the human eye, so that the respective image contents received by the viewer in each phase—as shown in combination in FIGS. 23C and 23D, respectively—are interlaced with one another.

Hence, the viewer perceives that they have seen the full image with both eyes, each from its own unique perspective according to its position. However, the viewer does not perceive the image deterioration, nor do they encounter any confusion, that actually receiving common, or overlapping, image content at both eyes at the same time at the same angle would have caused. Hence, the control device works in combination with the calculated hologram(s), as described herein, to create clear and accurate holographically constructed images for the viewer. It does so in a simple yet effective way.

The inventors found that the working embodiments described above can be adequately determined by geometry based on the centre of each entrance pupil. In a further improvement described below with reference to FIGS. 26 to 30, the inventors considered the finite size of the entrance pupils. In accordance with these embodiments, image quality is further improved and image crosstalk between the plural viewing systems is further reduced or even eliminated. The person skilled in the art will appreciate how the method described below can be used to dynamically reconfigure the control device and aperture arrangement in real-time in response to a change of eye or head position and/or pupil size, for example. The aperture configuration provided by the control device is software reconfigurable and so the system disclosed herein may also adjust itself in response to parameters of the viewing system such as the separate between the two viewing systems—e.g. the interpupil distance of a human viewer.

In some embodiments, a measurement is made of the pupil diameter(s) (e.g. by an eye tracking system) and this is used as part of the control system for the shuttering. For example, a drivers' pupil may vary considerably. When the ambient light is bright, the pupil diameter will be smaller. An advantage of the system disclosed herein is that, under bright conditions when the pupil diameter is relatively small (e.g. 2 mm), less "closed" aperture area is required to eliminate eye crosstalk. This is advantageous because it means the overall efficiency (amount of light propagated towards the viewer) is relatively high. There is therefore excellent synergy between the shutter system of the present disclosure and image display in particular head-up display in a vehicle.

Figure 26:
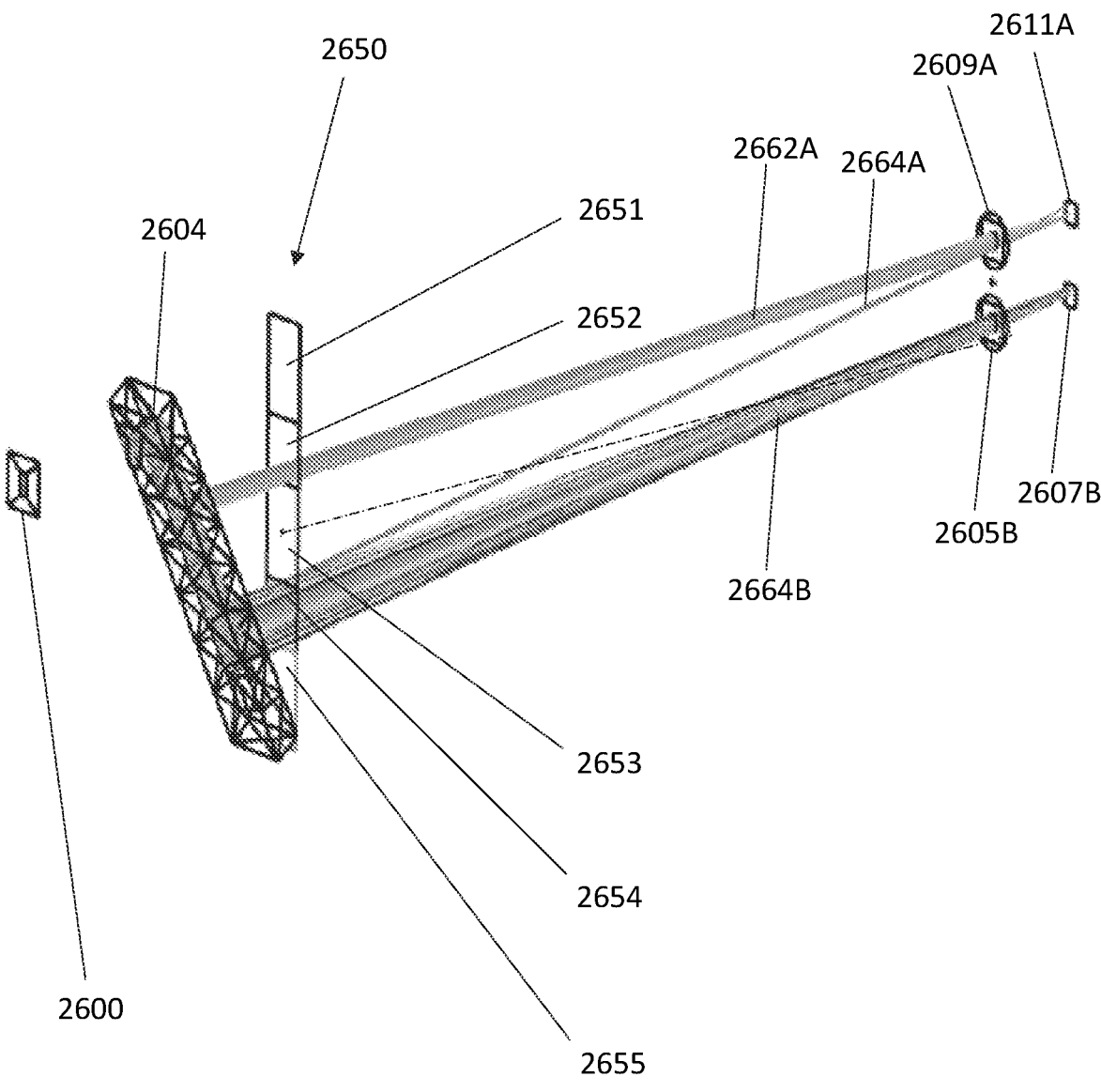
FIG. 26 shows a light engine providing one-dimensional pupil expansion in accordance with embodiments, and light ray tracing through finite size pupils of a viewer.
Figure 27:
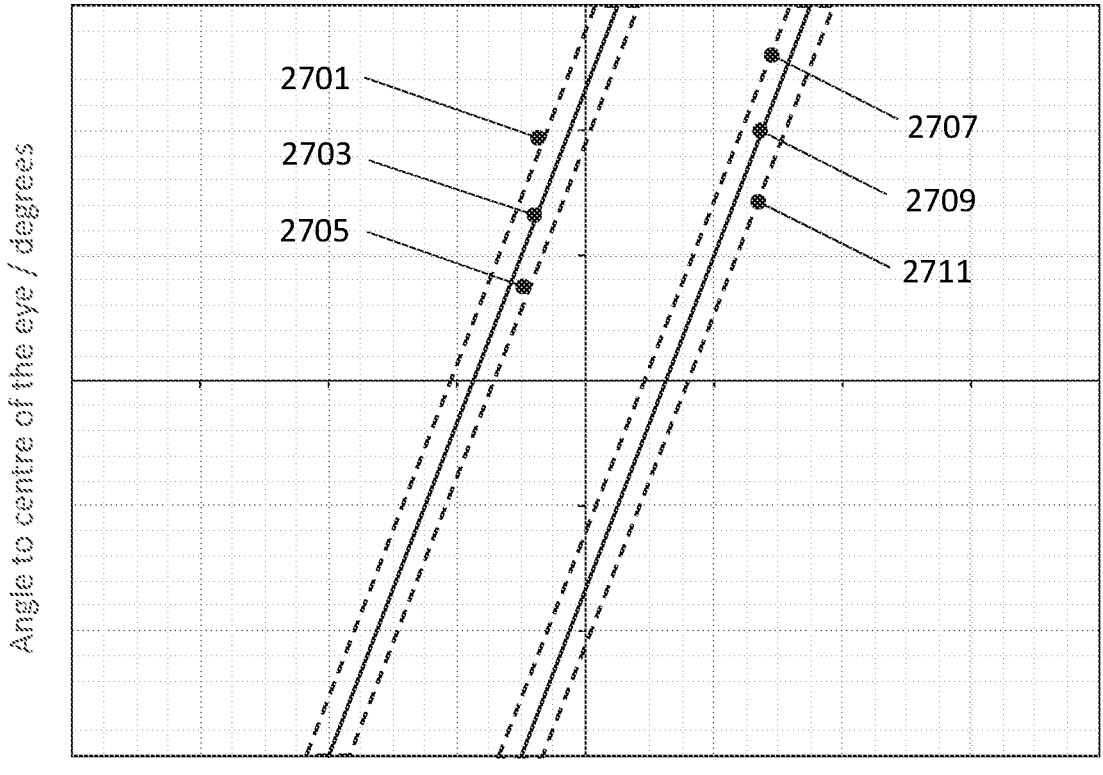
FIG. 27 shows an analysis of two-eye crosstalk in the embodiment of FIG. 26.
Figure 28:
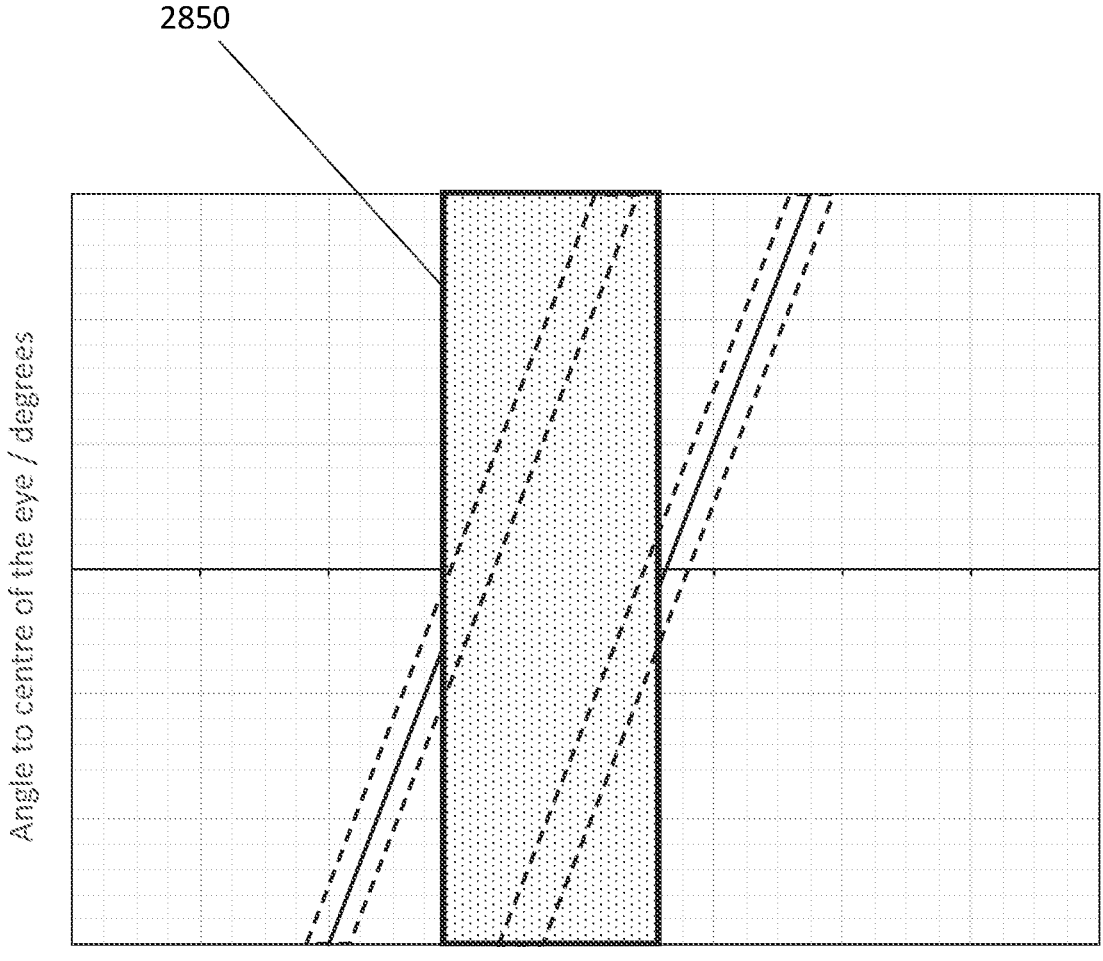
FIGS. 28, 29 and 30 respectively show first to third shutter phases of the control device in accordance with an embodiment.
Figure 29:
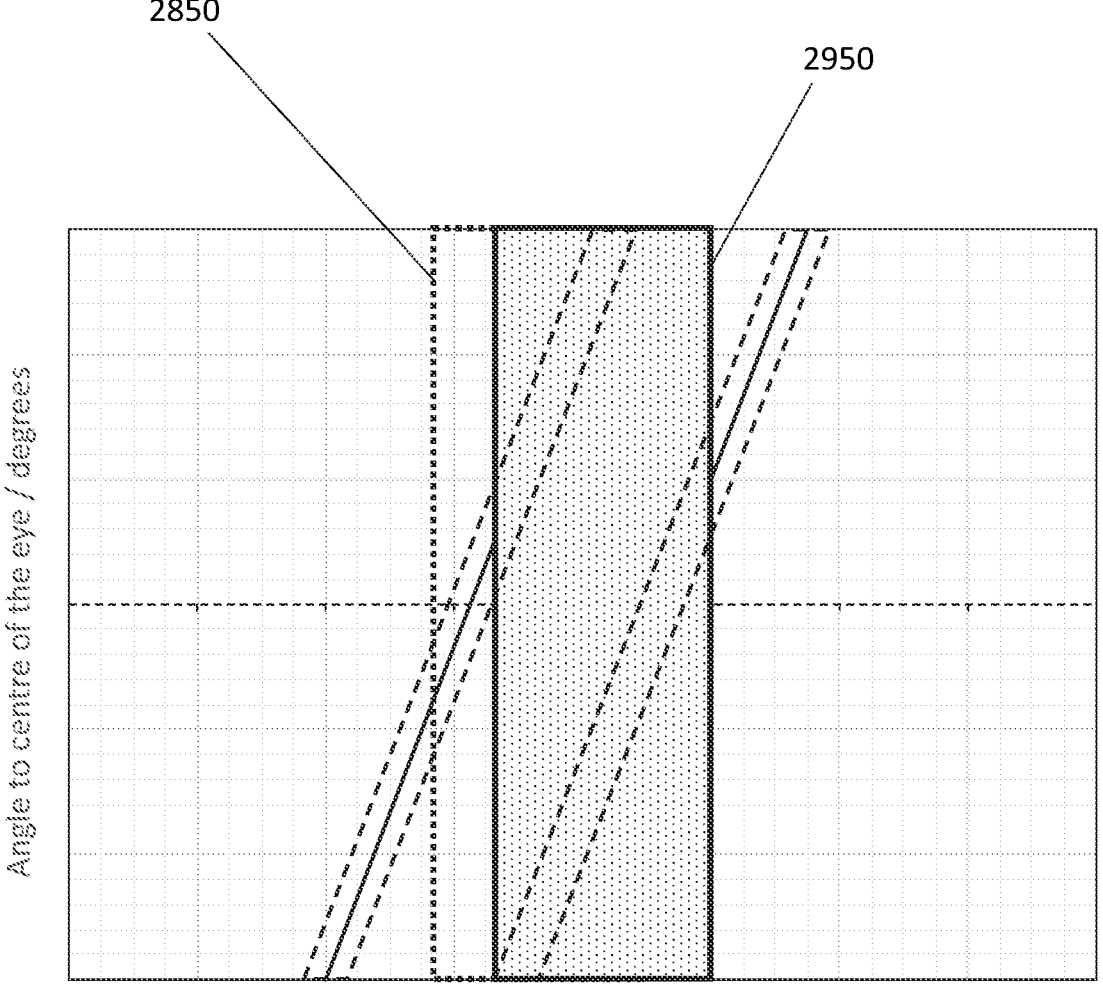
Figure 30:
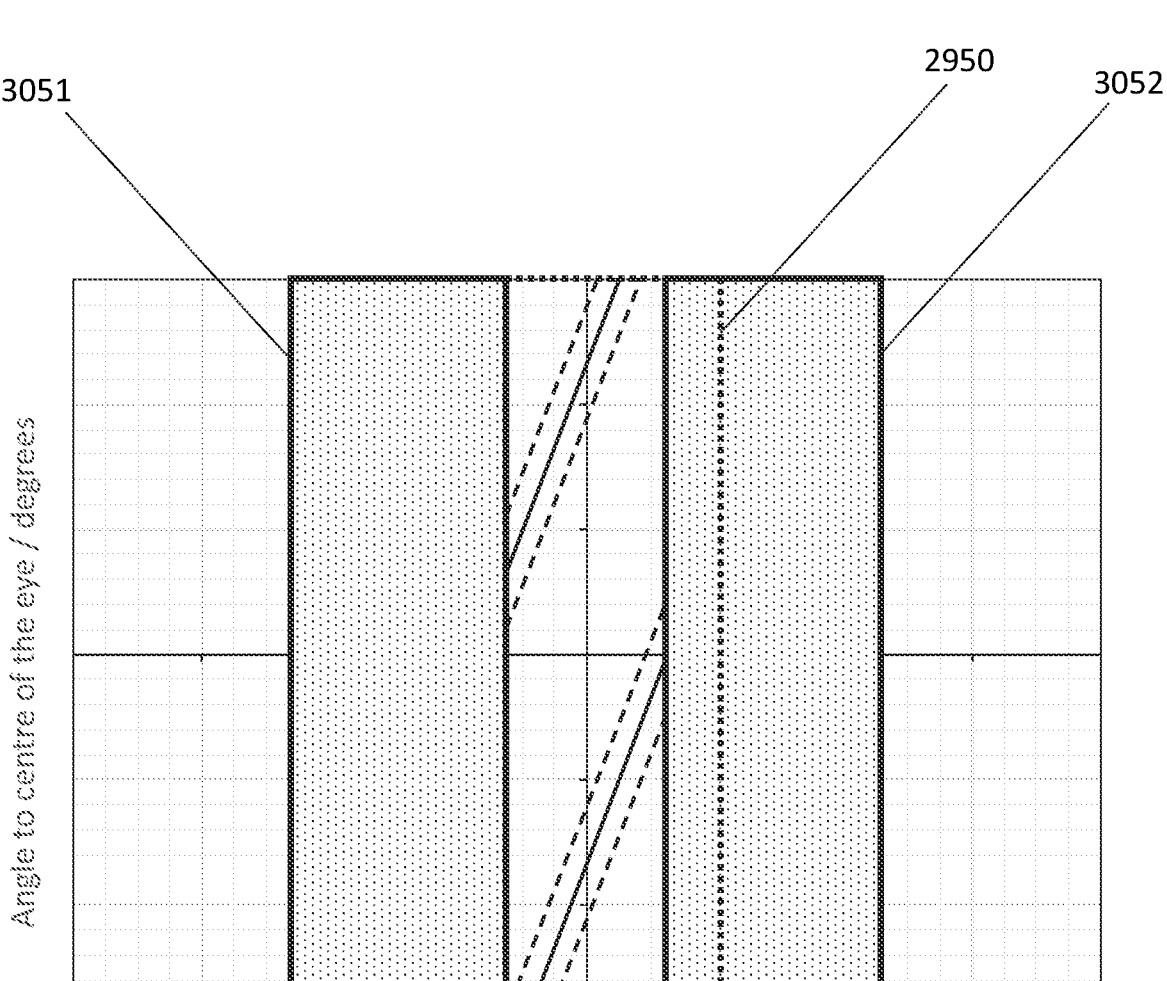

FIGS. 26 to 30 illustrate a more complex shuttering scheme in accordance with a further embodiment. These figures show how the size, as well as the position, of the shutter zones may change during the operation of the dynamic shutter. Any number of different shutter schemes may be implemented in order to ensure that no part of an image is received by plural viewing positions (e.g. eye positions) at the same time. Again, this is achieved by ensuring that each light angle from the waveguide pupil expander only reaches one viewing position (e.g. one eye) at any one time. FIGS. 28 to 30 illustrate one embodiment, by way of example only, in which the three different shutter configurations are implemented in sequence (e.g. cycled) during operation.

FIG. 26 shows the geometric configuration corresponding to the three-phase dynamic shuttering scheme illustrated by FIGS. 28 to 30. FIG. 26 shows a spatial light modulator 2600 displaying a hologram of an image or images (e.g. two different, zoned images as per FIG. 23C or 23D, for example). FIG. 26 further shows a waveguide pupil expander 2604, in this example, in the form of a rod. The waveguide pupil expander 2604 is arranged to receive spatially modulated light from the spatial light modulator 2600. The received light is spatially modulated in accordance with the displayed hologram. A control device 2650 in the form of a dynamic shutter receives light from the output face of the waveguide pupil expander 2604. As described above, the waveguide pupil expander 2604 effectively replicates the received light such that light is emitted at a plurality of points along its length.

Some light that passes through the control device 2650 reaches a viewing point of the plurality of viewing points. In this example, there are two viewing points. A first viewing system comprising a first entrance pupil 2609A and first light sensor 2611A located at a first viewing point. A second viewing system comprising a second entrance pupil 2605B and second light sensor 2607B located at a second viewing point.

FIG. 26 shows one example shutter configuration in which five discrete shutter zones are provided by way of example only. Each shutter zone is independently controllable to be either transmissive or non-transmissive (e.g. absorptive or reflective) to light received from a corresponding sub-area of the rod. It will be understood from the following that the control device is reconfigurable such that the number, size and position of the shutter zones may be varied between shutter configurations of a set of shutter configurations designed to deliver the entire image content/s to the corresponding viewing position/s. As can be understood from the previous embodiments, the image content delivered to a first viewing position through the control zone is not necessarily the same as the image content delivered through the control device to a second viewing system.

In this embodiment, the control device 2650 comprises, in order, a first shutter zone 2651, a second shutter zone 2652, a third shutter zone 2653, a fourth shutter zone 2654 and a fifth shutter zone 2655. In this embodiment, first light 2662A passing through a second shutter zone 2652 of the control device 2650 and second light 2664A passing through the fourth shutter zone 2654 of the control device 2650 reaches the first viewing system. Third light 2664B passing through the fourth shutter zone 2654 of the control device 2650 reaches the second viewing system. It will be understood from the prior description that the system is configured such that light of particular angles is delivered to a viewing position at a particular time. Each light ray angle corresponds to a different part of the image albeit encoded in the hologram domain. No light ray angles are delivered to both or all viewing systems (e.g. eyes) at the same time.

In FIG. 26, the spatial light modulator 2600, waveguide pupil expander 2604, control device 2650 and first and second viewing system are substantially coplanar. An optical axis of the system lies on a single plane. A straight line connects the centre of the control device 2650 to a midpoint between the first and second viewing systems. In this embodiment, the waveguide pupil expander and control device are substantially elongate and there is an angle between the long axis of the rod and that of the control device. The angle lies on the plane containing the optical axis of the system.

In the configuration shown in FIG. 26, second shutter zone 2652 and fourth shutter zone 2654 of the control device are operated to be transmissive or, at least, substantially transmissive and first, third and fifth shutter zones 2651, 2653 and 2655 are operated to be non-transmissive or, at least, substantially non-transmissive.

In this embodiment, the finite size of the entrance pupil associated with each viewing system of the pair of viewing systems (e.g. each eye) has been fully considered. FIG. 27 is a similar style plot to FIG. 18 but corresponds to the geometrical configuration of FIG. 26 and entrance pupils, 2609A and 2605B, representative of a pair of human eyes having an interpupil distance and finite pupil size. FIG. 27 shows the angle to the centre of each viewing system/eye as a function of position along the waveguide. Three lines are plotted on FIG. 27 for each eye. Line 2703 corresponds to the centre of entrance pupil 2609A and lines 2701 and 2705 correspond to two opposite edges of entrance pupil 2609A on the plane of the system. Line 2709 corresponds to the centre of entrance pupil 2605B and lines 2707 and 2711 correspond to two opposite sides of entrance pupil 2605B on the plane of the system.

Based on this geometry, the inventors have determined a dynamic shuttering scheme that eliminates crosstalk between the two eyes having a finite pupil size. In this embodiment, the dynamic shuttering scheme comprises three phases or configurations or stages. That is, three, different shutter arrangements/patterns are used to reconstruct each hologram. The three shutter arrangements are formed time-sequentially. It may therefore be said that the different arrangements are time-interlaced. However, the present disclosure is not limited to three different shutter arrangements and any number of different shutter arrangements may be conceived within the scope of this disclosure.

FIG. 28 illustrates a first phase in which only a first area 2850 of the control device is configured to be non-transmissive. FIG. 29 illustrates a second phase in which only a second area 2950 of the control device is configured to be non-transmissive. A boundary of the preceding, first area 2850 is shown in FIG. 29 merely to aid understanding. The first area 2850 and second area 2950 are formed at different times but are partially overlapping (in space). FIG. 30 illustrates a third phase in which a third area 3051 and fourth area 3052 of the control device are configured to be non-transmissive. A boundary of the preceding, second area 2950 is shown in FIG. 30 merely to aid understanding. The reader should appreciate that the total area of the control device that is block/non-transmissive or unblocked/transmissive is not constant during cycling through the shutter phases.

The control device has been described herein as a "waveguide aperture" but any suitable control device may be used, to provide the function described herein. The control device, such as a waveguide aperture, may be formed from any suitable material. For example, it may comprise a liquid crystal device or a plurality, such as an array, of liquid crystal devices that can each switch between being opaque and transmissive. For example, the control device may comprise a "smart glass" or "switchable glass" whose light transmission properties can be altered when voltage, light, or heat is applied. The control device may be controlled by any suitable processor or controller. Its configuration may be changed rapidly, in order to coordinate, or synchronise, with the dynamic display of multiple different holograms on a display device, for example in order to reconstruct different respective target images and/or to accommodate the movement of a viewer or viewing system.

The control device disclosed herein may take any number of different forms. In some embodiments, the control device comprises a plurality, such as a 2D array, of individually controllable light receiving/processing elements such as pixels. In some embodiments, the control device comprises a pixelated liquid crystal device or display. In some embodiments, the elements or pixels are operable in contiguous groups to form the transmissive and non-transmissive shutter zones disclosed herein. Each group of pixels may be switchable between a first mode e.g. transmissive and a second mode e.g. reflective. The person skilled in the art is familiar with how a pixelated display device may be controlled in order that the size and position of groups or zones of pixels—each zone having a different response to light— may be changed in operation such as in real-time. Each zone is larger than the pixel size of the device. Each zone may therefore comprise a plurality of pixels. The person skilled in the art is equally familiar with how optical components such as polarisers and waveplates may be implemented in conjunction with a pixelated liquid crystal device to provide a reconfigurable light shutter. By way of example only, the control device may utilize polarization selection but other schemes based on other characterizing properties of light are equally applicable. In some embodiments, the control device comprises a pixelated liquid crystal display and, optionally, other optical elements collectively configured to transmit light having a first polarization and absorb or reflect light having a second polarization, optionally, wherein the first polarization and second polarization are opposite or complementary. For the avoidance of doubt, any number of different optical systems may be used to form the control device depending on the characteristics, such as polarization and wavelength, of the light forming the image and the present disclosure is not therefore limited by the construction of the control device. It will therefore be understood that the control device disclosed herein is defined by its functionality rather than its structure.

The control device is dynamically reconfigurable. In some embodiments, the control device is pixelated. That is, the control device comprises an array of individually controllable pixels. Each pixel may comprise, for example, liquid crystal configurable between a transmissive state and non-transmissive state. Any imperfection in alignment between the edge of a pixel and the ideal aperture zone edge, identified as per this disclosure, can be dealt with by either letting through too much or too little light. That is, by either "opening" another line of pixels or "closing" one more line of pixels in the zonal configuration. In embodiments comprising three or more aperture phases (e.g. when the finite size of each entrance pupil is fully considered) the control device has sufficient resolution or number of pixels such that the pixel at the interface can always be made to block the light.

The examples described hereabove should not be regarded as limiting. For example, the viewing system may have more than two viewing apertures, or entrance pupils. For example, it is possible to divide an image (and, correspondingly, a calculated hologram and the resulting holographically reconstructed image) into any number of zones, and thus to produce any number of corresponding angular channels of spatially modulated light. For example, the control device has been described as switching between first and second phases, but it could be configured to switch between more than two phases. For example, the control may have four phases. According to an embodiment, a phase (for example, each phase) of the control device may enable light to be delivered only to one eye (or viewing aperture). According to an embodiment, a phase (for example, each phase) of the control device may enable light to be delivered only to more than one eye (or, more than one viewing aperture).

The number of zones and/or the size of zones for which image content is received need not be the same for each phase. In other words, some phases of the control device may deliver more image content than some respective others. Similarly, both eyes need not receive the same amount of image content as one another in each phase, or in total, when multiple phases of the control device are interlaced with one another. For example, it may be possible for one eye to see more image content than the respective other, dependent on their relative positions and/or on other factors.

A display system comprising a control device such as a waveguide aperture as described herein may be configured to display a plurality of different images, one after another and/or at different respective times. Thus, a display device within such a system may be configured to display different respective holograms, sometimes in rapid succession. Different images may have different respective numbers of zones. Moreover, the sizes of the zones may differ between different respective images. Similarly, the light rays of the zones of one image may be defined by different respective angles to the light rays of the zones of a second, different image. The control device may be configured to be dynamically adaptable, to accommodate changes in the number and/or sizes of the zones. In other words, the precise positions along the waveguide ($P_{WG}$) at which the control device changes from being open to being closed, and vice versa, may not be fixed. Instead, the control device may be configurable to dynamically change the positions along the waveguide ($P_{WG}$) at which it changes from being open to being closed. Thus, the total number of open and closed portions provided by the control device may be varied. The individual sizes of one or more of those portions may also be varied.

The system may be configured to display a sequence of images such as a video rate sequence of images. Each image may correspond to a frame of a sequence of frames having a frame rate such as 50 or 60 Hz. Each frame may comprise a plurality of sub-frames. The sub-frame rate may be 4 or 8 times the frame rate, for example. The displayed hologram may be changed for each successive sub-frame. Each sub-frame may be considered an individual display event. Each sub-frame may correspond to the image or at least a part of the image. Whilst embodiments have shown light being delivered to both eyes each display event, the present disclosure is not limited in this respect. For example, the light engine may be configured to deliver light to only one eye/entrance pupil per display event. The configuration of the waveguide aperture (i.e. the size and/or distribution of open and closed apertures/openings) may change every display event or every n display events, wherein n is an integer. Likewise, whilst described embodiments have shown adjacent image content being delivered through each aperture/opening during a display event, the present disclosure is not limited to such a situation and the image content delivered through each aperture may not be adjacent image content. In some embodiments, only one angular range of light is delivered to one eye per display event/aperture configuration. In some embodiments, the control system is configured to deliver light to each eye/entrance pupil in turn.

As has been described earlier in the present disclosure, a hologram of a target image may be calculated for a particular size and position of a viewing aperture—e.g., for a particular size and position of the entrance pupil of a viewer's eye. If a constraint such as entrance pupil diameter, or position changes, the hologram may be recalculated, even if the target image that is to be reconstructed at that time (and, hence, the image content that the viewer will see or perceive) remains the same. Each hologram need not have the same number or size of zones, even when two holograms represent the same target image.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode.

The system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A light engine arranged to form an image visible from a viewing window, wherein the light engine comprises:

a display device arranged to display a hologram of the image and spatially modulate light in accordance with the hologram, wherein the hologram is configured to angularly distribute spatially modulated light of the image in accordance with a position of image content, such that angular channels of the spatially modulated light correspond with respective continuous regions of the image;

a waveguide pupil expander arranged to receive the spatially modulated light and provide a plurality of different light propagation paths for the spatially modulated light from the display device to the viewing window; and a control device disposed between the waveguide pupil expander and the viewing window, wherein the control device comprises at least one aperture arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image.

2. The light engine of claim 1 wherein the first region and the second region are one or both of (i) adjacent regions of the image, or (ii) substantially non-overlapping.

3. The light engine of claim 1, wherein adjacent angular channels of the spatially modulated light correspond to adjacent regions of the image, and wherein the image is a virtual image perceived upstream of the display device.

4. The light engine of claim 1, wherein the control device is one or both of (i) coupled to an output face of the waveguide pupil expander, or (ii) configured to restrict an area of an output face of the waveguide pupil expander that is visible from the viewing window.

5. The light engine of claim 1, wherein the waveguide pupil expander and viewing window are non-parallel.

6. The light engine of claim 1, wherein the control device comprises a plurality of openings, wherein at least one opening provides the first viewing position and/or the second viewing position with a respective channel of spatially modulated light, such that different image content is delivered, respectively, to the first and second viewing positions at substantially the same time, and wherein the respective channels are non-overlapping but continuous.

7. The light engine of claim 6, wherein the control device is configured such that the plurality of openings is switchable between an open position and a closed position such that a plurality of different control device configurations is provided in which each control device configuration comprises an alternating sequence of open and closed openings.

8. The light engine of claim 7, wherein the control device is configured to provide a first control device configuration at a first time and a second control device configuration at a second time, wherein the first control device configuration and second control device configuration are complementary, and wherein a time interval between the first time and second time is less than an integration time of a human eye.

9. The light engine of claim 6, wherein a size and/or a location, within the control device, of at least one of the plurality of openings is dynamically variable.

10. The light engine of claim 1, wherein the image comprises a first image zone, a second image zone, a third image zone, and a fourth image zone, and wherein the first image zone, second image zone, third image, and fourth image zone correspond to ordered, contiguous areas of the image;

wherein a first control device configuration provided by the control device delivers (i) light modulated in accordance with the first image zone and the third image zone of the image to the first viewing position and (ii) light modulated in accordance with the second image zone and the fourth image zone to the second viewing position; and wherein a second control device configuration provided by the control device delivers (i) light modulated in accordance with the second image zone and the fourth image zone to the first viewing position and (ii) light modulated in accordance with the first image zone and the third image zone to the second viewing position.

11. The light engine of claim 10, wherein image content corresponding to any one of the first image zone, the second image zone, the third image zone, or the fourth image zone as delivered to the first viewing position is non-identical to image content corresponding one of the first image zone, the second image zone, the third image zone, or the fourth image zone as delivered to the second viewing position.

12. The light engine of claim 1, wherein the first viewing position and second viewing position are first and second eye positions of a viewer, and the viewing window is an eye-box.

13. The light engine of claim 1, wherein the waveguide pupil expander comprises a plurality of transmission points, and wherein each of the plurality of different light propagation paths is transmitted from a different respective transmission point.

14. A method of controlling light propagation in a light engine, to form an image visible from a viewing window, wherein the light engine comprises a display device, a waveguide pupil expander and a viewing system comprising the viewing window, wherein the method comprises:

displaying, on the display device, a hologram of the image;

illuminating the display device to spatially modulate light in accordance with the hologram, wherein the hologram is configured to angularly distribute spatially modulated light of the image in accordance with position of image content, such that angular channels of the spatially modulated light correspond with respective continuous regions of the image;

arranging the waveguide pupil expander to receive the spatially modulated light and to provide a respective plurality of different light propagation paths for the spatially modulated light from the display device to the viewing window; and controlling propagation of the plurality of different light propagation paths using a control device disposed between the waveguide pupil expander and the viewing window, wherein the control device comprises at least one aperture;

wherein the step of controlling propagation of the plurality of different light propagation paths comprises configuring the control device so that a first viewing position within the viewing window receives a first channel of light spatially modulated by the hologram in accordance with a first region of the image and a second viewing position within the viewing window receives a second channel of light spatially modulated by the hologram in accordance with a second region of the image.

15. The method of claim 14, further comprising calculating the hologram of the image.

16. The method of claim 14, wherein the step of configuring the control device comprises allowing transmission of light through a first portion of the control device and preventing transmission of light through a second, different portion of the control device.

17. The method of claim 14, wherein the waveguide pupil expander comprises a plurality of transmission points, and wherein each of the plurality of different light propagation paths is transmitted from a different respective transmission point.

18. The method of claim 17, further comprising:

(i) identifying a first transmission point from which light of a first angular channel would propagate to the first viewing position, in the absence of the control device;

(ii) identifying a second, different transmission point from which light of the first angular channel would propagate to the second viewing position, in the absence of the control device; and (iii) configuring the control device to block either a light path of the first angular channel to the first viewing position or a light path of the first angular channel to the second viewing position, at a selected time (t).

19. The method of claim 18, wherein configuring the control device to block either a light path of the first angular channel to the first viewing position or a light path of the first angular channel to the second viewing position, at a selected time (t) comprises alternately blocking the light path of the first angular channel to the first viewing position and blocking the light path of the first angular channel to the second viewing position, during a selected time period.

20. The method of claim 14, further comprising identifying a plurality of continuous regions within the image, wherein each continuous region corresponds to light of a different respective angular channel, and configuring the control device to permit the light of a first sub-set of continuous regions, within said plurality, to be transmitted only to the first viewing position and to permit the light of a second, different sub-set of continuous regions, within said plurality, to be transmitted only to the second viewing position, within a selected time period.

\* \* \* \* \*